US012558841B2

(12) United States Patent
Sterle et al.

(10) Patent No.: US 12,558,841 B2
(45) Date of Patent: Feb. 24, 2026

(54) PRINTING ASSEMBLIES AND METHODS FOR USING THE SAME

(71) Applicant: General Electric Company, Schenectady, NY (US)

(72) Inventors: John Sterle, Clifton Park, NY (US); Vadim Bromberg, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 64 days.

(21) Appl. No.: 18/032,263

(22) PCT Filed: Oct. 18, 2021

(86) PCT No.: PCT/US2021/055457
§ 371 (c)(1),
(2) Date: Apr. 17, 2023

(87) PCT Pub. No.: WO2022/086867
PCT Pub. Date: Apr. 28, 2022

(65) Prior Publication Data
US 2023/0398735 A1     Dec. 14, 2023

Related U.S. Application Data

(60) Provisional application No. 63/093,852, filed on Oct. 20, 2020.

(51) Int. Cl.
B29C 64/209          (2017.01)
B29C 64/165          (2017.01)
(Continued)

(52) U.S. Cl.
CPC .......... B29C 64/209 (2017.08); B29C 64/165 (2017.08); B29C 64/393 (2017.08);
(Continued)

(58) Field of Classification Search
CPC .... B29C 64/209; B29C 64/321; B29C 64/343
See application file for complete search history.

(56) References Cited

U.S. PATENT DOCUMENTS 4,034,219 A      7/1977 Louden et al.
4,404,566 A  *  9/1983 Clark ..................... B41J 2/1707
347/89

(Continued)

FOREIGN PATENT DOCUMENTS

CN          201815393 U          5/2011
CN          101808826 B          9/2012
(Continued)

OTHER PUBLICATIONS

US 9,744,592 B1, 08/2017, Schmitt et al. (withdrawn)
(Continued)

*Primary Examiner* — Andrew D Graham
(74) *Attorney, Agent, or Firm* — Dinsmore & Shohl LLP

(57)          ABSTRACT

A printing assembly (150) is provided including a manifold assembly including an inlet manifold (210) including an inlet reservoir (238) and an inlet port (266), and an outlet manifold (212) including an outlet reservoir (286) and an outlet port (310). A valve is provided at each of the inlet port of the inlet manifold and at the outlet port of the outlet manifold. The valve is operable between an open position for permitting the flow of material through the port and a closed position for preventing the flow of material through the port. The printing head includes a housing and print heads provided within the housing and in fluid communication with the inlet reservoir via the inlet port and the outlet reservoir via the outlet port. The valves are independently operable to control a flow of material from the inlet reservoir to the print heads, and from the print heads to the outlet reservoir, respectively.

19 Claims, 24 Drawing Sheets

(51) Int. Cl.

| | |
|---|---|
| *B29C 64/393* | (2017.01) |
| *B33Y 10/00* | (2015.01) |
| *B33Y 30/00* | (2015.01) |
| *B33Y 50/02* | (2015.01) |
| *B41J 2/165* | (2006.01) |

(52) U.S. Cl.
CPC .............. *B33Y 10/00* (2014.12); *B33Y 30/00* (2014.12); *B33Y 50/02* (2014.12); *B41J 2/16508* (2013.01)

(56) References Cited

U.S. PATENT DOCUMENTS

| | | | |
|---|---|---|---|
| 4,680,895 A | 7/1987 | Roestenberg | |
| 4,722,824 A | 2/1988 | Wiech, Jr. | |
| 5,012,260 A | 4/1991 | Yoshimura et al. | |
| 5,204,055 A | 4/1993 | Sachs et al. | |
| 5,387,380 A | 2/1995 | Cima et al. | |
| 6,007,318 A | 12/1999 | Russell et al. | |
| 6,092,887 A | 7/2000 | Tanino et al. | |
| 6,159,085 A | 12/2000 | Hara | |
| 6,375,874 B1 | 4/2002 | Russell et al. | |
| 6,454,811 B1 | 9/2002 | Sherwood et al. | |
| 6,607,572 B2 | 8/2003 | Gammack et al. | |
| 6,657,155 B2 | 12/2003 | Abe et al. | |
| 6,764,636 B1 | 7/2004 | Allanic et al. | |
| 6,824,714 B1 | 11/2004 | Turck et al. | |
| 6,835,222 B2 | 12/2004 | Gammack | |
| 6,945,638 B2 | 9/2005 | Teung et al. | |
| 6,989,115 B2 | 1/2006 | Russell et al. | |
| 7,034,246 B2 | 4/2006 | Muylaert et al. | |
| 7,037,382 B2 | 5/2006 | Davidson et al. | |
| 7,204,684 B2 | 4/2007 | Ederer et al. | |
| 7,225,803 B2 | 6/2007 | Boyadjieff | |
| 7,281,785 B2 * | 10/2007 | Palifka | B41J 2/17596 |
| | | | 347/85 |
| 7,291,002 B2 | 11/2007 | Russell et al. | |
| 7,296,990 B2 | 11/2007 | Devos et al. | |
| 7,357,629 B2 | 4/2008 | Weiskopf et al. | |
| 7,387,359 B2 | 6/2008 | Hernandez et al. | |
| 7,389,154 B2 | 6/2008 | Hunter et al. | |
| 7,435,368 B2 | 10/2008 | Davidson et al. | |
| 7,585,450 B2 | 9/2009 | Wahlstrom et al. | |
| 7,686,995 B2 | 3/2010 | Davidson et al. | |
| 7,690,909 B2 | 4/2010 | Wahlstrom | |
| 7,820,241 B2 | 10/2010 | Perret et al. | |
| 7,824,001 B2 | 11/2010 | Fienup et al. | |
| 7,850,271 B2 | 12/2010 | Gothait et al. | |
| 7,879,123 B2 | 2/2011 | Lundquist et al. | |
| 7,971,991 B2 | 7/2011 | Davidson et al. | |
| 7,979,152 B2 | 7/2011 | Davidson | |
| 8,017,055 B2 | 9/2011 | Davidson et al. | |
| 8,033,812 B2 | 10/2011 | Collins et al. | |
| 8,052,254 B2 * | 11/2011 | Essen | B41J 2/14145 |
| | | | 347/85 |
| 8,105,527 B2 | 1/2012 | Wahlstrom | |
| 8,167,395 B2 | 5/2012 | Fienup et al. | |
| 8,185,229 B2 | 5/2012 | Davidson | |
| 8,322,821 B2 | 12/2012 | Tsai et al. | |
| 8,951,033 B2 | 2/2015 | Hchsmann et al. | |
| 8,956,144 B2 | 2/2015 | Grasegger et al. | |
| 8,997,799 B2 | 4/2015 | Hodson et al. | |
| 9,027,378 B2 | 5/2015 | Crump et al. | |
| 9,346,127 B2 | 5/2016 | Buller et al. | |
| 9,403,235 B2 | 8/2016 | Buller et al. | |
| 9,446,448 B2 | 9/2016 | Mccoy et al. | |
| 9,586,290 B2 | 3/2017 | Buller et al. | |
| 9,636,870 B2 | 5/2017 | Kuzusako et al. | |
| 9,912,915 B2 | 3/2018 | Sinclair | |
| 9,919,474 B2 | 3/2018 | Napadensky | |
| 9,989,396 B2 | 6/2018 | Gold et al. | |
| 10,022,794 B1 | 7/2018 | Redding et al. | |
| 10,093,103 B2 | 10/2018 | Araki et al. | |
| 10,166,603 B2 | 1/2019 | Kawada et al. | |
| 10,183,330 B2 | 1/2019 | Buller et al. | |
| 10,189,267 B2 | 1/2019 | Sakai et al. | |
| 10,195,693 B2 | 2/2019 | Buller et al. | |
| 10,232,443 B2 | 3/2019 | Myerberg et al. | |
| 10,259,044 B2 | 4/2019 | Buller et al. | |
| 10,272,492 B2 | 4/2019 | Gibson et al. | |
| 10,272,525 B1 | 4/2019 | Buller et al. | |
| 10,286,452 B2 | 5/2019 | Buller et al. | |
| 10,286,571 B2 | 5/2019 | Hchsmann et al. | |
| 10,294,450 B2 * | 5/2019 | Kamen | A61L 27/3683 |
| 10,336,053 B2 | 7/2019 | Sasaki | |
| 10,343,725 B2 | 7/2019 | Martin et al. | |
| 10,350,682 B2 | 7/2019 | Myerberg et al. | |
| 10,406,262 B2 | 9/2019 | Bonassar et al. | |
| 10,414,089 B2 | 9/2019 | Maier | |
| 10,449,696 B2 | 10/2019 | Elgar et al. | |
| 10,486,361 B2 | 11/2019 | Kawabata | |
| 10,486,363 B2 | 11/2019 | Sachs et al. | |
| 10,569,331 B2 | 2/2020 | Kawada et al. | |
| 10,632,675 B2 | 4/2020 | Chanclon et al. | |
| 10,695,981 B2 | 6/2020 | Hchsmann et al. | |
| 11,167,454 B2 | 11/2021 | Rockstroh et al. | |
| 2002/0043055 A1 | 4/2002 | Conrad | |
| 2002/0079601 A1 | 6/2002 | Russell et al. | |
| 2002/0116907 A1 | 8/2002 | Gammack et al. | |
| 2004/0194250 A1 | 10/2004 | Conrad et al. | |
| 2006/0219163 A1 | 10/2006 | Merot et al. | |
| 2006/0221127 A1 | 10/2006 | Lee et al. | |
| 2007/0077323 A1 | 4/2007 | Stonesmith et al. | |
| 2007/0179656 A1 * | 8/2007 | Eshed | B33Y 70/00 |
| | | | 700/119 |
| 2008/0111271 A1 | 5/2008 | Khoshnevis | |
| 2008/0117240 A1 | 5/2008 | Sheinman | |
| 2008/0200104 A1 | 8/2008 | Chuang | |
| 2008/0273063 A1 | 11/2008 | Wouters et al. | |
| 2008/0284819 A1 | 11/2008 | Owaki et al. | |
| 2008/0303882 A1 | 12/2008 | Silverbrook et al. | |
| 2008/0303883 A1 | 12/2008 | Miyazawa | |
| 2010/0043698 A1 | 2/2010 | Bolt | |
| 2012/0018032 A1 * | 1/2012 | Von Essen | B41J 2/14145 |
| | | | 141/2 |
| 2013/0004607 A1 | 1/2013 | Hoechsmann et al. | |
| 2014/0240396 A1 * | 8/2014 | Rosati | B41J 2/1752 |
| | | | 347/29 |
| 2015/0110911 A1 | 4/2015 | Snyder | |
| 2015/0165800 A1 * | 6/2015 | Silverbrook | B41J 2/17566 |
| 2015/0298394 A1 | 10/2015 | Sheinman | |
| 2015/0343533 A1 | 12/2015 | Park et al. | |
| 2016/0052054 A1 | 2/2016 | Orange et al. | |
| 2016/0096360 A1 | 4/2016 | Zetzl et al. | |
| 2016/0114533 A1 | 4/2016 | Grasegger et al. | |
| 2016/0151973 A1 | 6/2016 | Juan Jover et al. | |
| 2016/0303616 A1 | 10/2016 | Bredt et al. | |
| 2016/0339640 A1 | 11/2016 | Juan et al. | |
| 2016/0361874 A1 | 12/2016 | Park et al. | |
| 2016/0368054 A1 | 12/2016 | Ng et al. | |
| 2017/0050378 A1 | 2/2017 | Ederer et al. | |
| 2017/0106443 A1 | 4/2017 | Karlsson | |
| 2017/0106595 A1 | 4/2017 | Gnther et al. | |
| 2017/0120521 A1 | 5/2017 | Sakura et al. | |
| 2017/0136761 A1 * | 5/2017 | Sieradzki | B33Y 10/00 |
| 2017/0144374 A1 | 5/2017 | Ono | |
| 2017/0182717 A1 | 6/2017 | Byun et al. | |
| 2017/0203514 A1 | 7/2017 | McCoy et al. | |
| 2017/0217104 A1 | 8/2017 | Cortes I Herms et al. | |
| 2017/0239725 A1 | 8/2017 | Ufton | |
| 2017/0246808 A1 | 8/2017 | Hchsmann et al. | |
| 2017/0252975 A1 | 9/2017 | Park | |
| 2017/0266880 A1 | 9/2017 | Matsubara | |
| 2017/0334138 A1 | 11/2017 | Vilajosana et al. | |
| 2017/0334144 A1 | 11/2017 | Fish et al. | |
| 2018/0001567 A1 | 1/2018 | Juan et al. | |
| 2018/0009110 A1 | 1/2018 | Langford et al. | |
| 2018/0056582 A1 | 3/2018 | Matusik et al. | |
| 2018/0111194 A1 | 4/2018 | Buller et al. | |
| 2018/0111196 A1 | 4/2018 | Brezoczky et al. | |
| 2018/0236504 A1 | 8/2018 | Pourcher et al. | |
| 2018/0297283 A1 | 10/2018 | Hagedorn et al. | |
| 2018/0304364 A1 | 10/2018 | Myerberg et al. | |
| 2018/0339467 A1 | 11/2018 | Donovan et al. | |

(56) References Cited

U.S. PATENT DOCUMENTS

| | | | |
|---|---|---|---|
| 2018/0345541 A1 | 12/2018 | Cuyt et al. | |
| 2019/0001413 A1 | 1/2019 | Golz et al. | |
| 2019/0070779 A1 | 3/2019 | Chen et al. | |
| 2019/0084231 A1 | 3/2019 | Chanclon Fernandez et al. | |
| 2019/0126347 A1* | 5/2019 | Roman | B29C 64/153 |
| 2019/0134705 A1 | 5/2019 | Sheinman et al. | |
| 2019/0152148 A1 | 5/2019 | Kremer | |
| 2019/0160733 A1 | 5/2019 | Mirkin et al. | |
| 2019/0201982 A1 | 7/2019 | Lombardo et al. | |
| 2019/0210277 A1 | 7/2019 | Sachs et al. | |
| 2019/0210282 A1 | 7/2019 | Sugiura et al. | |
| 2019/0217385 A1 | 7/2019 | Bonilla Gonzalez et al. | |
| 2019/0218501 A1 | 7/2019 | Kamen et al. | |
| 2019/0240732 A1 | 8/2019 | Koch et al. | |
| 2019/0358901 A1 | 11/2019 | Dugan | |
| 2019/0366626 A1 | 12/2019 | Swartz et al. | |
| 2020/0147885 A1 | 5/2020 | Gimenez Manent et al. | |
| 2020/0282461 A1 | 9/2020 | Fang | |
| 2020/0298474 A1 | 9/2020 | Gimenez et al. | |
| 2020/0324467 A1 | 10/2020 | Tjellesen et al. | |
| 2021/0276261 A1* | 9/2021 | Benson | B29C 64/393 |

FOREIGN PATENT DOCUMENTS

| | | | |
|---|---|---|---|
| CN | 101896349 B | 9/2013 | |
| CN | 103949636 A | 7/2014 | |
| CN | 103862045 B | 1/2017 | |
| CN | 106738907 A | 5/2017 | |
| CN | 206528076 U | 9/2017 | |
| CN | 109366982 A | 2/2019 | |
| CN | 208745355 U | 4/2019 | |
| CN | 109732916 A | 5/2019 | |
| CN | 106256535 A | 7/2019 | |
| CN | 110076991 A | 8/2019 | |
| CN | 209851598 U | 12/2019 | |
| CN | 210211384 U | 3/2020 | |
| CN | 210880916 U | 6/2020 | |
| DE | 19743804 A1 | 4/1999 | |
| DE | 19846478 A1 | 4/2000 | |
| DE | 102009036153 A1 | 2/2011 | |
| DE | 202013009787 U1 | 12/2013 | |
| EP | 1704989 A2 | 9/2006 | |
| EP | 1847370 A2 | 10/2007 | |
| EP | 1776910 B1 | 4/2013 | |
| EP | 2782743 A1 | 10/2014 | |
| EP | 2091718 B1 | 8/2016 | |
| EP | 2986405 B1 | 2/2017 | |
| EP | 3456518 A1 | 3/2019 | |
| EP | 3461574 A1 | 4/2019 | |
| EP | 3475057 A1 | 5/2019 | |
| EP | 3492244 A1 | 6/2019 | |
| EP | 3511094 A1 | 7/2019 | |
| EP | 3560714 A1 | 10/2019 | |
| EP | 3566869 A2 | 11/2019 | |
| EP | 3463817 B1 | 4/2021 | |
| EP | 3575064 B1 | 8/2021 | |
| GB | 2550339 A | 11/2017 | |
| JP | 2002292751 A | 10/2002 | |
| JP | 2006511365 A | 4/2006 | |
| JP | 2009136758 A | 6/2009 | |
| JP | 2010149318 A | 7/2010 | |
| JP | 2011020435 A | 2/2011 | |
| JP | 2013180411 A | 9/2013 | |
| JP | 2013193222 A | 9/2013 | |
| JP | 2014080036 A | 5/2014 | |
| JP | 2014141032 A | 8/2014 | |
| JP | 2015522438 A | 8/2015 | |
| JP | 2017065034 A | 4/2017 | |
| JP | 2018001414 A | 1/2018 | |
| JP | 2018047562 A | 3/2018 | |
| JP | 2018144037 A | 9/2018 | |
| JP | 2018199326 A | 12/2018 | |
| JP | 2020093259 A | 6/2020 | |
| WO | 2010055751 A1 | 5/2010 | |
| WO | 2011005690 A1 | 1/2011 | |
| WO | 2013182913 A2 | 12/2013 | |
| WO | 2014006877 A1 | 1/2014 | |
| WO | 2014044676 A1 | 3/2014 | |
| WO | 2014096177 A1 | 6/2014 | |
| WO | 2015112885 A1 | 7/2015 | |
| WO | 2015141779 A1 | 9/2015 | |
| WO | 2016040453 A1 | 3/2016 | |
| WO | 2016055523 A1 | 4/2016 | |
| WO | 2016083234 A1 | 6/2016 | |
| WO | 2017017272 A1 | 2/2017 | |
| WO | 2017088897 A1 | 6/2017 | |
| WO | 2017152142 A1 | 9/2017 | |
| WO | 2017180314 A1 | 10/2017 | |
| WO | 2018017117 A1 | 1/2018 | |
| WO | 2018149544 A1 | 8/2018 | |
| WO | 2018181334 A1 | 10/2018 | |
| WO | 2018183396 A1 | 10/2018 | |
| WO | 2018191667 A1 | 10/2018 | |
| WO | 2018194446 A1 | 10/2018 | |
| WO | 2018194685 A1 | 10/2018 | |
| WO | 2018197888 A1 | 11/2018 | |
| WO | 2019063741 A1 | 4/2019 | |
| WO | 2019076705 A1 | 4/2019 | |
| WO | 2019089497 A1 | 5/2019 | |
| WO | 2019094269 A1 | 5/2019 | |
| WO | 2019094283 A1 | 5/2019 | |
| WO | 2019094367 A1 | 5/2019 | |
| WO | 2019113412 A1 | 6/2019 | |
| WO | 2019136222 A1 | 7/2019 | |
| WO | 2019139742 A1 | 7/2019 | |
| WO | 2019140000 A1 | 7/2019 | |
| WO | 2019157074 A2 | 8/2019 | |
| WO | 2019182618 A1 | 9/2019 | |
| WO | 2019194826 A1 | 10/2019 | |
| WO | 2019209881 A1 | 10/2019 | |
| WO | 2019236074 A1 | 12/2019 | |
| WO | 2020007891 A1 | 1/2020 | |
| WO | 2020013828 A1 | 1/2020 | |
| WO | 2020068101 A1 | 4/2020 | |
| WO | 2020115468 A1 | 6/2020 | |
| WO | 2020146416 A2 | 7/2020 | |
| WO | 2020159507 A1 | 8/2020 | |
| WO | 2020237118 A1 | 11/2020 | |
| WO | 2020237119 A1 | 11/2020 | |
| WO | 2020237120 A1 | 11/2020 | |
| WO | 2020237122 A1 | 11/2020 | |
| WO | 2020237123 A1 | 11/2020 | |
| WO | 2020237138 A1 | 11/2020 | |
| WO | 2020237142 A1 | 11/2020 | |
| WO | 2020237143 A1 | 11/2020 | |
| WO | 2020237144 A1 | 11/2020 | |
| WO | 2020237161 A1 | 11/2020 | |
| WO | 2020237163 A1 | 11/2020 | |
| WO | 2020237165 A1 | 11/2020 | |
| WO | 2020237166 A1 | 11/2020 | |

OTHER PUBLICATIONS

Japanese Patent Office Action for Application No. 2023-521816 dated May 7, 2024 (8 pages with English Translation).

International Search Report for Appln. No. PCT/US2021/055457 mailed Jan. 27, 2022, 20 pages.

International Search Report for Appln. No. PCT/US2021/055458 mailed Jan. 27, 2022, 15 pages.

International Search Report for Appln. No. PCT/US2021/055716 mailed Mar. 22, 2022, 21 pages.

International Search Report for Appln. No. PCT/US2021/055717 mailed Dec. 20, 2021, 16 pages.

International Search Report for Appln. No. PCT/US2021/055719 mailed Jan. 18, 2022, 17 pages.

International Search Report for Appln. No. PCT/US2021/055722 mailed Jan. 3, 2022, 14 pages.

International Search Report for Appln. No. PCT/US2021/056828 mailed Feb. 23, 2022, 11 pages.

International Search Report for Appln. No. PCT/US2021/056451 mailed Apr. 4, 2022, 33 pages.

International Search Report for Appln. No. PCT/US2021/056827 mailed Feb. 11, 2022, 15 pages.

(56)  References Cited

OTHER PUBLICATIONS

International Search Report for Appln. No. PCT/US2021/056789 mailed Jan. 18, 2022, 18 pages.
International Search Report for Appln. No. PCT/US2021/056787 mailed Aug. 2, 2022, 12 pages.
International Search Report for Appln. No. PCT/US2021/057517 mailed Sep. 6, 2022, 21 pages.
International Preliminary Report for Appln. No. PCT/US2021/055457 mailed May 4, 2023, 14 pages.
International Preliminary Report for Appln. No. PCT/US2021/055458 mailed May 4, 2023, 10 pages.
International Preliminary Report for Appln. No. PCT/US2021/055716 mailed May 4, 2023, 16 pages.
International Preliminary Report for Appln. No. PCT/US2021/055717 mailed May 4, 2023, 11 pages.
International Preliminary Report for Appln. No. PCT/US2021/055719 mailed May 4, 2023, 12 pages.
International Preliminary Report for Appln. No. PCT/US2021/055722 mailed May 4, 2023, 10 pages.
International Preliminary Report for Appln. No. PCT/US2021/056828 mailed May 11, 2023, 8 pages.
International Preliminary Report for Appln. No. PCT/US2021/056451 mailed May 11, 2023, 23 pages.
International Preliminary Report for Appln. No. PCT/US2021/056827 mailed May 11, 2023, 9 pages.
International Preliminary Report for Appln. No. PCT/US2021/056789 mailed May 11, 2023, 11 pages.
International Preliminary Report for Appln. No. PCT/US2021/056787 mailed May 11, 2023, 8 pages.
International Preliminary Report for Appln. No. PCT/US2021/057517 mailed May 11, 2023, 15 pages.
Shanjani "Material Spreading and Compaction in Powder-Based Solid Freeform Fabrication Methods: Mathematical Modeling" Department of Mechanical and Mechatronic Engineering, University of Waterloo, Sep. 10, 2008.
Japanese Office Action for Application No. 2023-521818 dated Feb. 16, 2020 (5 pages with English Translation).
Japanese Office Action for Application No. 2023-521819 dated Feb. 20, 2024 (5 pages with English Translation).
European Patent Office Action for Application No. 21807388.0 dated Mar. 22, 2023 (8 pages).
Japanese Office Action for Application No. 2024-187148 dated Jun. 24, 2025 (# pages with English Translation).
Chinese Office Action for Application No. 202180071835.4 dated Nov. 28, 2025 (15 pages with English Translation).

* cited by examiner

FIG. 8A                    FIG. 8B

PRINTING ASSEMBLIES AND METHODS FOR USING THE SAME

CROSS-REFERENCE TO RELATED APPLICATIONS

This application is a National Stage Entry under 35 U.S.C. § 371 of International Patent Application No. PCT/US2021/055457, filed Oct. 18, 2021, which claims the benefit of U.S. Provisional Patent Application No. 63/093,852, filed Oct. 20, 2020, for "Printing Assemblies and Methods for Using the Same," which is hereby incorporated by reference in its entirety including the drawings.

TECHNICAL FIELD

The present specification generally relates to printing assemblies and, more specifically, to printing assemblies for manufacturing apparatuses and methods for using the same.

BACKGROUND

Printing assemblies may be utilized to "build" an object from build material, such as three-dimensional objects or parts, in a layer-wise manner. Early iterations of printing assemblies were used for prototyping three-dimensional parts. However, as printing assembly technology has improved, there is an increased interest in utilizing printing assemblies for large-scale commercial production of parts. Issues of scaling printing assemblies to commercial production may include, but are not limited to, preventing pressure fluctuations due to spatial separation between nozzles of the printing assemblies and ink reservoirs, preventing inter-container leaks, and preventing defects during priming and de-clogging operations of the printing assemblies.

Generally, printing assemblies utilized in various contexts, including, for example, manufacturing applications, jet printing applications, and other printing types include parallel issues to those described above. For example, manufacturing apparatuses generally include printing assemblies, also referred to as printhead devices, which deposit materials through an array of jet nozzles during a manufacturing process. These printhead devices typically utilize a manifold having dual containers for inlet and outlet flow control to individual print heads. However, these manifolds require precise control over pressure while driving fluid flow through the manifold and the individual print heads to recirculate material therethrough. Further, these printhead devices do not permit control over the flow of material between the manifold and the individual print heads. Without this independent control, individual print heads cannot be isolated during priming and de-clogging operations, which wastes material and time. Additionally, insufficient pressure may be directed toward clogged print heads without the ability to selectively control which of the print heads are opened and closed to control the flow of material therethrough.

Accordingly, a need exists for alternative printing assemblies and components thereof which prevent leaks within a manifold of a printing assembly and independent control over the flow of material to and from a print head.

SUMMARY

A first aspect A1 is directed to a printing assembly comprising: a manifold assembly comprising: an inlet manifold comprising an inlet reservoir and a plurality of inlet ports; an outlet manifold comprising an outlet reservoir and a plurality of outlet ports; a plurality of inlet valves within the inlet manifold; a plurality of outlet valves within the outlet manifold; and a printing head comprising: a housing; and a plurality of print heads provided within the housing, each of the plurality of print heads in fluid communication with the inlet reservoir via a corresponding one of the plurality of inlet ports and the outlet reservoir via a corresponding one of the plurality outlet ports, wherein each of the plurality of inlet valves and the plurality of outlet valves is independently operable to permit or prevent a flow of binder material from the inlet reservoir to a corresponding one of the plurality of print heads, and from a corresponding one of the plurality of print heads to the outlet reservoir, respectively.

A second aspect A2 includes the printing assembly according to aspect A1, wherein the manifold assembly is provided within the housing of the printing head.

A third aspect A3 includes the printing assembly according to any of the foregoing aspects A1-A2, further comprising: a plurality of inlet tubes, each of the plurality of inlet tubes coupling a corresponding one of the plurality of print heads to a corresponding one of the plurality of inlet ports; and a plurality of outlet tubes, each of the plurality of outlet tubes coupling a corresponding one of the plurality of print heads to a corresponding one of the plurality of outlet ports.

A fourth aspect A4 includes the printing assembly according to any of the foregoing aspects A1-A3, further comprising: a plurality of inlet fittings, each of the plurality of inlet fittings coupled to a corresponding one of the plurality of inlet ports, the plurality of inlet fittings being arranged in an alternating angular orientation; and a plurality of outlet fittings, each of the plurality of outlet fittings coupled to a corresponding one of the plurality of outlet ports, the plurality of outlet fittings being arranged in an alternating angular orientation.

A fifth aspect A5 includes the printing assembly according to any of the foregoing aspects A1-A4, wherein the inlet manifold is separable from the outlet manifold.

A sixth aspect A6 includes the printing assembly according to any of the foregoing aspects A1-A5, further comprising a plurality of actuators, each one of the plurality of actuators coupled directly to a corresponding one of the plurality of the inlet valves or a corresponding one of the plurality of outlet valves for moving the corresponding valve between an open position and a closed position.

A seventh aspect A7 includes the printing assembly according to any of the foregoing aspects A1-A6, further comprising: a first bypass port through the inlet manifold; a second bypass port through the outlet manifold; and a bypass line fluidly coupling the first bypass port to the second bypass port for allowing binder material to flow from the inlet reservoir to the outlet reservoir without passing through any one of the plurality of print heads.

An eighth aspect A8 includes the printing assembly according to aspect A7, wherein at least one of the first and second bypass ports is coupled to a corresponding bypass valve operable between an open position to permit binder material to flow into the outlet reservoir from the inlet reservoir and a closed position to prevent binder material from flowing into the outlet reservoir from the inlet reservoir.

A ninth aspect A9 includes the printing assembly according to any of the foregoing aspects A1-A8, wherein each of the plurality of inlet valves and the plurality of outlet valves comprises a receptacle and a plunger received within the receptacle, the plunger movable between a raised position when the corresponding valve is in the open position, and a lowered position when the corresponding valve is in the closed position.

A tenth aspect A10 includes the printing assembly according to aspect A9, wherein the plunger includes an seal provided at an end of the plunger opposite the receptacle for creating a seal between the plunger and an associated port when the plunger is in the lowered position.

An eleventh aspect A11 includes the printing assembly according to aspect A9, wherein each of the plurality of inlet valves and the plurality of outlet valves comprises a proximity sensor within the receptacle for detecting whether the plunger is in the open position or the closed position.

A twelfth aspect A12 includes the printing assembly according to any of the foregoing aspects A1-A11, wherein each of the plurality of inlet valves and the plurality of outlet valves comprises a pneumatic actuator for switching between the open position and the closed position.

A thirteenth aspect A13 includes the printing assembly according to any of the foregoing aspects A1-A12, wherein each of the valves comprises an electric actuator for switching between the open position and the closed position.

A fourteenth aspect A14 includes the printing assembly according to any of the foregoing aspects A1-A13, further comprising a fluid level float in at least one of the inlet manifold and the outlet manifold for sensing a level of material.

A fifteenth aspect A15 includes the printing assembly according to aspect A14, wherein the fluid level float is configured to detect a level of binder material within the manifold assembly, the fluid level float configured to transmit a signal to a control system for performing an alarm function if the level of binder material exceeds a predetermined threshold.

A sixteenth aspect A16 includes the printing assembly according to aspect A14, wherein the fluid level float is an analog float configured to continuously monitor the level of binder material.

A seventeenth aspect A17 includes the printing assembly according to aspect A14, wherein the inlet manifold and the outlet manifold each comprises a first fluid level float and a second fluid level float, the first fluid level float configured to detect when the binder material exceeds a predetermined low threshold and the second fluid level float configured to detect when the binder material exceeds predetermined high threshold.

An eighteenth aspect A18 includes the printing assembly according to any of the foregoing aspects A1-A17, further comprising a fluid level monitoring device to enable visual monitoring of a level of binder material in at least one of the inlet manifold and the outlet manifold.

A nineteenth aspect A19 includes the printing assembly according to any of the foregoing aspects A1-A18, further comprising a holding bracket configured to secure the inlet manifold and the outlet manifold to one another relative to the printing head.

A twentieth aspect A20 includes the printing assembly according to any of the foregoing aspects A1-A19, wherein at least one of the plurality of inlet valves and the plurality of outlet valves comprises a camshaft including at least one lobe, wherein the rotation of the camshaft moves the lobe to open or close a corresponding one of the plurality of inlet ports or the plurality of outlet ports.

A twenty-first aspect A21 includes the printing assembly according to aspect A20, wherein the camshaft is coupled to a rotary actuator.

A twenty-second aspect A22 includes the printing assembly according to aspect A21, wherein the camshaft has a plurality of lobes associated with at least one of a corresponding one of the plurality of inlet ports or the plurality of outlet ports such that the corresponding one of the plurality of inlet ports or the plurality of outlet ports may be opened or closed a plurality of times during a single complete rotation of the camshaft.

A twenty-third aspect A23 includes the printing assembly according to any of the foregoing aspects A1-A22, further comprising a vacuum provided within at least one of the inlet manifold and the outlet manifold, wherein the at least one vacuum establishes a pressure differential between the inlet manifold and the outlet manifold.

A twenty-fourth aspect A24 includes the printing assembly according to aspect A23, wherein: the pressure differential during a normal operation ranges from −1.0 psi to 0.0 psi; and the pressure differential during a purging operation ranges from 0.7 psi to 2 psi.

A twenty-fifth aspect A25 includes the printing assembly according to any of the foregoing aspects A1-A24, wherein the printing assembly is mounted on a traversing stage for indexing the printing assembly.

A twenty-sixth aspect A26 is directed to a manufacturing apparatus comprising: the printing assembly of any of the foregoing aspects A1-A25; and at least one binder reservoir for providing binder material directly to at least one of the inlet manifold and the outlet manifold and receiving binder material from at least one of the inlet manifold and the outlet manifold.

A twenty-seventh aspect A27 is directed to a method for de-clogging a print head of a printing head assembly, the method comprising: providing a manifold assembly comprising: an inlet manifold for delivering binder material to a plurality of print heads, each of the plurality of print heads coupled to the inlet manifold via a corresponding one of a plurality of inlet ports, one of a plurality of inlet valves provided at each of the plurality of inlet ports; and an outlet manifold for receiving unused binder material from the plurality of print heads, each of the plurality of print heads coupled to the outlet manifold via a corresponding one of a plurality of outlet ports, one of a plurality of outlet valves provided at each of the plurality of outlet ports, wherein the inlet manifold has a first pressure and the outlet manifold has a second pressure, and a pressure differential is present between the inlet manifold and the outlet manifold; closing at least one of the plurality of inlet valves, by a control unit, to prevent binder material from flowing from the inlet manifold to the corresponding print head while at least another one of the plurality of inlet valves is open; and applying a positive pressure effective to adjust the pressure differential between the inlet manifold and the outlet manifold, thereby causing the binder material to flow through only the inlet ports with an associated inlet valve in the open position to de-clog an associated print head.

A twenty-eighth aspect A28 includes the method according to aspect A27, further comprising: opening the at least one closed inlet valves; closing at least one of the open inlet valves; and applying a positive pressure effective to de-clog a different one of the plurality of print heads.

A twenty-ninth aspect A29 includes the method according to aspect A28, wherein: the positive pressure ranges from 0.7 psi to 2 psi; a normal operating pressure ranges from −1.0 psi to 0.0 psi; and the positive pressure is based on the number of inlet valves that are opened.

A thirtieth aspect A30 includes the method according to any of the foregoing aspects A27-A29, further comprising closing all but one of the plurality of inlet valves such that only one of the plurality of inlet valves is open.

A thirty-first aspect A31 includes the method according to any of the foregoing aspects A27-A30, further comprising activating a pump at the binder reservoir to direct binder material to the inlet manifold and through the corresponding one of the plurality of inlet ports with the inlet valve in the open position to de-clog an associated print head.

A thirty-second aspect A32 includes the method according to any of the foregoing aspects A27-A31, wherein: the inlet manifold comprises a first bypass port; the outlet manifold comprises a second bypass port; a bypass valve is associated with one of the first bypass port and the second bypass port; the method further comprising: closing each of the plurality of inlet valves and the plurality of outlet valves; opening the bypass valve; and applying a vacuum to remove air from the manifold assembly.

A thirty-third aspect A33 is directed to a method for circulating binder material through a printing assembly, the method comprising: providing a manifold assembly comprising: an inlet manifold comprising an inlet reservoir and a plurality of inlet ports; an outlet manifold comprising an outlet reservoir and a plurality of outlet ports; a plurality of inlet valves within the inlet manifold; and a plurality of outlet valves within the outlet manifold, each of the plurality of inlet valves and the plurality of outlet valves is independently operable; delivering binder material to the inlet manifold or the outlet manifold from at least one binder reservoir; receiving binder material from the inlet manifold or the outlet manifold at the at least one binder reservoir; and applying a pressure differential across the inlet manifold and the outlet manifold, the pressure differential controllable based on operation of each of the plurality of inlet valves and the plurality of outlet valves.

A thirty-fourth aspect A34 includes the method according to aspect A33, further comprising: determining whether a level of binder material in at least one of the inlet manifold and the outlet manifold is above or below a predetermined threshold.

A thirty-fifth aspect A35 includes the method according to any of the foregoing aspects A33-A34, further comprising: determining that a level of binder material within the inlet manifold is above a predetermined threshold; and responsive to the determining, decreasing a rate of binder material being provided into the inlet manifold from the at least one reservoir, increasing a rate of binder material being drawn out of the inlet manifold toward the at least one reservoir, or both.

A thirty-sixth aspect A36 includes the method according to any of the foregoing aspects A33-A35, further comprising: determining that a level of binder material within the inlet manifold is below a predetermined threshold; and responsive to the determining, increasing a rate of binder material being provided into the inlet manifold from the at least one reservoir, decreasing a rate of binder material being drawn out of the inlet manifold toward the return reservoir, or both.

A thirty-seventh aspect A37 includes the method according to any of the foregoing aspects A33-A36, further comprising: providing a fluid level float in the inlet manifold; determining that a level of binder material within the inlet manifold is above a predetermined threshold; and increasing an output rate of binder material from the outlet manifold to the at least one binder reservoir.

A thirty-eighth aspect A38 includes the method according to any of the foregoing aspects A33-A37, further comprising: providing a fluid level float in the inlet manifold determining that a level of binder material within the inlet manifold is below a predetermined threshold; and decreasing an output rate of binder material from the outlet manifold to the at least one binder reservoir.

A thirty-ninth aspect A39 is directed to a method of priming a printing head assembly comprising a plurality of print heads, the method comprising: providing a manifold assembly comprising: an inlet manifold for delivering binder material to a plurality of print heads, each of the plurality of print heads coupled to the inlet manifold via a corresponding one of a plurality of inlet ports, one of a plurality of inlet valves provided at each of the plurality of inlet ports; and an outlet manifold for receiving unused binder material from the plurality of print heads, each of the plurality of print heads coupled to the outlet manifold via a corresponding one of a plurality of outlet ports, one of a plurality of outlet valves provided at each of the plurality of outlet ports, wherein the inlet manifold has a first pressure and the outlet manifold has a second pressure; closing all of the plurality of inlet valves and the plurality of outlet valves, by a control unit, to prevent binder material from flowing from the inlet manifold to the corresponding print head and from the corresponding print head to the outlet manifold; opening a bypass valve to allow for binder material to flow from the inlet manifold to the outlet manifold; and changing at least one of the first pressure and the second pressure to establish a pressure differential between the inlet manifold and the outlet manifold.

A fortieth aspect A40 includes the method according to aspect A39, wherein: the pressure differential during a normal operation ranges from −1.0 psi to 0.0 psi; and the pressure differential during a purging operation ranges from 0.7 psi to 2 psi.

A forty-first aspect A41 includes the method according to any of the foregoing aspects A39-A40, wherein changing at least one of the first pressure and the second pressure comprises providing binder material to the outlet manifold from the inlet manifold through the bypass valve.

A forty-second aspect A42 includes the method according to any of the foregoing aspects A39-A41, wherein changing at least one of the first pressure and the second pressure comprises applying a vacuum to at least one of the inlet manifold and the outlet manifold.

A forty-third aspect A43 includes the method according to any of the foregoing aspects A39-A42, wherein changing at least one of the first pressure and the second pressure comprises supplying binder material from a supply reservoir to at least one of the inlet manifold and the outlet manifold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
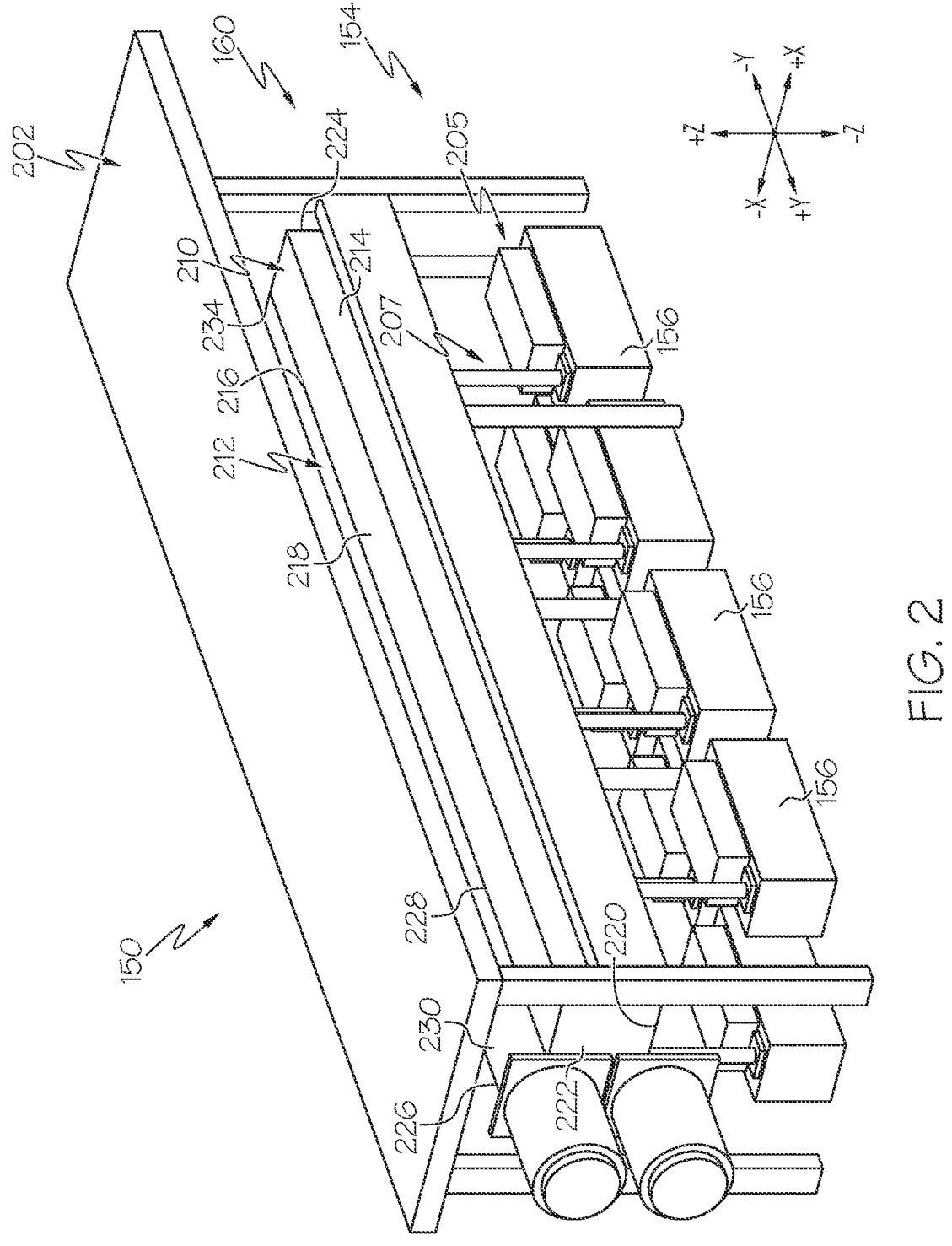
FIG. 2 schematically depicts a perspective view of an embodiment of a printing assembly including a printing head and an embodiment of a manifold assembly according to one or more embodiments shown and described herein.

Reference will now be made in detail to embodiments of manufacturing apparatuses, and components thereof, examples of which are illustrated in the accompanying drawings. Whenever possible, the same reference numerals will be used throughout the drawings to refer to the same or like parts. Embodiments of a printing assembly, an example of which is schematically depicted in FIG. 2, include a manifold assembly including an inlet manifold and an outlet manifold. The inlet manifold includes an inlet reservoir and an inlet port. An inlet valve is provided at the inlet port of the inlet reservoir. The outlet manifold similarly includes an outlet reservoir and an outlet port. An outlet valve is provided at the outlet port of the outlet reservoir. A print head is in fluid communication with each of the inlet reservoir and the outlet reservoir such that the inlet valve and the outlet valve independently operable to permit a flow of material from the inlet reservoir to the print head and from the print head to the outlet reservoir, respectively.

Various embodiments of printing assemblies for manufacturing apparatuses, manufacturing apparatuses comprising the printing assemblies, and methods for using the same are described in further detail herein with specific reference to the appended drawings. It should be understood that the embodiments of the manufacturing apparatuses shown and described herein may be configured and operable to build three-dimensional and/or non-three dimensional objects or parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Directional terms as used herein, for example up, down, right, left, front, back, top, above, bottom, forward, reverse, and return are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

Manufacturing Apparatus

Embodiments described herein are directed to manufacturing apparatuses (e.g., additive manufacturing apparatuses) and components for manufacturing apparatuses, specifically printing assemblies for depositing binder and other jettable materials. Various embodiments described herein may be implemented to prevent, for example, pressure fluctuations due to spatial separation between nozzles of printing assemblies and ink reservoirs, inter-container leaks, and defects during priming and de-clogging operations of printing assemblies. It is understood that technology developed and described herein relates to manufacturing, however, aspects of the technology may have applications in related industries such as 2-D printing or the like.

Figure 1:
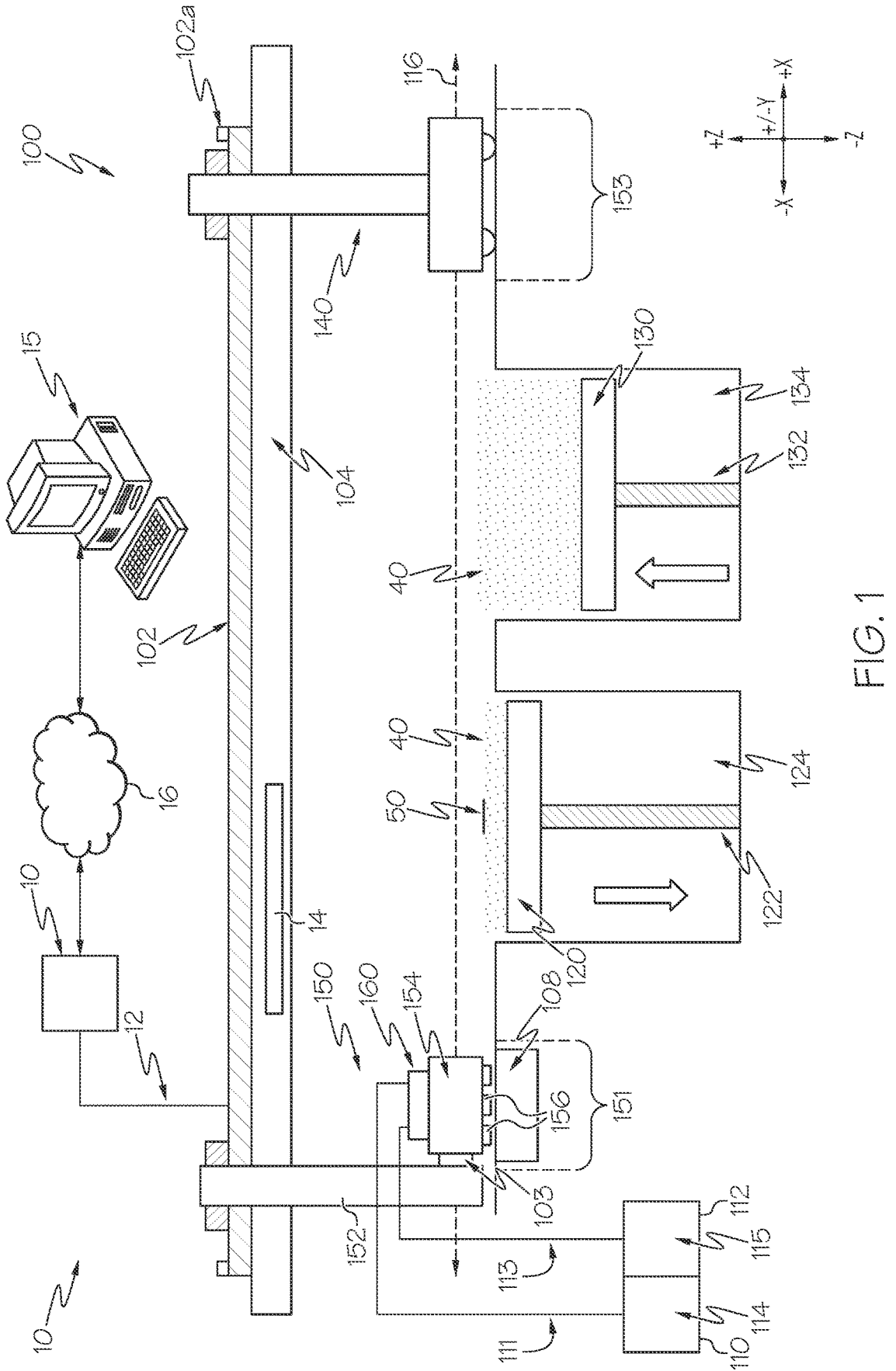
FIG. 1 schematically depicts an embodiment of a manufacturing apparatus according to one or more embodiments shown and described herein.

Referring now to FIG. 1, an embodiment of a manufacturing apparatus 100 is schematically depicted. The manufacturing apparatus 100 includes a cleaning station 108, a build area 120, a supply platform 130, a recoat assembly 140, and a printing assembly 150. The recoat assembly 140 and the printing assembly 150 are coupled to a rail 104 of the manufacturing apparatus 100 and are configured to translate along the rail 104 in response to an actuation of a first actuator assembly 102. The first actuator assembly 102 may be constructed to facilitate independent control of the recoat assembly 140 and the printing assembly 150 along a working axis 116 of the manufacturing apparatus 100. The working axis 116 is also referred to herein as the "longitudinal axis" (i.e., extending along the +/−X axis of the coordinate axes as depicted in the figures). This allows for the recoat assembly 140 and the printing assembly 150 to traverse the working axis 116 of the manufacturing apparatus 100 in the same direction and/or in opposite directions and for the recoat assembly 140 and the printing assembly 150 to traverse the working axis 116 of the manufacturing apparatus 100 at different speeds and/or the same speed.

In the embodiments described herein, the cleaning station 108, the build area 120, the supply platform 130, the recoat assembly 140, and the printing assembly 150 are positioned in series along the working axis 116 of the manufacturing apparatus 100 between a home position 151 of the printing assembly 150, located proximate an end of the working axis 116 in the —X direction, and a home position 153 of the recoat assembly 140, located proximate an end of the working axis 116 in the +X direction. In embodiments, the build area 120 is positioned between the cleaning station 108 and the supply platform 130 along the working axis 116 of the manufacturing apparatus 100.

In embodiments, a second actuator assembly 103 may be constructed to facilitate independent control of the printing assembly 150 along a latitudinal axis (i.e., extending along the +/−Y axis of the coordinate axes as depicted in the figures), which is generally perpendicular to the longitudinal axis (i.e., the working axis 116). The first actuator assembly 102 and the second actuator assembly 103 are generally referred to as a printing head position control assembly. That is, the printing head position control assembly includes the first actuator assembly 102 configured to move the printing head along the longitudinal axis and a second actuator assembly 103 configured to move the printing head along a latitudinal axis. The printing head position control assembly may be controlled via signals generated by a control system 10 such as an electronic control unit. The electronic control unit may include a processor and a non-transitory computer readable memory.

The printing assembly 150 comprises, among other features, a support bracket 152, a printing head 154, and a plurality of print heads 156. The support bracket 152 is movably coupled to the rail 104 and the first actuator assembly 102 of the manufacturing apparatus 100 while the printing head 154 is movably coupled to the support bracket 152 via the second actuator assembly 103.

Each print head 156 comprises one or more jet nozzles. When a plurality of jet nozzles are incorporated into a print head 156, the plurality of jet nozzles are spaced apart from one another. The plurality of jet nozzles are spaced apart from one another in a direction transverse to a longitudinal axis, where a distance from a first jet nozzle to a second jet nozzle positioned adjacent the first jet of the plurality of jets defines a jet-spacing. By way of example only, each of the print heads 156 may include a plurality of jet nozzles from about 5,000 nozzles to about 6,000 nozzles, with each jet nozzle spaced apart from another by about $\frac{1}{1150}$ inch from one another. Other jet nozzle spacing is possible and contemplated.

The recoat assembly 140 is constructed to facilitate a distribution of a build material 40 over the build area 120 and the supply platform 130. The build area 120 is coupled to a build platform actuator 122 to facilitate raising and lowering the build area 120 relative to the working axis 116 of the manufacturing apparatus 100 in a vertical direction (i.e., a direction parallel to the +/−Z axis of the coordinate axes depicted in the figures). The build area 120 and build platform actuator 122 are positioned in a build receptacle 124 located below the working axis 116 (i.e., in the −Z direction of the coordinate axes depicted in the figures) of the manufacturing apparatus 100. During operation of the manufacturing apparatus 100, the build area 120 is retracted into the build receptacle 124 by action of the build platform actuator 122 after each layer of binder material 50 is deposited on the build material 40 located on the build area 120.

Still referring to FIG. 1, the supply platform 130 is coupled to a supply platform actuator 132 to facilitate raising and lowering the supply platform 130 relative to the working axis 116 of the manufacturing apparatus 100 in a vertical direction (i.e., a direction parallel to the +/−Z axis of the coordinate axes depicted in the figures). The supply platform 130 and supply platform actuator 132 are positioned in a supply receptacle 134 located below the working axis 116 (i.e., in the −Z direction of the coordinate axes depicted in the figures) of the manufacturing apparatus 100. During operation of the manufacturing apparatus 100, the supply platform 130 is raised relative to the supply receptacle 134 and towards the working axis 116 of the manufacturing apparatus 100 by action of the supply platform actuator 132 after a layer of build material 40 is distributed from the supply platform 130 to the build area 120, as will be described in further detail herein. However, it should be understood that, in other embodiments, the manufacturing apparatus 100 does not include a supply platform 130, such as in embodiments where build material is supplied to the build area 120 with, for example and without limitation, a build material hopper.

As will be described in greater detail herein, the printing assembly 150 is constructed to facilitate a deposition of a binder material 50 and/or other jettable composition materials (e.g., ink, fluid medium, colorant, nanoparticles, fluorescing particles, sintering aids, anti-sintering aids, etc.) over the layer of build material 40 in the build area 120 as the printing assembly 150 traverses the build area 120 along the working axis 116 of the manufacturing apparatus 100.

Still referring to FIG. 1, the cleaning station 108 is positioned proximate one end of the working axis 116 of the manufacturing apparatus 100 and is co-located with the home position 151 where the printing assembly 150 is located or "parked" before and after depositing a binder material 50 on a layer of build material 40 positioned on the build area 120. The cleaning station 108 may include one or more cleaning sections to facilitate cleaning the printing assembly 150, and in particular a plurality of print heads 156 of the printing assembly 150 between depositing operations. The cleaning sections may include, for example and without limitation, a soaking station containing a cleaning solution for dissolving excess binder material 50 from the plurality of print heads 156, a wiping station for removing excess binder material 50 from the plurality of print heads 156, a jetting station for purging binder material 50 and cleaning solution from the plurality of print heads 156, a capping station for maintaining moisture in a plurality of jet nozzles of the plurality of print heads 156, or various combinations thereof. The printing assembly 150 may be transitioned between the cleaning sections by the first actuator assembly 102. In embodiments, the manufacturing apparatus 100 may include a jetting test area positioned proximate to one end of the working axis 116 adjacent to the cleaning station 108 and/or the home position 151. Although not shown, it should be understood that the jetting test area of the manufacturing apparatus 100 may be configured to facilitate a binder material deposition by the printing assembly 150 prior to performing a deposition along the build area 120. Additional information on cleaning stations in manufacturing apparatuses can be found in PCT Application No. PCT/US20/34144, filed on May 22, 2020, and entitled "Cleaning Systems for Additive Manufacturing Apparatuses and Methods for Using the Same," the entirety of which is hereby incorporated by reference.

Still referring to FIG. 1, the manufacturing apparatus 100 may further include a control system 10 communicatively coupled to the first actuator assembly 102, the second actuator assembly 103, the recoat assembly 140, and/or the printing assembly 150. As described in greater detail herein, in embodiments the control system 10 may be particularly coupled to one or more valves of a manifold assembly 160 of the printing assembly 150. In embodiments, the control system 10 is coupled to the manufacturing apparatus 100 via a communication conduit 12, however, it should be understood that in other embodiments the control system 10 may be communicatively coupled to the manufacturing apparatus 100 via various other means or systems, such as, for example, through a wireless connection. The control system 10, which may also be referred to as an electronic control unit, comprises a processor and a non-transitory memory that includes computer readable and executable instructions stored thereon. Any action of the manufacturing apparatus 100, including the actions described herein, may be caused to be performed by the computer readable and executable instructions (e.g., opening and closing valves within the manifold assembly 160) stored in the non-transitory memory of the control system 10 when executed by the processor of the control system 10. For example, one or more actuators may be actuated by the computer readable and executable instructions stored in the non-transitory memory of the control system 10 when executed by the processor of the control system 10 to cause the valves of the manifold assembly 160 to operate in the manner described herein.

In embodiments, the control system 10 may be further communicatively coupled to a computing device 15, optionally via a network 16, or directly via a communication link such as a wired or wireless connection. The computing device 15 may be configured to carry out processes such as generating executable instruction for building a component with the manufacturing apparatus 100, such as by implementing CAD or other related three-dimensional drafting and rendering systems as well as a slicing engine or the like.

As shown in FIG. 1, the manufacturing apparatus 100 further includes at least one supply reservoir 110 and at least one return reservoir 112 fluidly coupled to the manifold assembly 160 of the printing assembly 150 via one or more conduit lines 111, 113, respectively. In embodiments, the supply reservoir 110 is highly pressurized to force binder material into the printing head 154. Although the supply reservoir 110 and the return reservoir 112 are illustrated and discussed herein as being separate components for storing binder material, in embodiments, the supply reservoir 110 and the return reservoir 112 may be the same reservoir, such that binder material from the supply reservoir 110 is circulated back to the supply reservoir 110 instead of to a separate return reservoir 112.

As discussed in more detail hereinbelow, the manifold assembly 160 includes an inlet reservoir and an outlet reservoir for storing the binder material. Each of the inlet reservoir and the outlet reservoir may be in fluid communication with the plurality of print heads 156. In particular, the supply reservoir 110 and the return reservoir 112 are fluidly coupled to each of the plurality of print heads 156 disposed within the printing head 154 of the printing assembly 150 via the manifold assembly 160. The plurality of print heads 156 are recirculation-ready, such that binder material is initially delivered to the plurality of print heads 156 and any unused binder material is drawn back out of the plurality of print heads 156. As will be discussed in greater detail below, the binder material is initially delivered to the inlet reservoir of the manifold assembly 160 from the supply reservoir 110 and, subsequently, delivered to the plurality of print heads 156 from the inlet reservoir of the manifold assembly 160. Any unused binder material is then drawn out of the plurality of print heads 156 and into the outlet reservoir of the manifold assembly 160. Thereafter, the unused binder material is drawn out of the outlet reservoir and delivered into the return reservoir 112.

In embodiments, the first conduit line 111 and the second conduit line 113 may be coupled to one another via a coupling mechanism, such as, for example, a manifold, a valve, and/or the like. In this instance, the reservoirs 110, 112 may be in fluid communication with the coupling mechanism via the conduit lines 111, 113, and the coupling mechanism includes a third conduit line coupled thereto and extending to the printing head 154. The coupling mechanism may be configured to selectively transition fluid communication between the fluid reservoirs 110, 112 and the printing head 154 such that the plurality of print heads 156 receive one of a first material 114 (e.g., fresh binder solution from the supply reservoir 110) or a second material 115 (e.g., recycled binder solution from the return reservoir 112) in response to an actuation of the coupling mechanism. It should be understood that the coupling mechanism may be further configured to facilitate simultaneous fluid communication of the supply reservoir 110 and the return reservoir 112 with the printing head 154 such that the plurality of print heads 156 receive binder material from the supply reservoir 110 and the return reservoir 112 concurrently. Such an arrangement can, for example, enable faster refill of the manifold assembly 160 during and following purging, as will be described below.

General Printing Assembly

Referring now to FIG. 2, an embodiment of the printing assembly 150 is shown. The printing assembly 150 includes a housing 202 at least partially enclosing the printing head 154 and the manifold assembly 160. The printing head 154 includes a plurality of print heads 156 in fluid communication with the manifold assembly 160 to facilitate delivery of binder material from the manifold assembly 160 to each of the print heads 156, and recycling of binder material from each of the print heads 156 back to the manifold assembly 160.

The printing head 154 includes a first print head row 205 and a second print head row 207 positioned along a bottom end of the printing head 154. The print head rows 205, 207 are each sized and shaped to receive at least one print head 156 therein, and in embodiments, each receive a plurality of print heads 156. The print head rows 205, 207 are positioned parallel to one another along a bottom end of the printing head 154 and are sequentially aligned relative to each other in a collinear arrangement. In embodiments, the print heads 156 may move along their corresponding print head rows 205, 207, while in other embodiments, the print heads 156 may be fixed within the printing head 154.

In embodiments, the printing head 154 may include additional or fewer rows of print heads 156 than the embodiment shown in FIG. 2. For example, in embodiments, the printing head 154 of the printing assembly 150 may include one row of print heads 156 or three or more rows of print heads 156. Accordingly, it should be understood that the printing head 154 can include one or more rows of print heads 156, each having one or more print heads 156. Additionally, each of the first print head row 205 and the second print head row 207 can include greater or fewer print heads 156 than as shown.

The plurality of print heads 156 are exposed a bottom end of the housing 202. In embodiments, the plurality of print heads 156 of the first print head row 205 and the second print head row 207 are aligned with the bottom end of the housing 202 such that a faceplate of the plurality of print heads 156 may be flush with the bottom end of the housing 202. In embodiments, the faceplates of the plurality of print heads 156 may be offset relative to one another and relative to the bottom end of the housing 202.

It is contemplated that, in embodiments, the printing assembly 150 may include additional features that are not described herein. In particular, the manifold assemblies described below can be adapted to be included in any one of a number of different printing assemblies, which, in turn, can be used in any one of a number of additive manufacturing apparatuses.

General Manifold Assembly

Figures 3, 4:
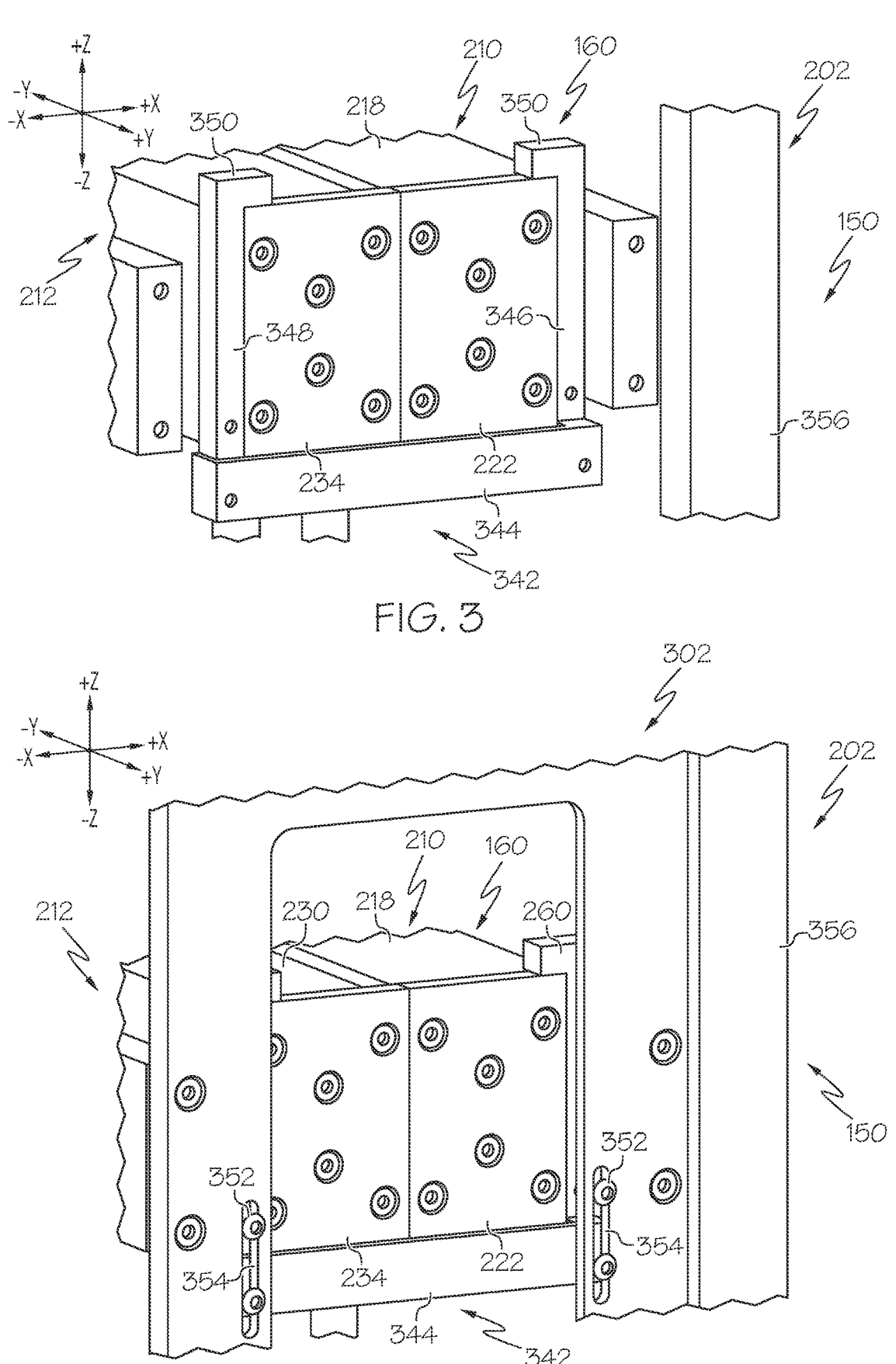
FIG. 3 schematically depicts a partial perspective view of a bracket securing the manifold assembly of FIG. 2 according to one or more embodiments shown and described herein.
FIG. 4 schematically depicts a partial perspective view of the bracket mounted to a housing of the printing assembly of FIG. 2 according to one or more embodiments shown and described herein.

Referring still to FIG. 2, the manifold assembly 160 of various embodiments generally includes an inlet manifold 210 and an outlet manifold 212. The inlet manifold 210 includes a first wall 214, a second wall 216, a top wall 218, a bottom wall 220, and a pair of end walls 222, 224. Similarly, the outlet manifold 212 includes a first wall 226, a second wall 228, a top wall 230, a bottom wall 232, and a pair of end walls 234, 236. Each of the inlet manifold 210 and the outlet manifold 212 may be a substantially one-piece, monolithic structure, such as may be formed through additive manufacturing or injection molding having one or more common walls, or may be formed separately and then sealed together. In embodiments in which the inlet manifold 210 and the outlet manifold 212 are sealed to one another (e.g., each manifold 210, 212 includes its own first wall, second wall, and pair of end walls and has no walls in common), leaks between the inlet manifold 210 and the outlet manifold 212 may be prevented. Moreover, it is contemplated that, in some such embodiments, the inlet manifold 210 and the outlet manifold 212 may be separable from one another (such as is shown in FIG. 3), thus allowing for either one of the inlet manifold 210 and the outlet manifold 212 to be replaced or repaired without manipulating the other of the inlet manifold 210 and the outlet manifold 212. However, it should be appreciated that, in embodiments, the inlet manifold 210 and the outlet manifold 212 may be permanently fixed to one another or formed from a single part. In some such embodiments, the inlet manifold 210 and the outlet manifold 212 may share a common wall that separates the inlet manifold 210 from the outlet manifold 212.

As is best shown in FIGS. 3 and 4, in embodiments, the printing assembly 150 further comprises a holding bracket 342 for securing the inlet manifold 210 and the outlet manifold 212 in a fixed position relative to the housing 202. In embodiments, the holding bracket 342 includes a base member 344 and a pair of side arms 346, 348 extending proximate opposite ends of the base member 344 and positioned on opposite sides of the manifold assembly 160. Each of the side arms 346, 348 includes a finger 350 formed at an end of the side arm 346, 348 opposite the base member 344 conforming to the shape of the manifold assembly 160. Thus, the pair of side arms 346, 348 prevents the inlet manifold 210 and the outlet manifold 212 from separating with respect to one another when the holding bracket 342 is utilized.

In embodiments, the holding bracket 342 further includes at least one adjustment knob 352 for securing the manifold assembly 160 to the housing 202 and adjusting a position of the manifold assembly 160 relative to the housing 202. For example, in embodiments, each of the side arms 346, 348 of the holding bracket 342 includes one or more adjustment knobs 352, provided proximate opposite ends of the base member 344, insertable into respective slots 354 formed in a side member 356 of the housing 202. The adjustment knobs 352 may threadably engage the holding bracket 342 to provide a clamp load between the holding bracket 342 and the housing 202.

Figure 5:
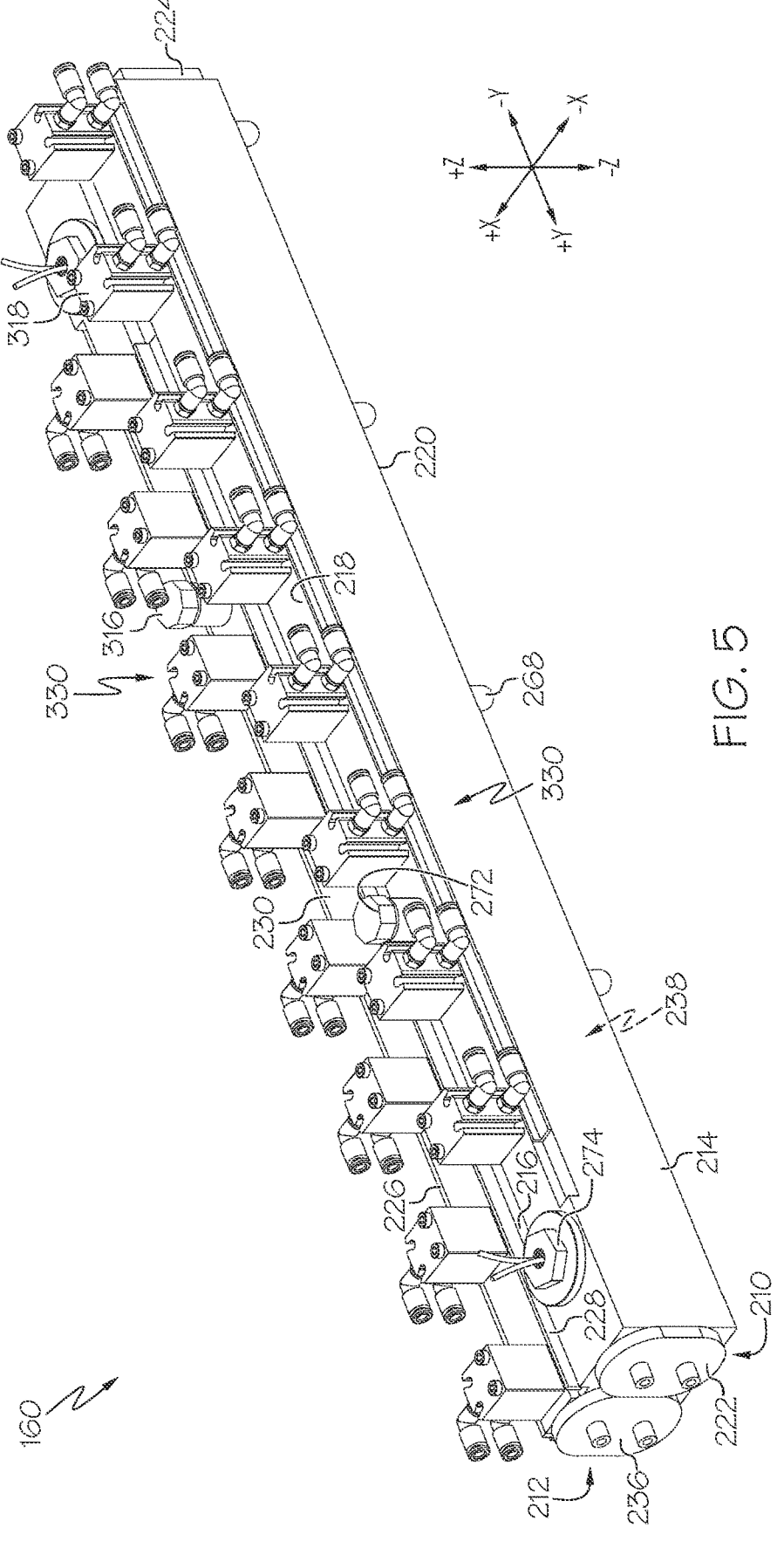
FIG. 5 schematically a perspective view of the manifold assembly of FIG. 2 including a plurality of valves according to one or more embodiments shown and described herein.
Figure 6:
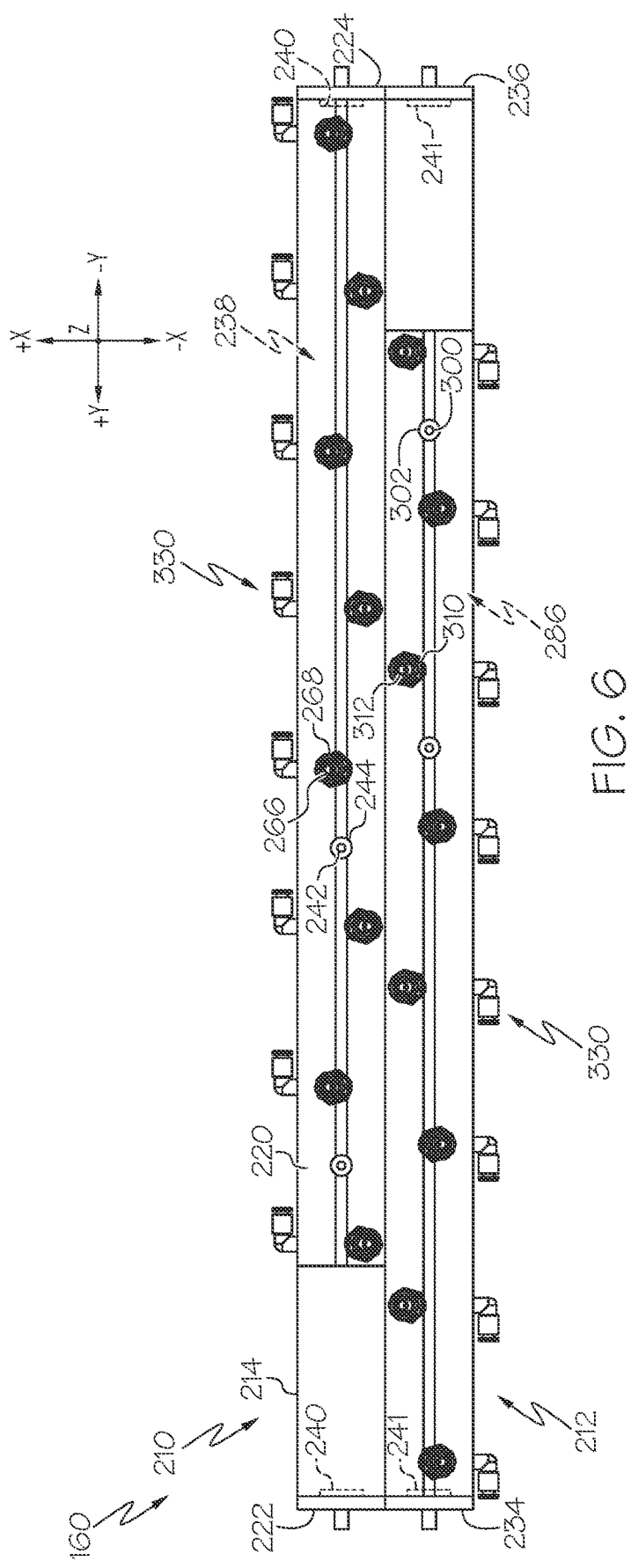
FIG. 6 schematically depicts a bottom plan view of the manifold assembly of FIG. 2 according to one or more embodiments shown and described herein.

Referring now to FIGS. 5 and 6, the inlet manifold 210 of the manifold assembly 160 generally includes an inlet reservoir 238 defined by the first wall 214, the second wall 216, the top wall 218, the bottom wall 220, and the pair of end walls 222, 224 of the inlet manifold 210. In some embodiments, the inlet manifold 210 includes a pair of threaded end caps 240 with an O-ring (not shown) insertable into the inlet manifold 210 at opposite ends of the inlet reservoir 238. The end walls 222, 224 are provided over each of the end caps 240 and secured to the first wall 214, the second wall 216, and the top wall 218 by a plurality of threaded fasteners to further seal the inlet reservoir 238. In embodiments, the end walls 222, 224 may be permanently sealed to the inlet manifold 210 in any suitable manner such as, for example, PVC welded or the like. In some embodiments, the O-ring may be provided between the end walls 222, 224 and an adjacent wall of the inlet manifold 210.

A supply port 242 is formed in the bottom wall 220 of the inlet manifold 210 and is in fluid communication with the inlet reservoir 238. A supply fitting 244 is coupled to the supply port 242. As used herein, the term "port" refers to an aperture or orifice formed through a surface or wall of a structure, and the term "fitting" refers to any suitable connecting member provided at the port and connectable to a tube or conduit line for placing the tube in fluid communication with an interior of the structure. The inlet manifold 210 also includes at least one inlet port 266 formed in the bottom wall 220 of the inlet manifold 210 in fluid communication with the inlet reservoir 238. An inlet fitting 268 is coupled to the inlet port 266. In embodiments, the inlet manifold 210 may include a plurality of inlet ports 266 formed in the bottom wall 220 of the inlet manifold 210 and in fluid communication with the inlet reservoir 238.

In use, binder material flows out of the inlet reservoir 238 through the inlet port 266 and the inlet fitting 268, and to a respective print head 156 via an inlet tube 270. An inlet fitting 268 may be coupled to each inlet port 266 and connected to a respective print head 156 via an associated inlet tube 270 for allowing binder material to flow from the inlet reservoir 238 to each of the print heads 156. As noted above, the length of the inlet tubes 270 may be significantly reduced when the manifold assembly 160 is provided within the housing 202 of the printing assembly 150, thereby reducing the risk of adverse pressure fluctuations through the inlet tubes 270. In embodiments, such as the embodiment depicted in FIG. 7, the inlet fittings 268 may be oriented in an alternating arrangement to accommodate the spatial arrangement of the print heads 156. Specifically, in embodiments, the inlet fittings 268 alternate between being directed toward the different rows of print heads 156. To normalize and/or supply pressure within the inlet reservoir 238 and provide ventilation, an inlet vacuum 272 is provided in the top wall 218 of the inlet manifold 210 and in fluid communication with the inlet reservoir 238.

As shown in FIG. 5, in embodiments, the inlet manifold 210 also includes at least one fluid level float 274 provided within the inlet reservoir 238. As described in more detail herein, the at least one fluid level float 274 in the inlet manifold 210 is configured to sense a level of binder material within the inlet reservoir 238 and is configured to send a signal to the control system 10 of the manufacturing apparatus 100 to perform an action and/or alarm function when the level of binder material within the inlet reservoir

238 falls below or rises above a predetermined threshold. As a non-limiting example of an action or alarm function, the signal may instruct the printing assembly 150 to cease the printing or build operation for a predetermined period of time to permit recovery or maintenance.

Similar to the inlet manifold 210, the outlet manifold 212 includes an outlet reservoir 286 defined by the first wall 226, the second wall 228, the top wall 230, the bottom wall 232, and the pair of end walls 234, 236. The outlet reservoir 286 stores unused binder material received from the print heads 156 (e.g., binder material that is not jetted by the print heads 156). A return port 300 is formed in the bottom wall 232 of the outlet manifold 212 and in fluid communication with the outlet reservoir 286. A return fitting 302 is coupled to the return port 300. The outlet manifold 212 also includes at least one outlet port 310 formed in the bottom wall 232 of the outlet manifold 212 in fluid communication with the outlet reservoir 286. An outlet fitting 312 is coupled to the outlet port 310. In embodiments, the outlet manifold 212 may include a plurality of outlet ports 310 formed in the bottom wall 232 of the outlet manifold 212 and in fluid communication with the outlet reservoir 286. In some embodiments, the outlet manifold 212 includes a pair of threaded end caps 241 with an O-ring (not shown) insertable into the outlet manifold 212 at opposite ends of the outlet reservoir 286.

Figure 7:
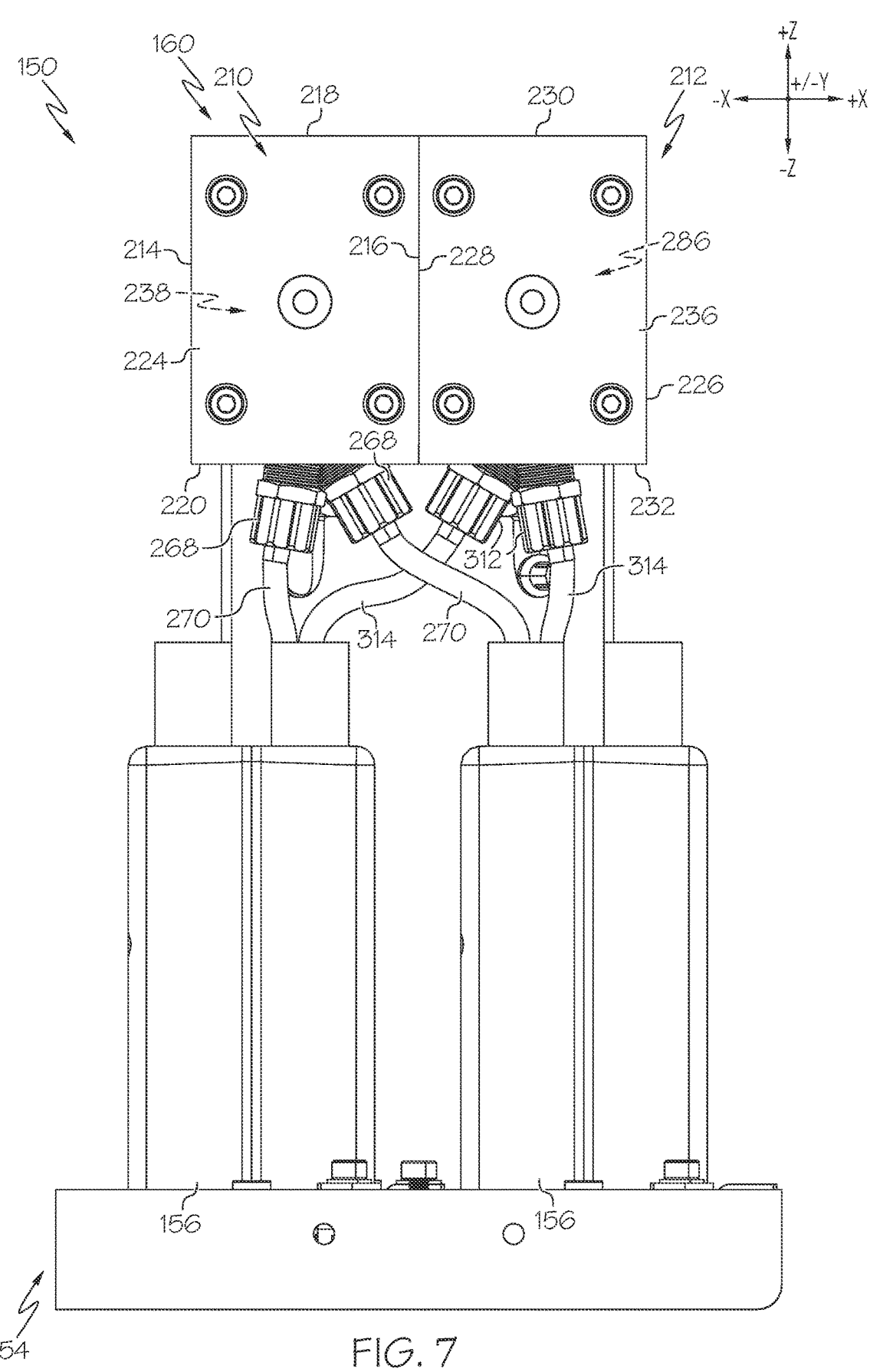
FIG. 7 schematically depicts a partial end view of the printing assembly of FIG. 2 according to one or more embodiments shown and described herein.

In use, binder material flows from a respective print head 156 via an outlet tube 314 to the outlet reservoir 286 through the outlet port 310 and the outlet fitting 312. An outlet fitting 312 may be coupled to each outlet port 310 and connected to a respective print head 156 via an associated outlet tube 314 for allowing binder material to flow from the outlet reservoir 286 to each of the print heads 156. As with the inlet fittings 268, the outlet fittings 312 may be oriented in an alternating arrangement to accommodate the spatial arrangement of the print heads 156, as shown in FIG. 7. Specifically, in embodiments, the outlet fittings 312 alternate between being directed toward the different rows of print heads 156. To normalize and/or supply pressure within the inlet reservoir 238 and provide ventilation, an outlet vacuum 316 is provided in the top wall 230 of the outlet manifold 212, as shown in FIG. 5, and in fluid communication with the outlet reservoir 286.

The inlet vacuum 272 and the outlet vacuum 316 generate a pressure differential between the inlet manifold 210 and the outlet manifold 212 to control the flow of binder material to and from each of the print heads 156 through the inlet ports 266 and the outlet ports 310. In some embodiments, during a normal operation, a normal pressure differential between the inlet manifold 210 and the outlet manifold 212 may be from greater than −1.0 pounds per square inch (psi) to less than or equal to 0.0 psi. This provides a negative pressure within the inlet manifold 210 and the outlet manifold 212 to create a vacuum. During a purging or de-clogging operation to de-clog a clogged print head 156, a purging pressure differential between the inlet manifold 210 and the outlet manifold 212 may be increased from the normal pressure differential. In some embodiments, the purging pressure differential may be up to 2.0 psi or greater. However, the particular pressure differentials may vary depending on the particular embodiment. In addition, the particular pressure differentials may be based on the specific demands of the active (open) print heads 156, i.e., the amount of binder material required for each print head 156. Moreover, the particular pressure differentials may be based on a size of the inlet manifold 210 and the outlet manifold 212 relative to the size of the nozzles of the print heads 156.

As shown in FIG. 5, similar to the inlet manifold 210, the outlet manifold 212 may include at least one fluid level float 318 provided within the outlet reservoir 286. The at least one fluid level float 318 in the outlet manifold 212 is configured to sense a level of binder material within the outlet reservoir 286 and is configured to send a signal to the control system 10 of the manufacturing apparatus 100 to perform an action and/or alarm function when the level of binder material within the outlet reservoir 286 falls below or rises above a predetermined threshold. The fluid level float 274 in the inlet manifold 210 and the fluid level float 318 in the outlet manifold 212 may be, for example, an optical device, an ultrasonic device, or the like. Further, it should be noted that the fluid level within each of the inlet manifold 210 and the outlet manifold 212 may, in addition to or in lieu of the fluid level floats 274, 318, be monitored by an external sensor such as, for example, an optical device, ultrasonic device, or the like, and communicatively coupled to the control system 10.

In embodiments, the fluid level floats 274, 318 of the inlet manifold 210 and the outlet manifold 212, respectively, may each include a temperature sensor for detecting a temperature of the binder material therein. However, it should be appreciated that, in embodiments, the temperature sensor may be separate from the fluid level floats 274, 318 and communicatively coupled to the control system 10. The temperature sensor in each of the inlet manifold 210 and the outlet manifold 212 may be configured to detect a temperature of the binder material and send a signal to the control system 10 to activate an alert and/or cause the manifold assembly to cease a printing operation if the temperature of the binder exceeds or falls below a threshold temperature.

Refilling the inlet manifold 210 can result in pressure fluctuations within the inlet manifold 210 and the outlet manifold 212, which may have an adverse effect on the print quality during a printing operation. Thus, in embodiments, the fluid level floats 274, 318 each have a control relay to prevent refilling of the inlet manifold 210 and the outlet manifold 212 during a printing operation. Specifically, the fluid level float 274 does not send a signal to permit additional binder material to flow into the inlet reservoir 238 while the manifold assembly 160 is actively performing a printing operation, i.e., the printing assembly 150 (FIG. 1) is moving along the working axis 116 across the build area 120. Similarly, the fluid level float 318 does not send a signal to permit additional binder material to flow out of the outlet reservoir 286 while the manifold assembly 160 is actively performing a printing operation. Rather, the control relay of the fluid level floats 274, 318 will delay sending the signal until the manifold assembly 160 has completed a pass over the build area 120, i.e., returned to the home position 151.

Referring still to FIG. 5, the manifold assembly 160 includes at least one valve 330 operable between an open position for permitting or controlling the flow of binder material through a portion of the manifold assembly 160, and a closed position for preventing the flow of binder material through a portion of the manifold assembly 160. As used herein the term "control" when referring to a valve controlling a flow of binder material may be understood as permitting and/or preventing the flow of binder material. Further, in embodiments, controlling the flow of binder material may refer to reducing and/or increasing a flow rate or volume of binder material. It should be appreciated that any number of valves 330 may be provided to selectively and individually permit the flow of binder material both in and out of ports of the inlet reservoir 238 and the outlet reservoir 286. In various embodiments described herein, the at least one valve 330 is provided within the manifold assembly 160.

As shown in FIGS. 5 and 6, the inlet manifold 210 includes at least one valve 330 associated with a respective inlet port 266 for permitting the flow of binder material from the inlet reservoir 238 to a respective print head 156 through the inlet port 266. In embodiments, the inlet manifold 210 includes a valve 330 associated with each one of the plurality of inlet ports 266. The outlet manifold 212 also includes at least one valve 330 associated with a respective outlet port 310. In embodiments, the outlet manifold 212 includes a valve 330 associated with each one of the plurality of outlet ports 310.

Figure 8:
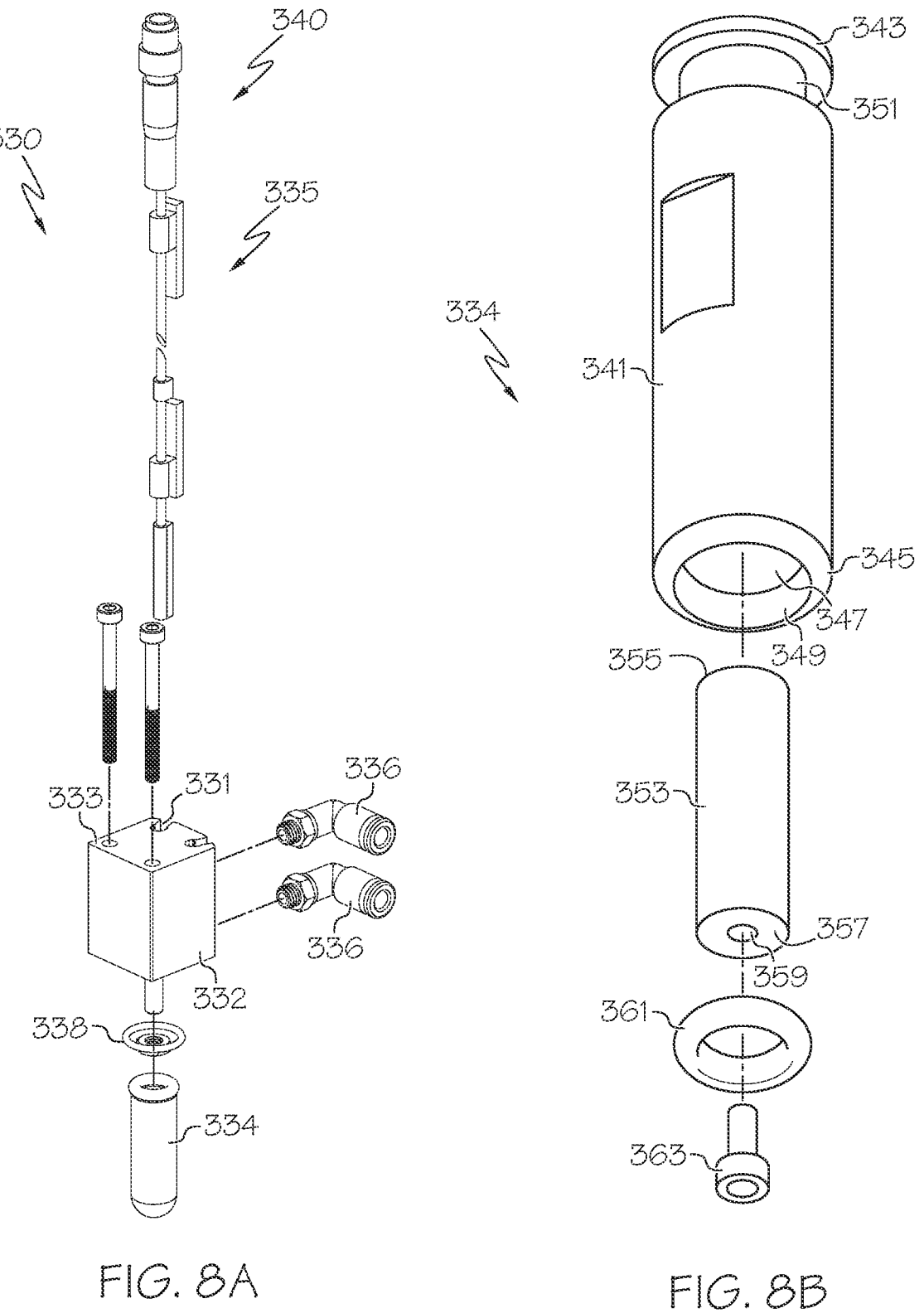
FIG. 8A schematically depicts an exploded view of a valve of the manifold assembly of FIG. 5 according to one or more embodiments shown and described herein.
FIG. 8B schematically depicts a perspective view of a plunger of the valve according to one or more embodiments shown and described herein.

The valve 330 may be configured in any one of a number of valve configurations. As shown in FIG. 8A, the valve 330 generally includes a receptacle 332 and a plunger 334 received within the receptacle 332. In embodiments, the valve 330 is a pneumatic actuator including a pair of pressure ports 336, wherein a first of the pressure ports 336 is utilized for pneumatically moving the plunger 334 to a raised position, and a second of the pressure ports 336 is utilized for pneumatically moving the plunger 334 to a lowered position. In embodiments, the valve 330 is an electric actuator. When the valve 330 is in the open position, the plunger 334 is moved toward the raised position and away from an associated port to allow for binder material to flow through the port. When the valve 330 is in the closed position, the plunger 334 is moved toward the lowered position and toward an associated port to prevent binder material from flowing through the associated port. In other embodiments, the plunger 334 may be operated electronically by the control system without the pair of pressure ports 336. The control system 10 may electronically operate the plunger 334 by sending a signal to cause the plunger 334 to move toward or away from a respective port, as discussed herein.

Referring now to FIG. 8B, the plunger 334 is illustrated in more detail. In embodiments, the plunger 334 includes an outer member 341 having a first end 343 and an opposite second end 345. The outer member 341 may be formed from steel, stainless steel, aluminum, or the like. A bore 347 may be formed in the second end 345 of the outer member 341 and extends toward the first end 343. A recess 349 is also formed at the second end 345 of the outer member 341 circumscribing the bore 347. A groove 351 is formed proximate the first end 343 of the outer member 341 and circumscribes the circumference of the outer member 341. An O-ring 338, as shown in FIG. 8A, is positioned within the groove 351 for creating an airtight seal with the receptacle 332. In embodiments, the plunger 334 further includes an insert 353 positionable within the bore 347 of the outer member 341. The insert 353 may be formed from polyvinyl chloride (PVC) or the like. The insert 353 includes a first end 355 and an opposite second end 357 having a threaded channel 359 formed therein and extending toward the first end 355 of the insert 353. The insert 353 has an outer diameter corresponding to an inner diameter of the outer member 341 such that the insert 353 may be press fitted into the bore 347 of the outer member 341. Thus, once the insert 353 is positioned within the bore 347 formed in the outer member 341, an O-ring 361 may be provided within the recess 349 at the second end 345 of the outer member 341. Thereafter, a screw 363 threadedly engages the channel 359 formed in the insert 353 to retain the O-ring 361 within the recess 349 of the outer member 341. Thus, the O-ring 361 creates a fluid tight seal between the plunger 334 and an associated port when the plunger 334 is lowered and the valve 330 is in the closed position.

Although not shown, in embodiments, the insert 353 may not be provided and the screw 363 may threadedly engage a channel formed in the outer member 341 directly. In other embodiments, a plug may be provided having a threaded exterior surface that threadedly engages a threaded interior surface of the outer member 341. In this embodiment, the plug may be formed from steel, stainless steel, aluminum, or the like. An end of the plug may have a groove formed therein and extending out of the second end 345 of the outer member 341 when positioned therein for retaining the O-ring 361 at the second end 345 of the outer member 341. Lastly, in embodiments, a sleeve may be provided and dimensioned to fit over at least a portion of an exterior surface of the outer member 341, particularly the second end 345 of the outer member 341. In this embodiment, the sleeve eliminates the need for the O-ring 361, the insert 353, and the screw 363 for retaining the O-ring 361 on the outer member 341 of the plunger 334. Rather, the sleeve itself creates a fluid tight seal between the plunger 334 and an associated port when the plunger 334 is lowered and the valve 330 is in the closed position.

Referring again to FIG. 8A, in some embodiments, the valve 330 includes a proximity sensor 340 to determine whether the valve 330 is in the open position or the closed position by sensing whether the plunger 334 is in the raised position or the lowered position, respectively. An opening 331 is provided in an upper surface 333 of the receptacle 332 through which a sensing portion 335 of the proximity sensor 340 extends. Thus, when the plunger 334 is moved toward the raised position within the receptacle 332, the sensing portion 335 identifies that the plunger 334 is in the raised position. The sensing portion 335 identifying that the plunger 334 is in the raised position indicates that the valve 330 is in the open position. When the plunger 334 is moved toward the lowered position within the receptacle 332, the sensing portion 335 identifies that the plunger 334 is in the lowered position. As such, the sensing portion 335 identifying that the plunger 334 is in the lower position indicates that the valve 330 is in the closed position. The proximity sensor 340 may identify the location of the plunger 334 based on any suitable engagement such as, for example, a magnetic, electrical, or physical communication. As such, the sensing portion 335 may be configured to determine a location of the plunger 334 at some location between the raised position and the lowered position to identify that the valve 330 may be in a partially closed position.

Alternatively, the valve 330 may be controlled by the control system 10 to position the valve 330 a controlled amount between the open position and the closed position. It should be appreciated that the plunger 334 of the valve 330 is provided within the inlet manifold 210 and the outlet manifold 212 and movable therein to open and close a corresponding port. However, the receptacle 332 is provided on an exterior of the inlet manifold 210 and the outlet manifold 212. Thus, the valves 330 may be accessed for purposes of repair or maintenance by removing the receptacle 332 to access the plunger 334.

Figure 9:
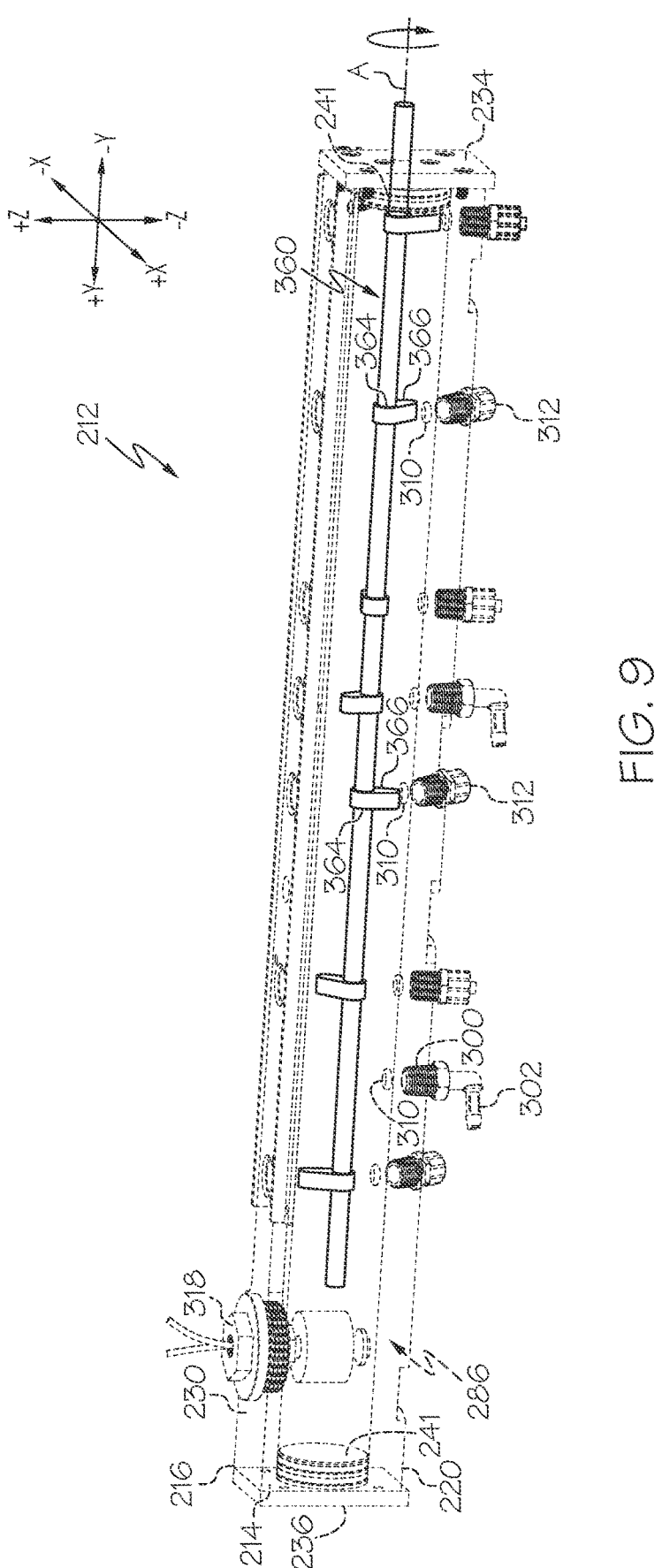
FIG. 9 schematically depicts a perspective view of an embodiment of an outlet manifold according to one or more embodiments shown and described herein.

Referring now to FIG. 9, as an alternative to the plunger and receptacle-type valves described hereinabove, in embodiments, the inlet manifold 210 and/or the outlet manifold 212 may include valves in the form of a camshaft assembly 360 for opening and closing individual inlet ports 266 and/or outlet ports 310. As shown, the camshaft assembly 360 is shown within the outlet manifold 212. However, it should be appreciated that the present disclosure is equally applicable to a camshaft assembly provided within the inlet manifold 210.

In various embodiments, the camshaft assembly 360 includes a camshaft 362 extending longitudinally through the outlet reservoir 286 and through one of the end walls 234, 236, rotatable along an axis A. The camshaft 362 includes at least one lobe 364 extending radially from the camshaft 362 and positioned to correspond to an associated outlet port 310. The lobe 364 has a distal end 366 that conforms to the shape of the outlet port 310 such that when the camshaft 362 is rotated to a position in which the distal end 366 of the lobe 364 engages the outlet port 310, the outlet port 310 is closed (e.g., blocked by the distal end 366) and binder material is not able to flow through the outlet port 310. Alternatively, when the camshaft 362 is rotated to move the distal end 366 of the lobe 364 out of engagement with the outlet port 310, binder material is permitted to flow through the outlet port 310.

When the outlet manifold 212 includes a plurality of outlet ports 310, the camshaft 362 may include a plurality of lobes 364 with each lobe 364 corresponding to an associated outlet port 310. In embodiments, the lobes 364 may each be positioned at the same angle or orientation with respect to the camshaft 362 so that each of the outlet ports 310 may each be opened and closed simultaneously. In embodiments, the lobes 364 may be arranged on the camshaft 362 at different angles such that when one or more lobes 364 are positioned to close a corresponding outlet port 310, one or more other lobes 364 are positioned to open the other outlet ports 310. For example, each lobe 364 on the camshaft 362 may be positioned at a different angle so that with each incremental rotation of the camshaft 362, a different outlet port 310 is closed.

It should be appreciated that other combinations of lobe arrangements are within the scope of the present disclosure. For example, a first set of lobes 364 may be arranged at a first angle and a second set of lobes 364 may be arranged at a second angle. Accordingly, when the camshaft 362 is rotated to a first position, the outlet ports 310 corresponding to the first set of lobes 364 are closed and when the camshaft 362 is rotated to a second position, the outlet ports 310 corresponding to the second set of lobes 364 are closed. This allows for various combinations of outlet ports 310 to be opened and closed at any given time instead of only opening and/or closing a single outlet port 310 at a time. Although not shown, the camshaft 362 may be connected by a motor for operating rotating the camshaft 362.

In addition, in embodiments, each outlet port 310 may include more than one associated lobe 364 so that an outlet port 310 may be closed more than once with each complete rotation of the camshaft 362. By providing more than one lobe 364 associated within a respective outlet port 310, this allows for additional combinations of outlet ports 310 that may be closed at any one position of the camshaft 362 around the axis A.

Whether in the form of a plunger and receptacle, a lobe and camshaft, or another type of valve, in various embodiments described herein, the valves 330 are suitable for facilitating purging and/or de-clogging a print head 156 of the printing head 154 when at least one of the nozzles of an associated print head 156 are at least partially clogged with binder material. When a nozzle of a print head 156 is at least partially clogged with binder material, this can result in printing irregularities and unequal distribution of binder material onto a build area relative to the other print heads 156 that are not clogged.

As a non-limiting example, to unclog a print head 156 of the printing head 154 during a purging or de-clogging operation, the valve 330 associated with the inlet port 266 of the clogged print head 156 is positioned to the open position. Similarly, the valve 330 associated with the outlet port 310 of the clogged print head 156 may be positioned to the open position. In embodiments, each of the valves 330 associated with the other inlet ports 266 and outlet ports 310 of the other print heads 156 that are not clogged may be positioned to the closed position. Thereafter, a pressure differential between the inlet manifold 210 and the outlet manifold 212 resulting from operation of the inlet vacuum 272 of the inlet manifold 210 and the outlet vacuum 316 of the outlet manifold 212 is increased from a normal pressure differential to a purging pressure differential. In some embodiments, as discussed herein, a normal pressure differential during normal operation of the printing head 154 with all of the valves 330 in the open position is from greater than −1.0 psi to less than or equal to 0.0 psi. In some embodiments, during a purging or de-clogging operation, the purging pressure differential is up to 2.0 psi. Thus, as the inlet vacuum 272 and the outlet vacuum 316 increase the pressure differential between the inlet manifold 210 and the outlet manifold 212 and binder material is provided into the inlet reservoir 238 from the pressurized supply reservoir 110, the binder material is directed through only the inlet port 266 and the outlet port 310 that are in the open position, i.e., the inlet port 266 and the outlet port 310 associated with the clogged print head 156. This focuses the pressure to the inlet port 266 with the valve 330 that is in the open position. As such, that inlet port 266 and, thus, the associated print head 156, receive an increased amount of pressure relative to the amount of pressure received when each of the valves 330 at the inlet ports 266 are in the open position.

It should be appreciated that any combination of print heads 156 may be subjected to this de-clogging process by positioning some of the valves 330 to the open position and positioning other valves 330 to the closed position. For example, some of the print heads 156 may be simultaneously subjected to this de-clogging process by opening only the valves 330 of the inlet ports 266 and the outlet ports 310 associated with the print heads 156 to be de-clogged. However, it should be appreciated that the more valves 330 that are opened, the less the pressure will be flowing through each of the associated inlet ports 266, unless the overall pressure differential within the manifold assembly 160 is increased to compensate for the decrease in pressure.

H3 Embodiment

Referring now to FIG. 10-13, another embodiment of a manifold assembly 160A is illustrated. It should be appreciated that the manifold assembly 160A is substantially similar to the manifold assembly 160 discussed herein and, thus, like parts of the inlet manifold 210 and the outlet manifold 212 will be referred to herein with like reference numbers.

As shown in FIGS. 10-13, the manifold assembly 160A includes a supply port 242 in fluid communication with the inlet reservoir 238, and a return port 254 in fluid communication with the inlet reservoir 238. A return fitting 256 is coupled to the return port 254.

In the embodiment shown in FIGS. 10-13, the inlet manifold 210 of the manifold assembly 160A includes a first fluid level float 274 (as described above), which may also be referred to herein as a high level fluid float 274, and a second fluid level float 276. The second fluid level float 276 may be referred to as a low fluid level float or a control fluid level float. The first fluid level float 274 extends through the top wall 218 of the inlet manifold 210, and the second fluid level float 276 extends through the bottom wall 220 of the inlet manifold 210.

The inlet manifold 210 of the manifold assembly 160A also includes a first upper sight gauge connection 278 extending from the top wall 218 of the inlet manifold 210 and a first lower sight gauge connection 280 extending from the bottom wall 220 of the inlet manifold 210. The first upper sight gauge connection 278 and the first lower sight gauge connection 280 are each in fluid connection with the inlet reservoir 238 and connect to an external level monitoring device 710 (shown in FIG. 25). The inlet manifold 210 also includes a second upper sight gauge connection 282 extending from the top wall 218 of the inlet manifold 210 and a second lower sight gauge connection 284 extending from the bottom wall 220 of the inlet manifold 210. The second upper sight gauge connection 282 and the second lower sight gauge connection 284 are each in fluid connection with the inlet reservoir 238 and connect to a sight gauge device 766 (shown in FIG. 26). By providing the second upper sight gauge connection 282 and the second lower sight gauge connection 284, it is possible to monitor a level of binder material within the inlet reservoir 238 proximate opposite end walls 222, 224 of the inlet manifold 210.

In addition to the return port 300, the outlet manifold 212 of the manifold assembly 160A also includes a supply port 290 formed in the bottom wall 232 of the outlet manifold 212 and in fluid communication with the outlet reservoir 286. A supply fitting 292 is coupled to the supply port 290. The outlet manifold 212 of the manifold assembly 160A includes a first fluid level float 318, also referred to herein as a high fluid level float 318, and a second fluid level float 320, which is sometimes referred to as a low fluid level float or a control fluid level float.

In embodiments, the outlet manifold 212 of the manifold assembly 160A also includes a first upper sight gauge connection 322 extending from the top wall 230 of the outlet manifold 212 and a first lower sight gauge connection 324 extending from the bottom wall 232 of the outlet manifold 212 in fluid connection with the outlet reservoir 286 and connect to a second external level monitoring device similar to the external level monitoring device 710. The outlet manifold 212 also includes a second upper sight gauge connection 326 extending from the top wall 230 of the outlet manifold 212 and a second lower sight gauge connection 328 extending from the bottom wall 232 of the outlet manifold 212 in fluid connection with the outlet reservoir 286 and connect to a second sight gauge device 767 similar to the sight gauge device 766.

In this embodiment, a valve 330 is provided at each of the supply port 242 and the return port 254 of the inlet manifold 210. The valve 330 at the supply port 242 permits the flow of binder material into the inlet reservoir 238 from the supply reservoir 110, and the valve 330 at the return port 254 permits the flow of binder material out of the inlet reservoir 238 and to the return reservoir 112 or the supply reservoir 110. Similarly, the outlet manifold 212 also includes a valve 330 provided at each of the supply port 290 and the return port 300.

Figure 10:
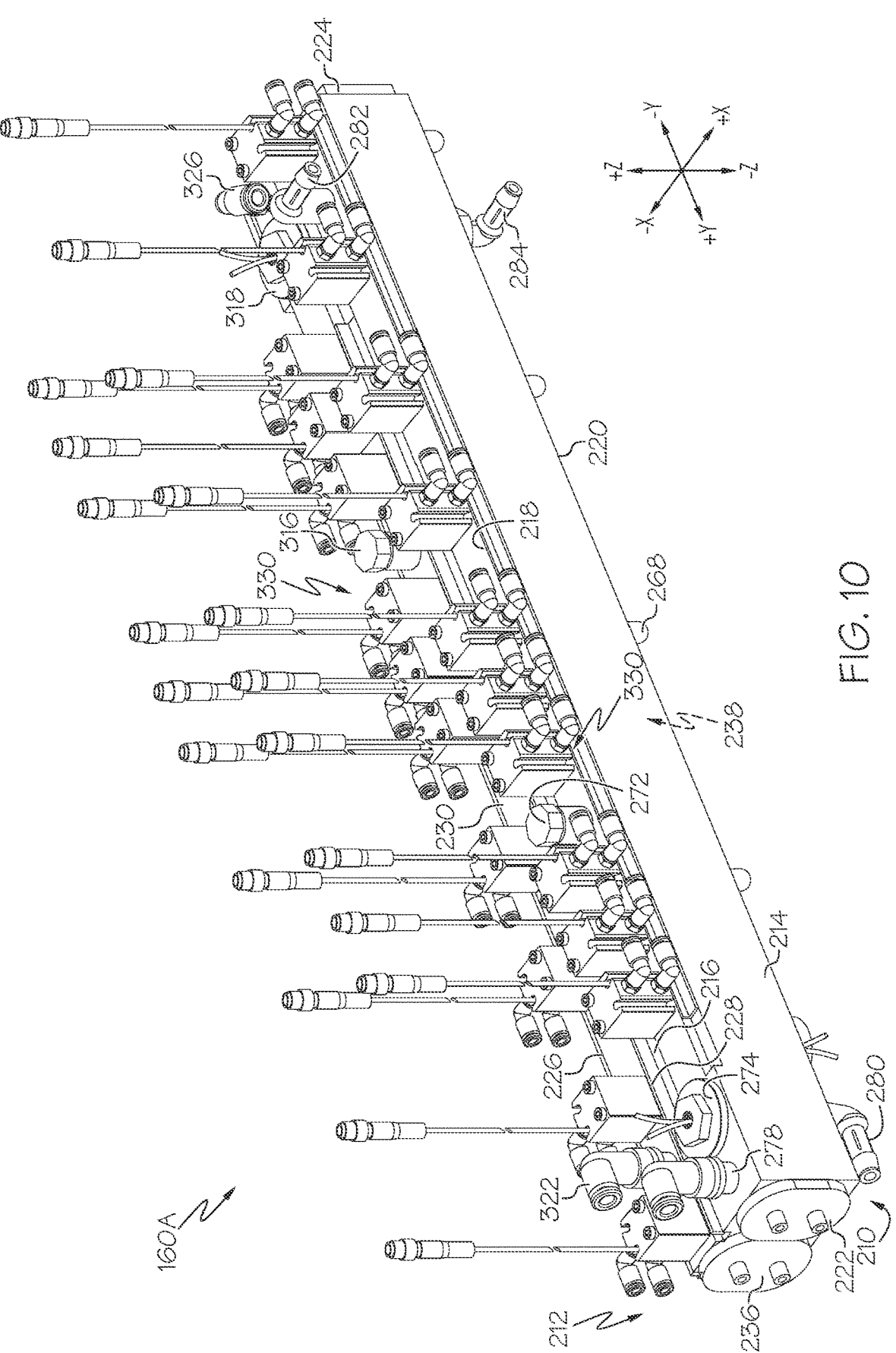
FIG. 10 schematically a perspective view of an embodiment of a manifold assembly of according to one or more embodiments shown and described herein.
Figure 11:
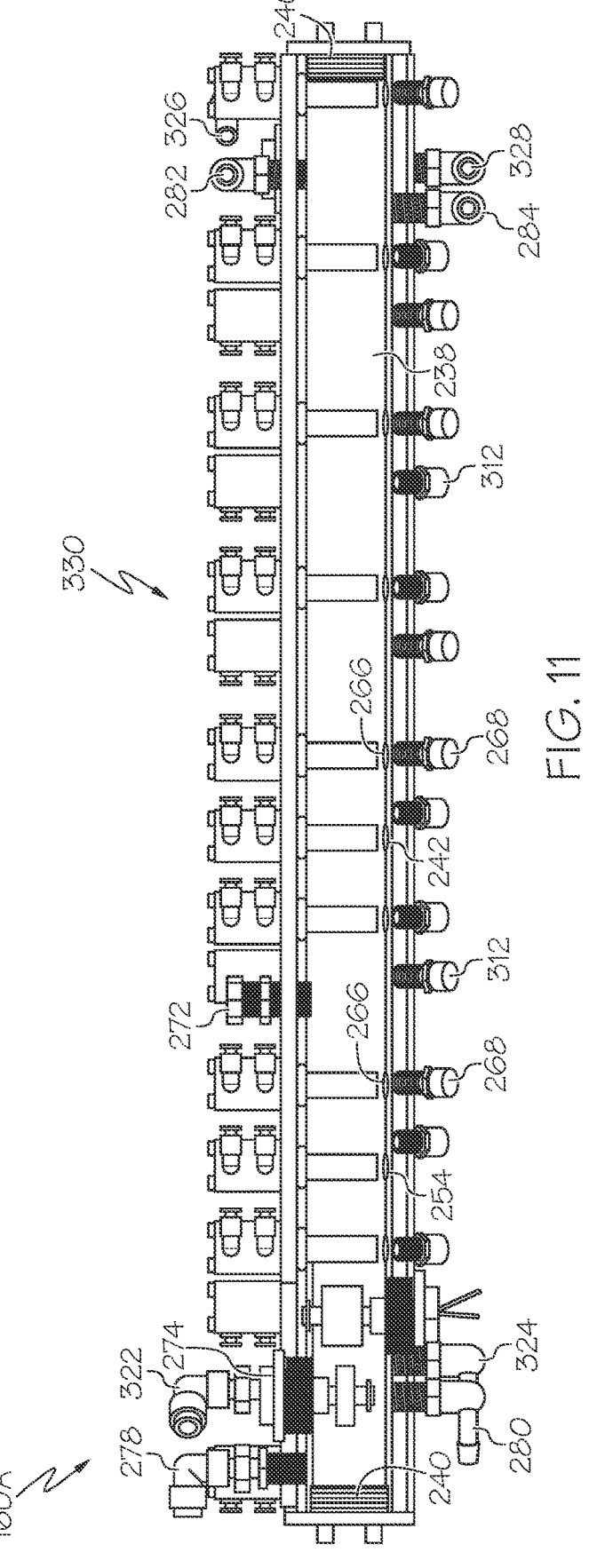
FIG. 11 schematically depicts a partial side view of the manifold assembly of FIG. according to one or more embodiments shown and described herein.
Figure 12:
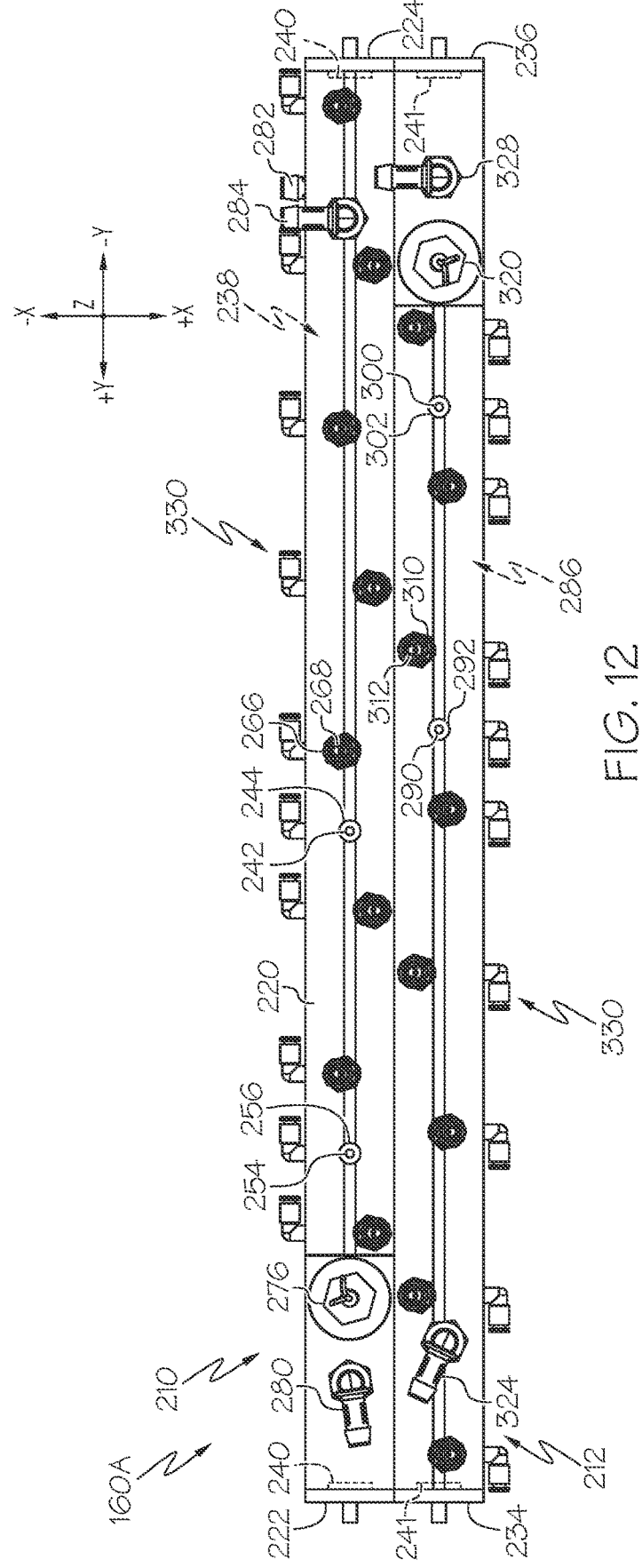
FIG. 12 schematically depicts a bottom plan view of the manifold assembly of FIG. according to one or more embodiments shown and described herein.
Figure 13:
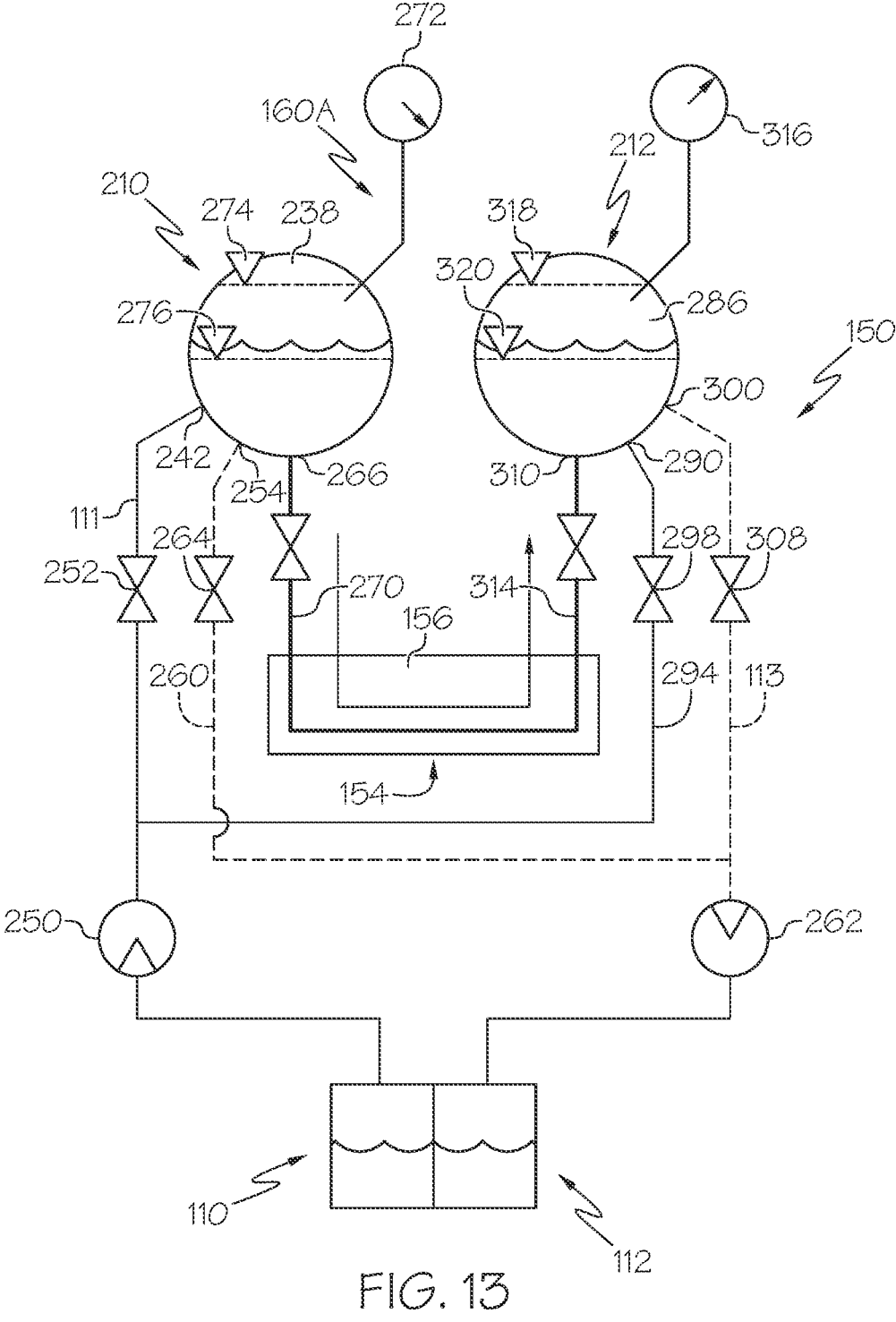
FIG. 13 schematically depicts a diagram of a flow of material through the printing assembly including the manifold assembly of FIG. 10 according to one or more embodiments shown and described herein.

FIG. 13 is a flow diagram schematically showing the flow of binder material through the inlet manifold 210 and outlet manifold 212 shown in FIGS. 10-12. As shown in FIG. 13, binder material flows from the supply reservoir 110 of the inlet manifold 210 via the conduit line 111 and into the inlet reservoir 238 through the supply fitting 244 and the supply port 242. A pump 250 is fluidly coupled to the conduit line 111 for pumping binder material from the supply reservoir 110 toward the inlet manifold 210. Further, the conduit line 111 may have a valve 252 for opening and closing a pathway for binder material to flow into the inlet manifold 210. The valve 252 may be located at any suitable location, such as within the conduit line 111, proximate the supply reservoir 110, or proximate the supply port 242. Binder material flows out of the inlet reservoir 238 through the return port 254 and the return fitting 256 to the return reservoir 112 via a conduit line 260 or, in embodiments, back to the supply reservoir 110 via the conduit line 260. A pump 262 is fluidly coupled to the conduit line 260 for drawing binder material out of the inlet reservoir 238 and toward the return reservoir 112, or the supply reservoir 110. Further, the conduit line 260 may have a valve 264 for opening and closing a pathway for binder material to flow out of the inlet manifold 210. The valve 264 may be located at any suitable location, such as within the conduit line 260, proximate the return port 254, or proximate the return reservoir 112. Additionally, binder material flows from the inlet reservoir 238 toward the print heads 156 through a corresponding inlet port 266 via an inlet tube 270.

With respect to the outlet manifold 212, binder material flows from the supply reservoir 110 via a conduit line 294 and into the outlet reservoir 286 through the supply fitting 292 and the supply port 290. A pump 250 is fluidly coupled to the conduit line 294 for pumping binder material from the supply reservoir 110 toward the outlet manifold 212. Further, the conduit line 294 may have a valve 298 for opening and closing a pathway for binder material to flow into the outlet manifold 212. Binder material flows out of the outlet reservoir 286 through the return port 300 and the return fitting 302 to the return reservoir 112 via the conduit line 113, or in embodiments, back to the supply reservoir 110. A pump 262 is fluidly coupled to the conduit line 113 for drawing material out of the outlet reservoir 286 and toward the return reservoir 112, or the supply reservoir 110. Further, the conduit line 113 may have a valve 308 for opening and closing a pathway for binder material to flow out of the outlet manifold 212. In embodiments, the inlet manifold 210 may deliver binder material back to the supply reservoir 110 and the outlet manifold 212 may deliver binder material back to the return reservoir 112, or vice versa. Additionally, any unused binder material within the print heads 156 flows back into the outlet reservoir 286 through a corresponding outlet port 310 via an outlet tube 314.

In practice, during a purging or de-clogging operation of a clogged print head 156, the valve 330 associated with the inlet port 266 of the clogged print head 156 is positioned to the open position and the valve 330 associated with the outlet port 310 of the clogged print head 156 is positioned to the open position. The valves 330 associated with the other inlet ports 266 and outlet ports 310 of the other print heads 156 that are not clogged are positioned to the closed position. Thereafter, a pressure differential between the inlet manifold 210 and the outlet manifold 212 resulting from operation of the inlet vacuum 272 of the inlet manifold 210 and the outlet vacuum 316 of the outlet manifold 212 is increased from the normal pressure differential to the purging pressure differential, as discussed above. As the inlet vacuum 272 and the outlet vacuum 316 increase the pressure differential between the inlet manifold 210 and the outlet manifold 212 and binder material is provided into the inlet reservoir 238 from the pressurized supply reservoir 110, the binder material is directed through only the inlet port 266 and the outlet port 310 that are in the open position, i.e., the inlet port 266 and the outlet port 310 associated with the clogged print head 156.

In practice, when the fluid level float 274 within the inlet reservoir 238 determines that the level of fluid in the inlet reservoir 238 is above a predetermined threshold, the fluid level float 274 sends a signal to the control system 10 to permit binder material to flow out of the inlet reservoir 238 through the return port 254 of the inlet manifold 210, and to the return reservoir 112 or the supply reservoir 110. Binder material flows out of the inlet reservoir 238 responsive to the opening of the valve 264, thereby allowing binder material out of the inlet reservoir 238. Moreover, when the fluid level float 274 provided within the inlet reservoir 238 determines the level of binder material is below a predetermined threshold, the fluid level float 274 sends a signal to the control system 10 to permit additional binder material to flow into the inlet reservoir 238 from the supply reservoir 110 through the supply port 242. Binder material flows into the inlet reservoir 238 responsive to activation of the pump 250 to deliver binder material to the inlet reservoir 238.

As noted above, refilling the inlet manifold 210 during a printing operation may have an adverse effect on the print quality as pressure within the inlet manifold can fluctuate during a filling/refilling operation of the inlet manifold 210. Thus, in embodiments, the control relay of the fluid level float 274 does not send a signal to permit additional binder material to flow into, or out of, the inlet reservoir 238 while the manifold assembly 160A is actively performing a printing operation. Specifically, the control relay prevents the pumps 250, 262 from being activated during a printing operation.

Still further, when the fluid level float 318 within the outlet reservoir 286 determines that the level of fluid in the outlet reservoir 286 is above a predetermined threshold, the fluid level float 318 sends a signal to the control system 10 to permit binder material to flow out of the outlet reservoir 286 through the return port 300 of the outlet manifold 212, and to the return reservoir 112 or the supply reservoir 110. Binder material flows out of the outlet reservoir 286 responsive to activation of the pump 262, which draws binder material out of the outlet reservoir 286. When the fluid level float 318 provided within the outlet reservoir 286 determines the level of binder material is below a predetermined threshold, the fluid level float 318 sends a signal to the control system 10 to permit additional binder material to flow into the outlet reservoir 286 from the supply reservoir 110 through the supply port 290. Binder material flows into the outlet reservoir 286 responsive to the opening of the valve 298 at the supply port 290. By providing material to flow into and out of the inlet manifold 210 and the outlet manifold 212 directly, independent control of either or both of the inlet manifold 210 and the outlet manifold 212 may be permitted without affecting the other of the inlet manifold 210 and the outlet manifold 212.

Similar to the fluid level flow 274 of the inlet manifold 210, in embodiments, the control relay of the fluid level float 318 does not send a signal to permit additional binder material to flow into, or out of, the outlet reservoir 286 while the manifold assembly 160A is actively performing a printing operation.

H2 Beta Embodiment

Referring now to FIGS. 14-17, another embodiment of a manifold assembly 160B is illustrated. It should be appreciated that the manifold assembly 160B is substantially similar to the manifold assemblies 160, 160A discussed herein and, thus, like parts of the inlet manifold 210 and the outlet manifold 212, for example, the fluid level floats 274, 318, will be referred to herein with like reference numbers.

Figure 17:
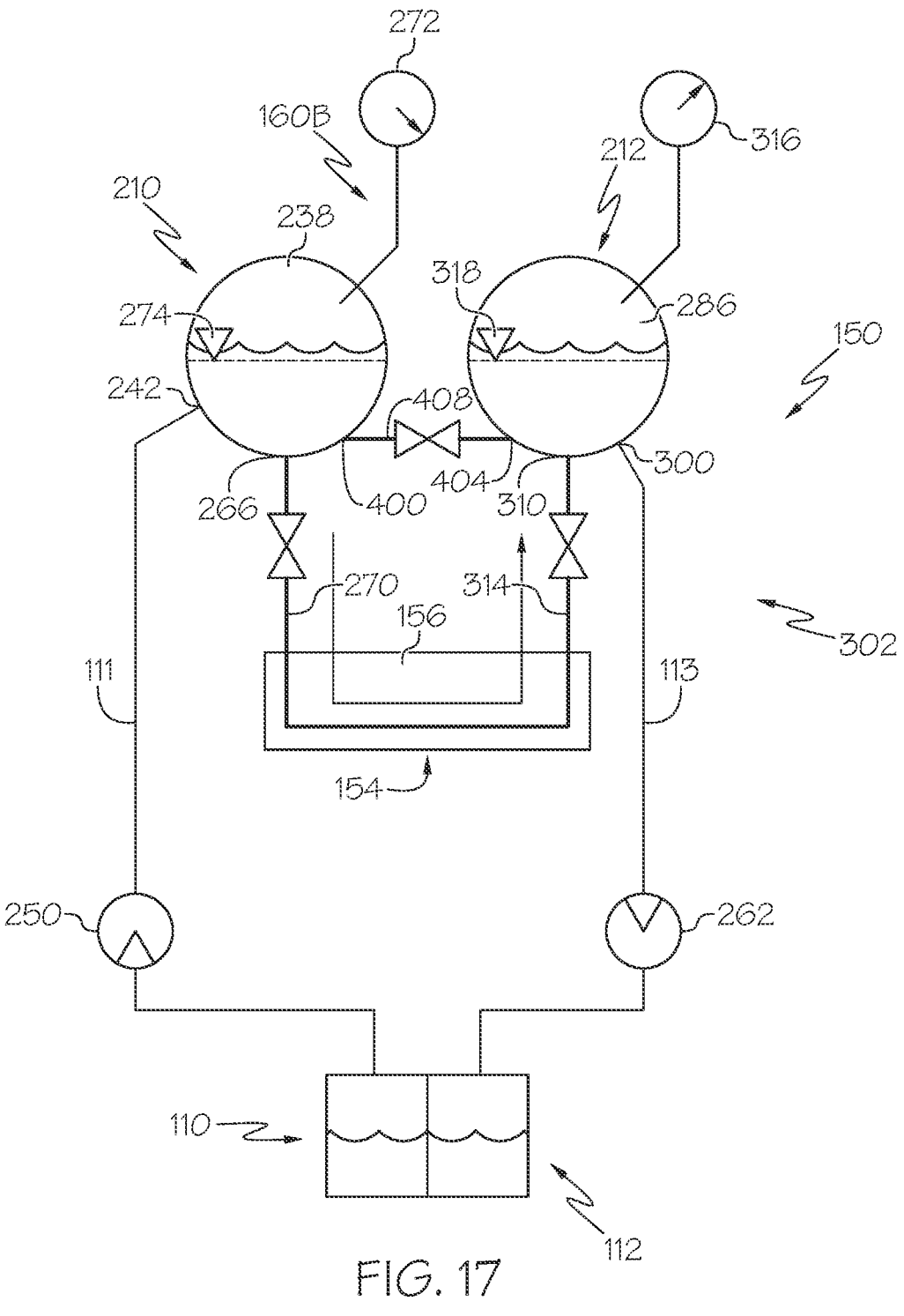
FIG. 17 schematically depicts a diagram of a flow of material through the printing assembly including the manifold assembly of FIG. 16 according to one or more embodiments shown and described herein.

In this embodiment, the inlet manifold 210 of the manifold assembly 160B includes a bypass port 400 formed in the bottom wall 220 of the inlet manifold 210 and in fluid communication with the inlet reservoir 238. A bypass fitting 402 is coupled to the bypass port 400. The outlet manifold 212 also includes a bypass port 404 formed in the bottom wall 520 of the outlet manifold 212 and in fluid communication with the outlet reservoir 286. A bypass fitting 406 is coupled to the bypass port 404. A bypass line 408, as shown in FIG. 17, places the inlet reservoir 238 and the outlet reservoir 286 in fluid communication with one another by connecting to the bypass fitting 402 of the inlet manifold 210 at a first end and the bypass fitting 406 of the outlet manifold 212 at an opposite second end. Thus, binder material is permitted to flow out of the inlet reservoir 238 and into the outlet reservoir 286 via the bypass line 408. This allows binder material to flow directly to the outlet reservoir 286 from the inlet reservoir 238 and bypass the print heads 156.

In the embodiment of the manifold assembly 160B shown in FIGS. 14-17, a valve 330 is not provided at the supply port 242 or the bypass port 400 of the inlet manifold 210, or at the return port 254 of the outlet manifold 212. However, a valve 330 is provided at the bypass port 404 of the outlet manifold 212. It should be appreciated that, in other embodiments, a valve 330 may be provided at the bypass port 400 of the inlet manifold 210, or at other ports of either the inlet manifold 210 or the outlet manifold 212.

Figure 14:
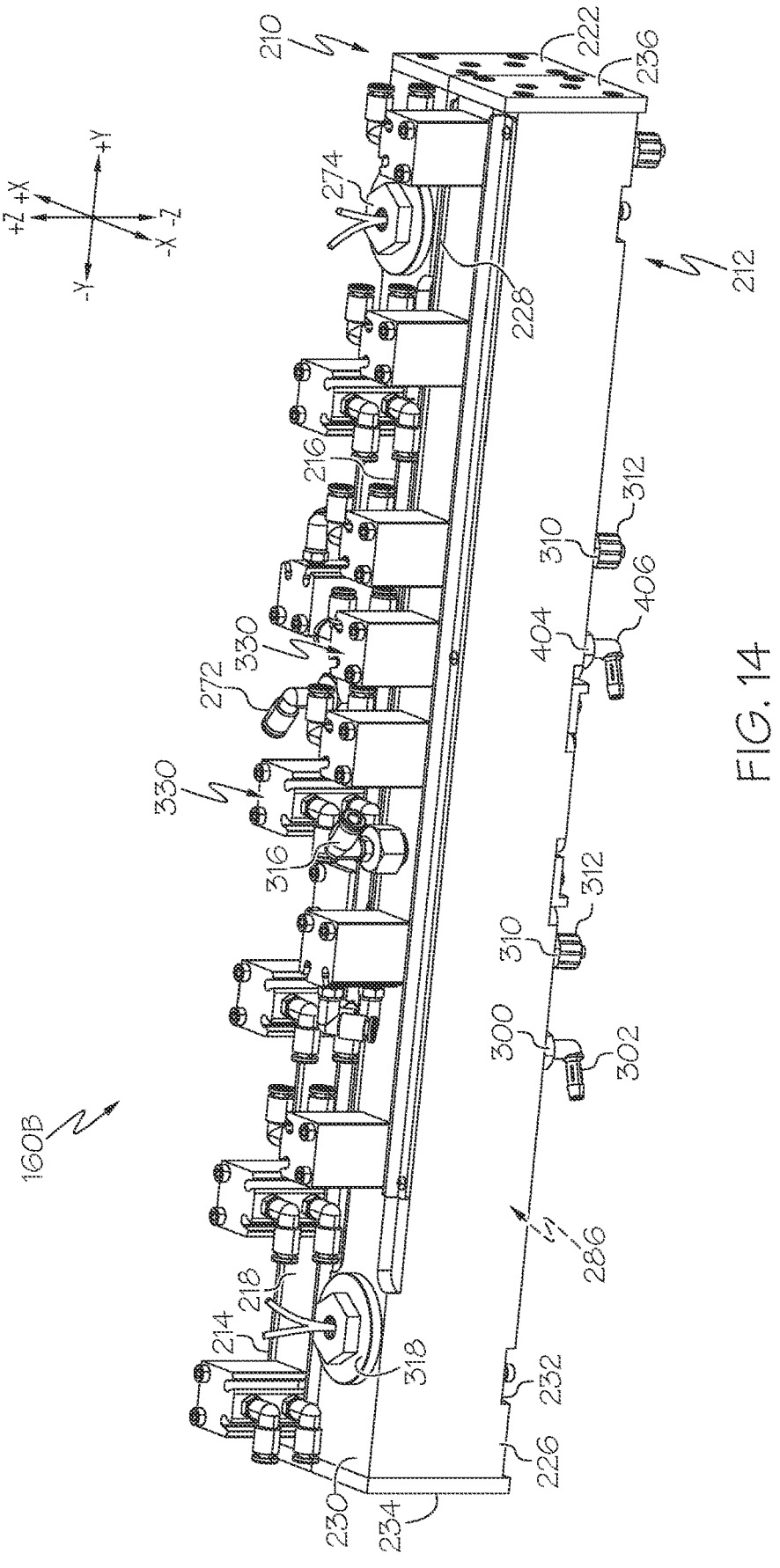
FIG. 14 schematically depicts a perspective view of an embodiment of a manifold assembly according to one or more embodiments shown and described herein.
Figure 15:
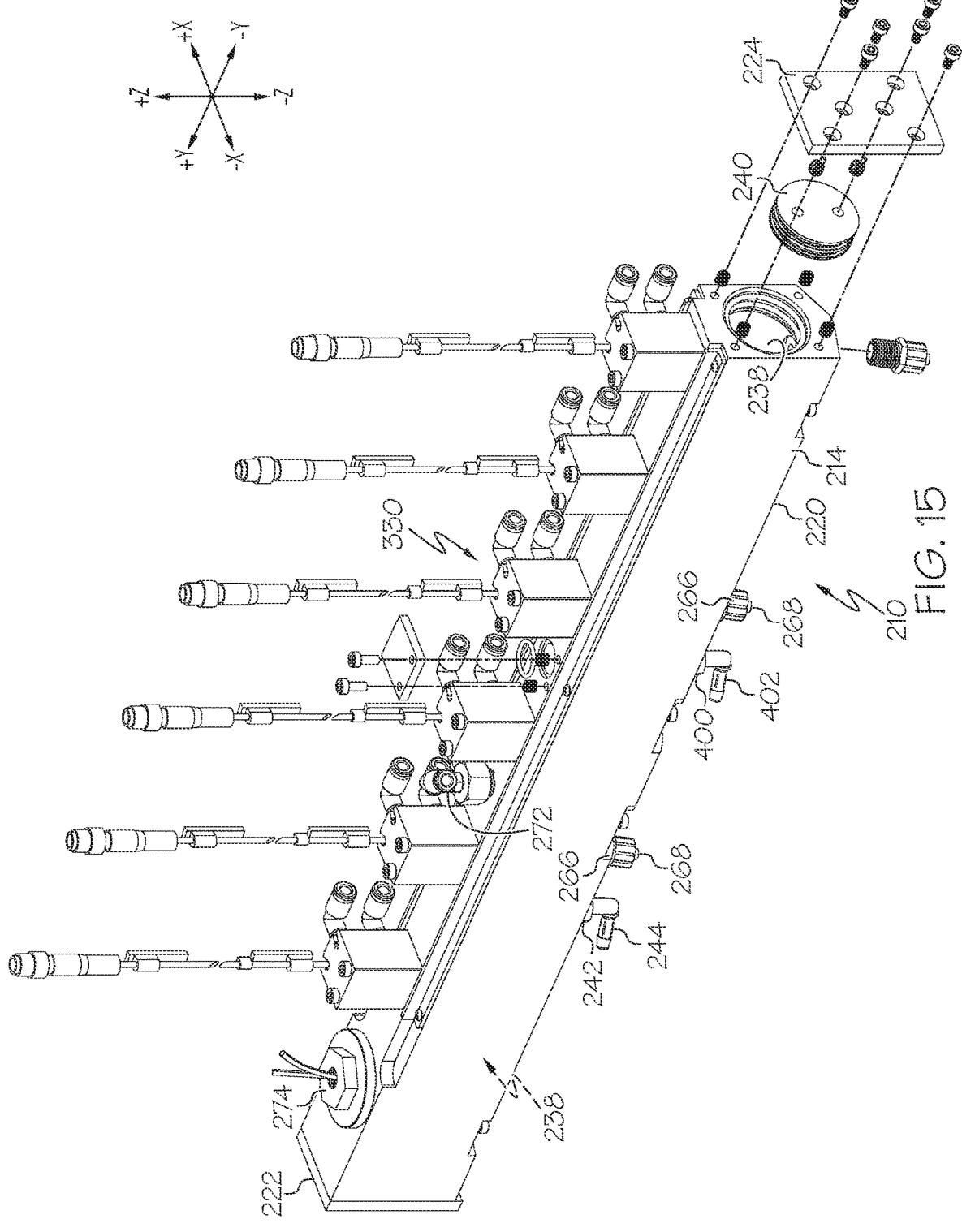
FIG. 15 schematically depicts an exploded perspective view of an inlet manifold of the manifold assembly of FIG. 14 according to one or more embodiments shown and described herein.
Figure 16:
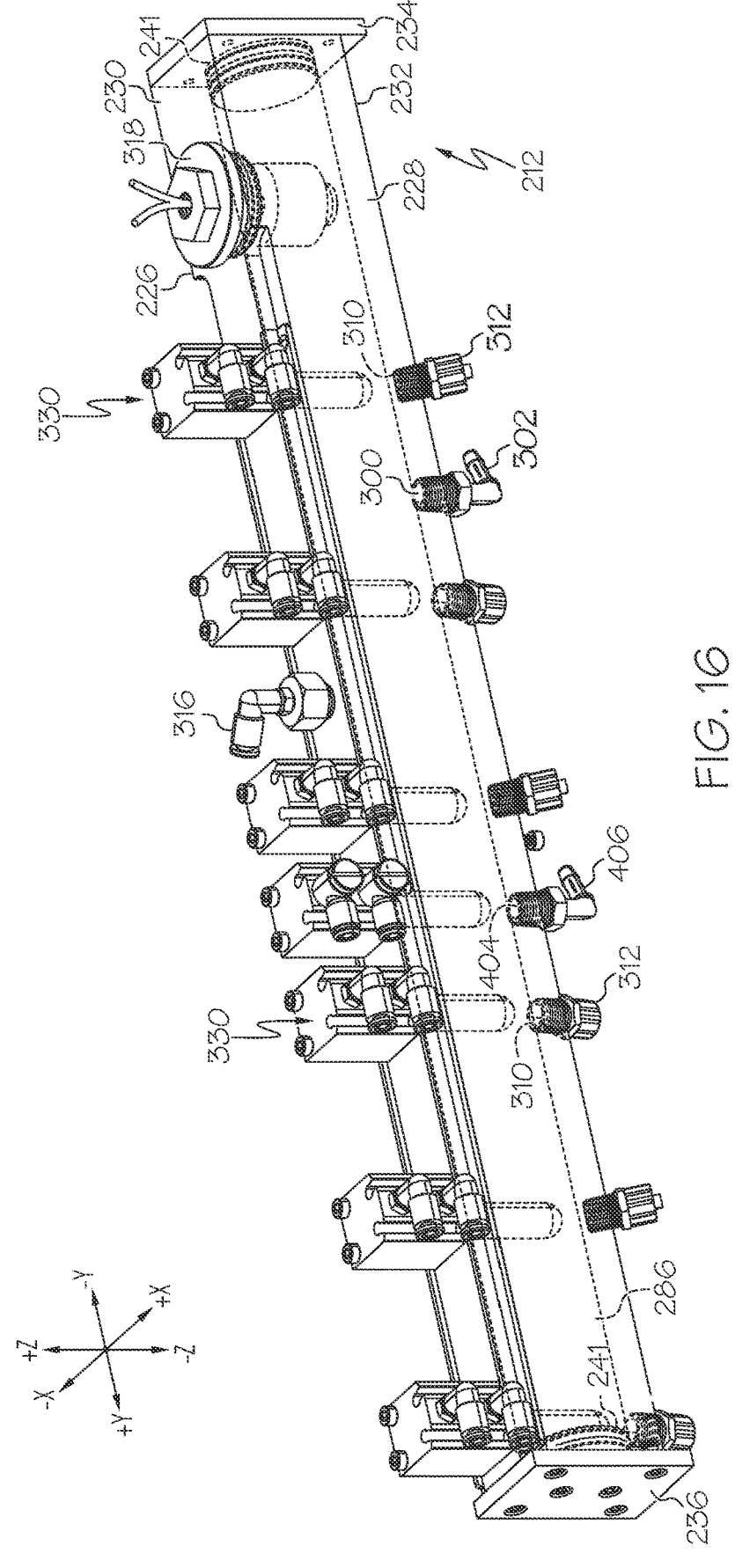
FIG. 16 schematically depicts a perspective view of an outlet manifold of the manifold assembly of FIG. 14 according to one or more embodiments shown and described herein.

FIG. 17 is a flow diagram schematically showing the flow of binder material through the inlet manifold 210 and outlet manifold 212 shown in FIGS. 14-16. In practice, when the fluid level float 274 within the inlet reservoir 238 determines that the level of fluid in the inlet reservoir 238 is above a predetermined threshold, the fluid level float 274 sends a signal to the control system 10 to permit binder material to flow out of the inlet reservoir 238, such as through the bypass port 400 of the inlet manifold 210, and to the outlet manifold 212. Binder material flows out of the inlet reservoir 238 responsive to the opening of the valve 330 at the bypass port 404 of the outlet manifold 212, thereby allowing binder material out of the inlet reservoir 238. Moreover, when the fluid level float 274 provided within the inlet reservoir 238 determines the level of binder material is below a predetermined threshold, the fluid level float 274 sends a signal to the control system 10 to permit additional binder material to flow into the inlet reservoir 238 from the supply reservoir 110 through the supply port 242. Binder material flows into the inlet reservoir 238 responsive to activation of the pump 250 to deliver binder material to the inlet reservoir 238.

Still further, when the fluid level float 318 within the outlet reservoir 286 determines that the level of fluid in the outlet reservoir 286 is above a predetermined threshold, the fluid level float 318 sends a signal to the control system 10 to permit binder material to flow out of the outlet reservoir 286, such as through the return port 300 of the outlet manifold 212, and to the return reservoir 112 or the supply reservoir 110. Binder material flows out of the outlet reservoir 286 responsive to activation of the pump 262, which draws binder material out of the outlet reservoir 286. When the fluid level float 318 provided within the outlet reservoir 286 determines the level of binder material is below a predetermined threshold, the fluid level float 318 sends a signal to the control system 10 to permit additional binder material to flow into the outlet reservoir 286 from the inlet reservoir 238 through the bypass port 404. Binder material flows into the outlet reservoir 286 responsive to the opening of the valve 330 at the bypass port 404. Utilizing the bypass ports 400, 404 of the inlet manifold 210 and the outlet manifold 212, respectively, may result in quicker re-filling after a purging operation by permitting binder material to flow directly from the inlet manifold 210 to the outlet manifold 212 as opposed to requiring binder material to flow through the print heads 156.

In addition, the inclusion of the bypass ports 400, 404 and associated valve 330 may improve the priming processes of the printing assembly 150. For example, when initially priming the print heads 156, each of the valves 330 associated with the inlet ports 266 of the inlet manifold 210 and the outlet ports 310 of the outlet manifold 212 are positioned to the closed position. In addition, the valve 330 associated with the bypass port 404 of the outlet manifold 212 is positioned to the open position. Thus, binder material flowing from the supply reservoir 110 is able to refill both the inlet reservoir 238 and the outlet reservoir 286 to a predetermined level. This can enable faster filling and priming as compared to embodiments in which the bypass ports 400, 404 are not provided.

H2 Alpha Embodiment

Figure 18:
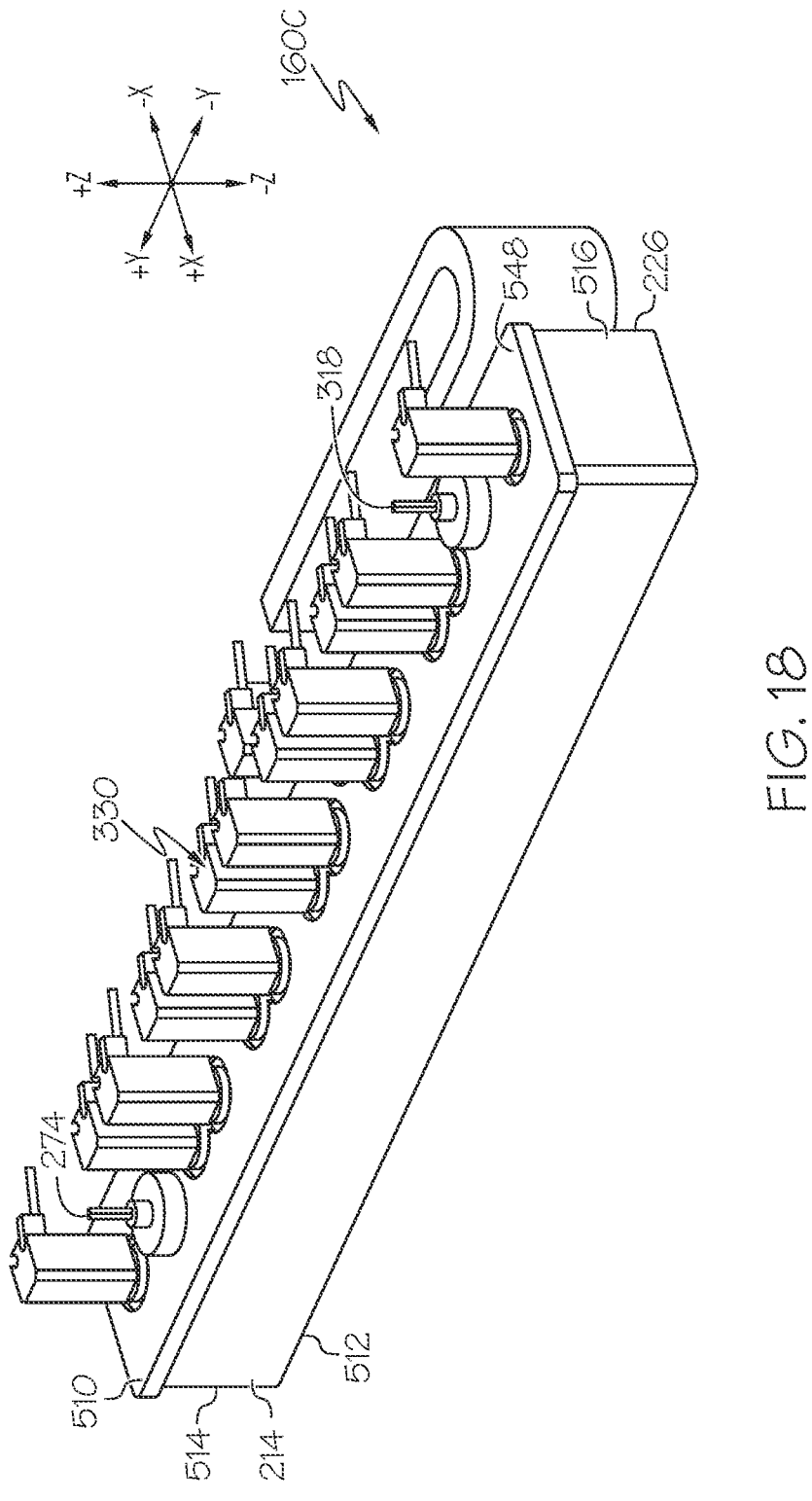
FIG. 18 schematically depicts a perspective view of an embodiment of a manifold assembly according to one or more embodiments shown and described herein.
Figure 19:
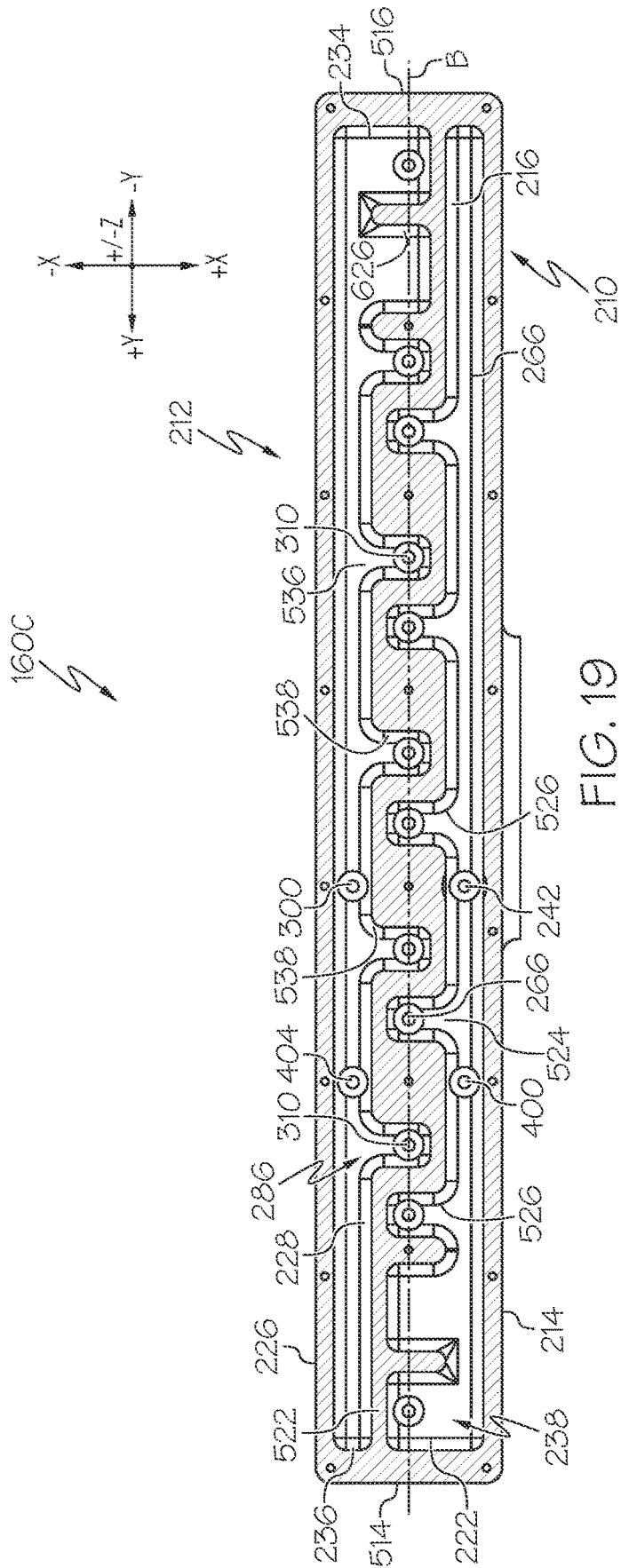
FIG. 19 schematically depicts a partial top view of the manifold assembly of FIG. 18 according to one or more embodiments shown and described herein.

Referring now to FIGS. 18 and 19, another embodiment of a manifold assembly 160C is illustrated. It should be appreciated that the manifold assembly 160C is substantially similar to the manifold assemblies 160, 160B discussed herein and, thus, like parts of the inlet manifold 210 and the outlet manifold 212 will be referred to herein with like reference numbers.

Referring to FIGS. 18 and 19, in this embodiment of the manifold assembly 160C, the inlet manifold 210 and the outlet manifold 212 are integrally formed with one another. Thus, the second wall 216 of the inlet manifold and the second wall 228 of the outlet manifold 212 are joined to form a medial wall 522. The end wall 222 of the inlet manifold 210 and the end wall 234 of the outlet manifold 212 are joined to form an integral end wall 514 of the manifold assembly 160C. Similarly, the end wall 224 of the inlet manifold 210 and the end wall 236 of the outlet manifold 212 are joined to form an opposite integral end wall 516 of the manifold assembly 160C. The bottom wall 220 of the inlet manifold 210 and the bottom wall 232 of the outlet manifold 212 are joined to form an integral bottom wall 512 of the manifold assembly 160C. In addition, the top wall 218 of the inlet manifold 210 and the top wall 230 of the outlet manifold 212 are joined to form an integral top wall 510 of the manifold assembly 160C. As discussed in more detail herein, the top wall 510 of the manifold assembly 160C may be separable from and sealable to the rest of the manifold assembly 160C.

As shown in FIG. 19, a top view of the manifold assembly 160C is shown with the top wall 510 removed therefrom. The inlet manifold 210 includes a channel 524 extending longitudinally between the end walls 222, 224 of the inlet manifold 210 along the +/−Y axis of the coordinate axes depicted in the figures. In embodiments, as shown, the inlet manifold 210 also includes a plurality of indentations 526 extending along the +/−X axis of the coordinate axes depicted in the figures and, thus, perpendicular to the channel 524 and into the medial wall 522, toward the outlet manifold 212. The channel 524 and the indentations 526 of the inlet manifold 210 together define the inlet reservoir 238. One or more inlet ports 266 are formed in the bottom wall 232 of the inlet manifold 210, each within a corresponding one of the plurality of indentations 526. In embodiments, at least some of the indentations 526 do not include a corresponding inlet port 266, although, in other embodiments, each indentation 526 has a corresponding inlet port 266. In embodiments, each of the inlet ports 266 are arranged along an axis B extending between the end walls 514, 516 of the manifold assembly 160C. Additionally, the supply port 242 and the bypass port 400 are formed in the bottom wall 232 of the inlet manifold 210 and within the channel 524 of the inlet manifold 210. However, in embodiments, an indentation 526 remains available for receiving the fluid level float 274 for determining a level of binder material within the inlet reservoir 238.

Similarly, the outlet manifold 212 includes a channel 536 extending longitudinally between the end walls 234, 236 of the outlet manifold 212 along the +/−Y axis of the coordinate axes depicted in the figures. In embodiments, as shown, the outlet manifold 212 also includes a plurality of indentations 538 extending along the +/−X axis of the coordinate axes depicted in the figures and, thus, perpendicular to the channel 536 and into the medial wall 522, toward the inlet manifold 210. The channel 536 and the indentations 538 of the outlet manifold 212 together define the outlet reservoir 286. One or more outlet ports 310 are formed in the bottom wall 232 of the outlet manifold 212, each within a corresponding one of the plurality of indentations 538. In embodiments, at least some of the indentations 538 do not include a corresponding outlet port 310, although, in some embodiments, each indentation 538 has a corresponding outlet port 310. In embodiments, each of the outlet ports 310 are arranged along the axis B extending between the end walls 514, 516 of the manifold assembly 160C. As such, the inlet ports 266 and the outlet ports 310 are each arranged along the same axis extending between the end walls 514, 516 of the manifold assembly 160C. Additionally, the return port 300 and the bypass port 404 are formed in the bottom wall 232 of the outlet manifold 212 and within the channel 536 of the outlet manifold 212. As shown, at least one of the indentations 538 in the outlet reservoir 286 does not include an outlet port 310. However, in embodiments, an indentation 538 remains available for receiving the fluid level float 318 for determining a level of binder material within the outlet reservoir 286.

Figure 20:
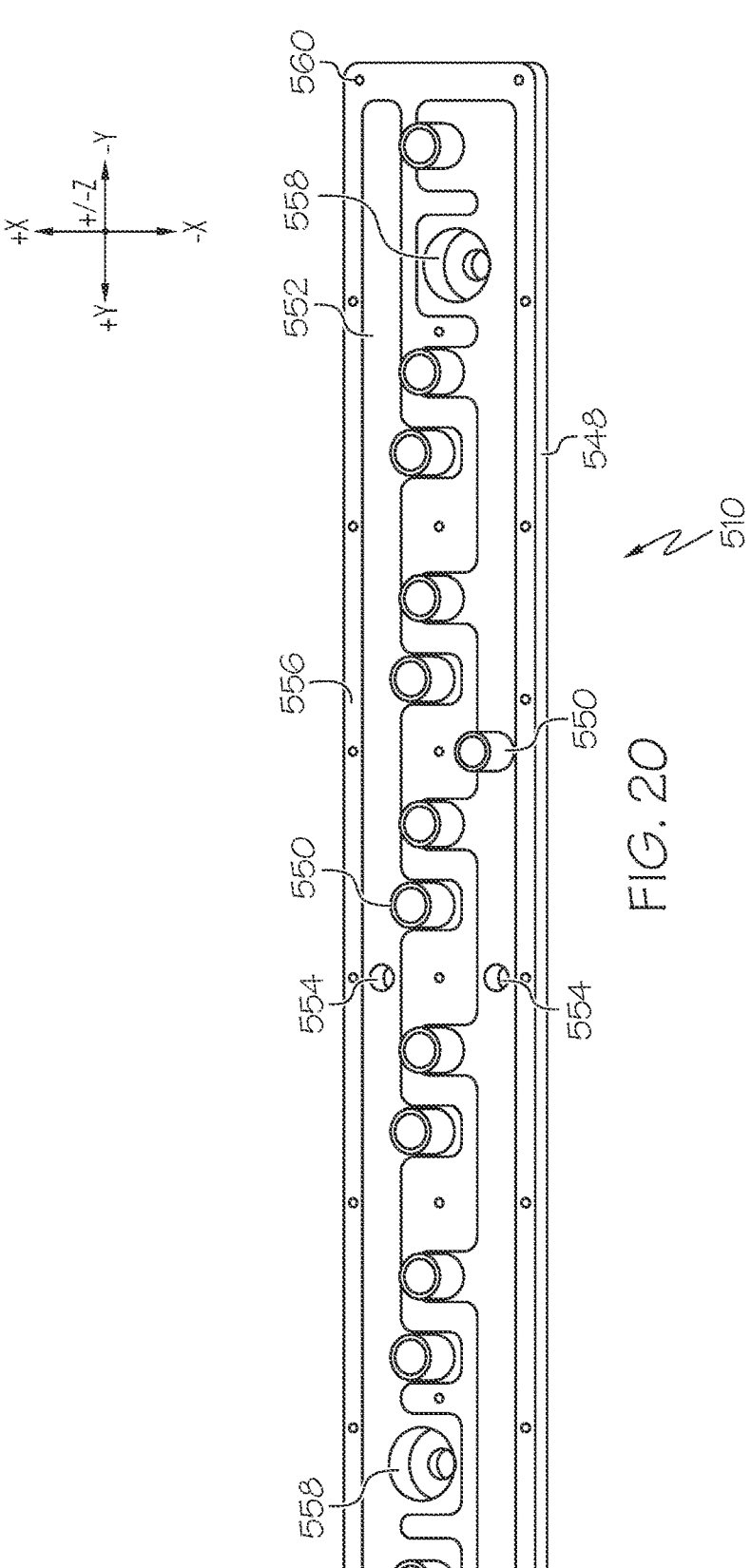
FIG. 20 schematically depicts a bottom view of a top wall of the manifold assembly of FIG. 18 according to one or more embodiments shown and described herein.

As shown in FIG. 20, a bottom view of the top wall 510 of the manifold assembly 160C is shown. The top wall 510 includes a cover 548 including a plurality of extrusions 550 extending toward the bottom wall 512 of the manifold assembly 160C for receiving at least a portion of a valve 330, as discussed in more detail hereinabove. Additionally, in embodiments, the cover 548 includes a pair of depressions 558 extending into the thickness of the top wall 510 and away from the bottom wall 512 for receiving the fluid level floats 274, 318 of each of the inlet manifold 210 and the outlet manifold 212, respectively. In embodiments, a pair of openings 554 extend through the cover 548. When included, each opening 554 is coupled to the inlet vacuum 272 and the outlet vacuum 316, respectively, for controlling a pressure differential within the inlet reservoir 238 and the outlet reservoir 286. As shown, the cover 548 may include a recess 552 for receiving a gasket 556 for creating a seal between the cover 548 and the other walls of the manifold assembly 160C. As such, the gasket 556 is configured to conform to an outer perimeter of the cover 548 and overlie the medial wall 522. A plurality of holes 560 are formed in each of the cover 548 and the gasket 556 for allowing fasteners, such as screws, bolts, rivers, or the like, to extend therethrough and secure the cover 548 and the gasket 556 to the manifold assembly 160C. It should be appreciated that by permitting the top wall 510 to be removed from the rest of the manifold assembly 160C, various internal components and portions of the manifold assembly 160C (such as valves and floats) may be more readily accessed for purposes of repair and/or maintenance, as opposed to the embodiments discussed herein in which the top wall 510 is not removable.

Manifold Outside of Housing Embodiment

Figure 21:
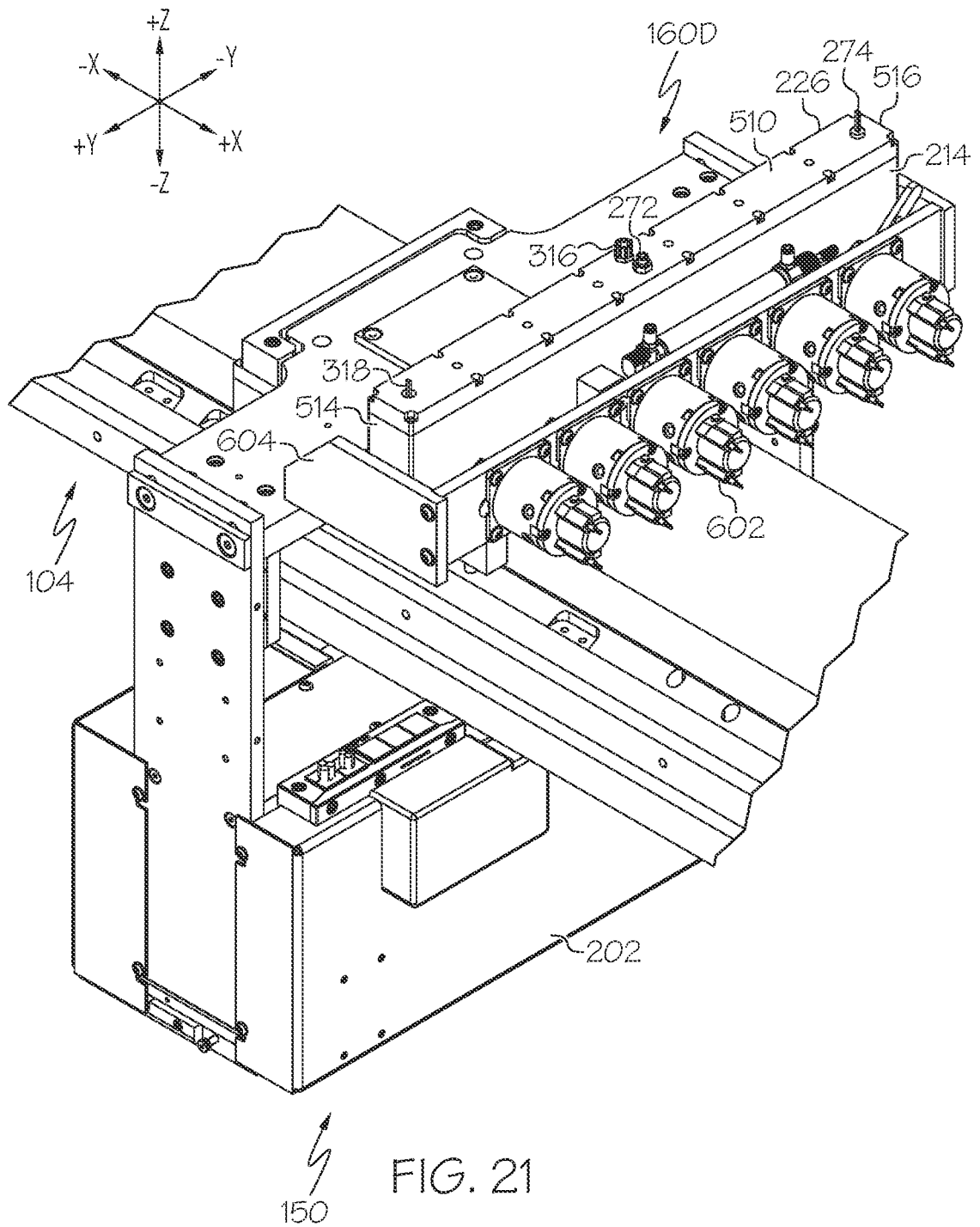
FIG. 21 schematically depicts a perspective view of the printing assembly including an embodiment of a manifold assembly according to one or more embodiments shown and described herein.

Although various embodiments described herein have included the manifold assembly as being located within the housing of the printing assembly, in some embodiments, the manifold assembly is positioned outside of the housing 202 and on an opposite side of the rail 104 from the housing 202, as shown in FIG. 21. In particular, FIGS. 21-23 illustrate another embodiment of a manifold assembly 160D, which is substantially similar to the manifold assemblies 160, 160C discussed herein and, thus, like parts of the inlet manifold 210 and the outlet manifold 212 will be referred to herein with like reference numbers.

As shown, the manifold assembly 160D includes a plurality of actuators 602 for independently and selectively controlling respective valves of the manifold assembly 160D. Each of the actuators 602 may be controlled by the control system 10, such as through electronic or pneumatic control. The actuators 602 may be mounted to the support bracket 152 by a frame 604 for fixing the actuators 602 in position relative to the manifold assembly 160D.

Figures 22, 23:
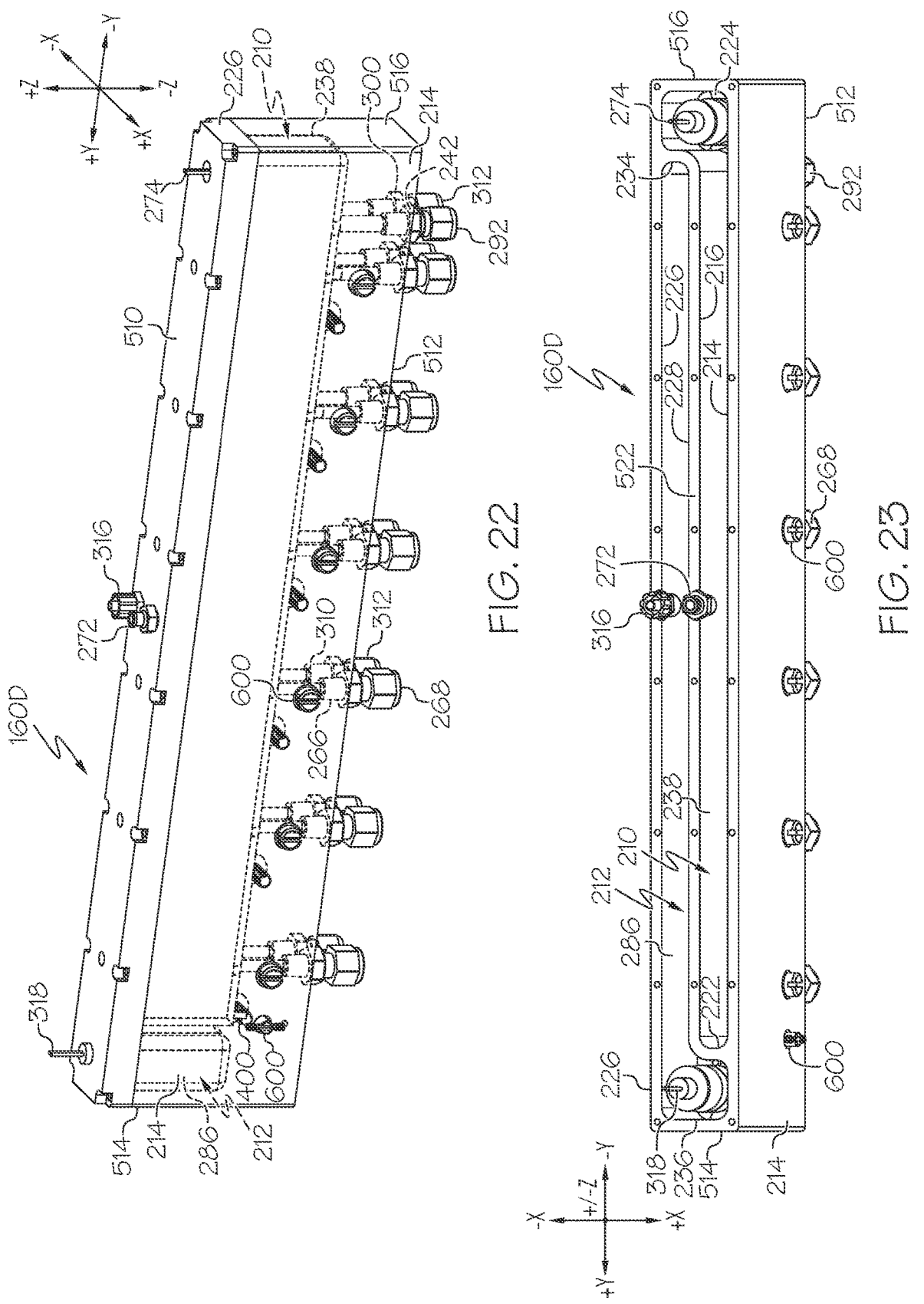
FIG. 22 schematically depicts a perspective view of the manifold assembly of FIG. 21 according to one or more embodiments shown and described herein.
FIG. 23 schematically depicts a partial perspective view of the manifold assembly of FIG. 21 according to one or more embodiments shown and described herein.

As can be seen in FIGS. 22 and 23, the inlet manifold 210 and the outlet manifold 212 are fixed to one another, i.e., not separable, and include the integral top wall 510, the integral bottom wall 512, the integral end wall 514, the opposite integral end wall 516, and the medial wall 522 separating the inlet reservoir 238 and the outlet reservoir 286.

In this embodiment, the manifold assembly 160D includes a valve 600, rather than valve 330, for permitting a flow of binder material from the inlet reservoir 238 to a respective print head 156 through a corresponding inlet port 266. The valve 600 may extend through the first wall 214 of the inlet manifold 210 to be accessible from an exterior of the manifold assembly 160D. The valve 600 may be any suitable well-known valve for opening and closing the inlet port 266 such as, for example, a spool valve, a rotatable flapper, plunger, or the like.

In embodiments, the valve 600 may be configured to simultaneously open and close a corresponding inlet port 266 and a corresponding outlet port 310. However, it is contemplated that, in embodiments, the inlet port 266 and the outlet port 310 may have separate valves 600 for selectively and independently opening and closing the inlet port 266 and the outlet port 310 to permit the flow of binder material through the inlet manifold 210 and the outlet manifold 212, respectively. Additionally or alternatively, a valve 600 may be provided at each of the supply port 242 of the inlet manifold 210 and the return port 300 of the outlet manifold 212 for permitting the flow of binder material from the supply reservoir 110 and to the return reservoir 112, respectively.

As shown, an end of the valve 600 accessible from an exterior of the manifold assembly 160D is engageable to be rotated by an associated actuator 602 for operating the valve 600 between an open position and a closed position. In the open position, binder material is permitted to flow through the corresponding inlet port 266. In the closed position, binder material is prevented from flowing through the corresponding inlet port 266.

In practice, a valve 600 associated with an inlet port 266 and an outlet port 310 of a clogged print head 156 may be positioned to the open position by an associated actuator 602 while the other valves 600 are positioned to the closed position to focus pressure from the supply reservoir 110 to the clogged print head 156. Thereafter, a pressure differential between the inlet manifold 210 and the outlet manifold 212 resulting from operation of the inlet vacuum 272 of the inlet manifold 210 and the outlet vacuum 316 of the outlet manifold 212 is increased from the normal pressure differential to the purging pressure differential.

It should be appreciated that the method of filling and priming the manifold assemblies discussed hereinabove, may be implemented with the manifold assembly 160D to allow for quickly refilling both the inlet reservoir 238 and the outlet reservoir 286 to a predetermined level. It is further contemplated that, in embodiments, although not shown, a bypass line, such as the bypass line 408 in the manifold assembly 160B, may extend between the inlet manifold 210 and the outlet manifold 212 allowing binder material to flow from the inlet reservoir 238 to the outlet reservoir 286 and bypass the print heads 156. As such, the manifold assembly 160D may include a valve 600 at the bypass port 400 of the inlet manifold 210 for opening and closing a pathway through the bypass line. Moreover, other features described with respect to other embodiments of the manifold assembly may be included in the manifold assembly 160D (or other manifold assemblies described herein), and the features described with respect to the manifold assembly 160D may be included in embodiments of other manifold assemblies. Features described hereinabove that can be included in any one or more of the manifold assemblies described herein include, for example, various floats, gauges, and sensors.

Floats/Gauges/Sensors

Figure 24:
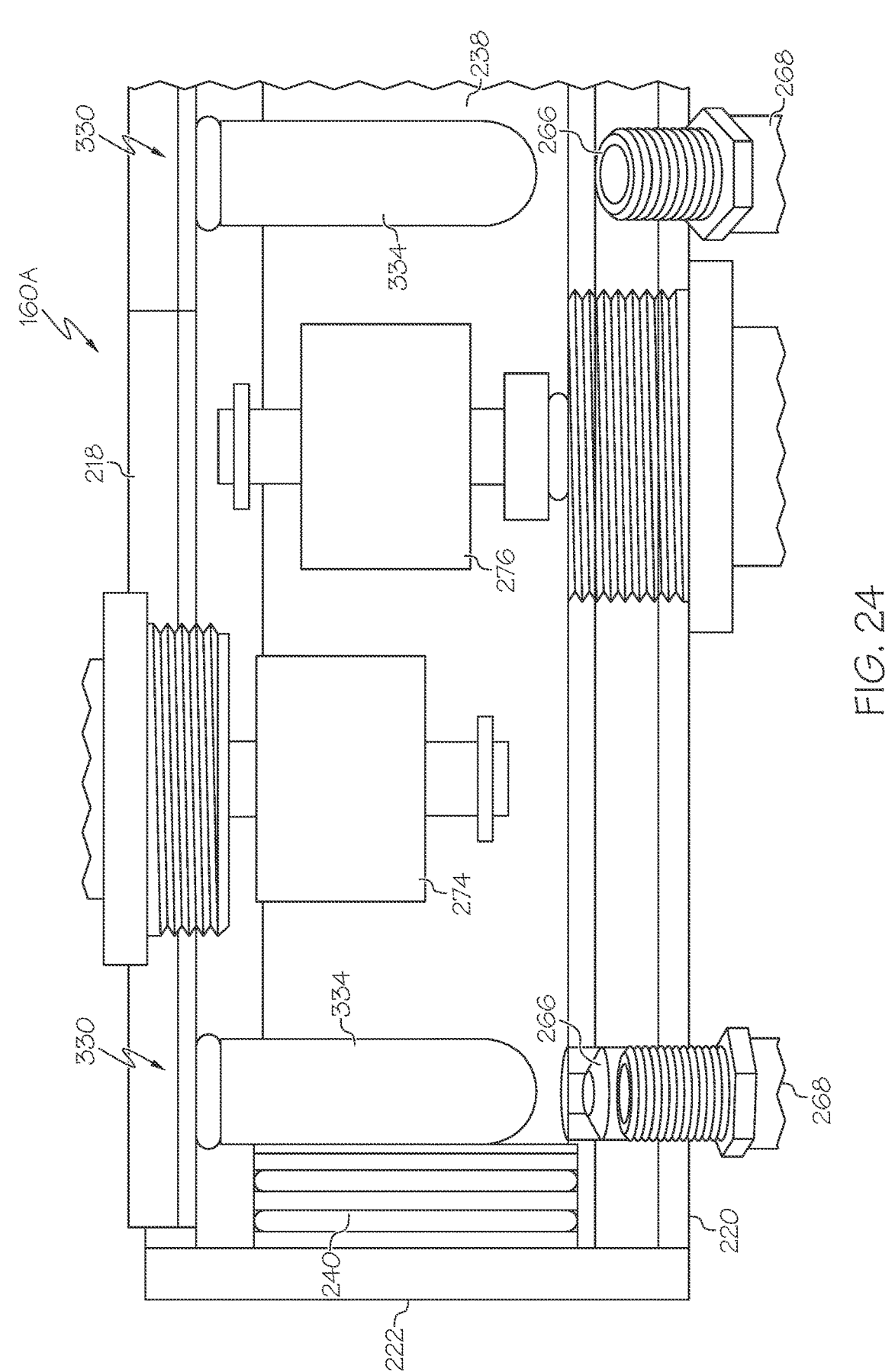
FIG. 24 schematically depicts a partial side view of an embodiment of a manifold assembly including a pair of fluid level floats according to one or more embodiments shown and described herein.

Referring now to FIG. 24, the first fluid level float 274 and the second fluid level float 276 mentioned above with respect to FIGS. 10-13 are illustrated and discussed in more detail. While the fluid level floats 274, 276 are illustrated with the inlet manifold 210 of the manifold assembly 160, it should appreciated that the present disclosure is applicable to the inlet manifold 210 and the outlet manifold 212 of any of the manifold assemblies described herein.

In embodiments, the first fluid level float 274 is configured to sense a level of binder material within the inlet reservoir 238 and to send a signal to the control system 10 to perform an action (including, for example, initiating an alarm function) when the level of binder material within the inlet reservoir 238 rises above a predetermined threshold. Similarly, the second fluid level float 276 is configured to sense a level of binder material within the inlet reservoir 238 and to send a signal to the control system 10 to perform an action (including, for example, initiating an alarm function) when the level of binder material within the inlet reservoir 238 falls below a predetermined threshold. In some embodiments, the first fluid level float 274 and the second fluid level float 276 are analog floats configured to continuously monitor the level of binder material. By providing the first fluid level float 274 and the second fluid level float 276, additional levels of the binder material within the inlet reservoir 238 may be detected as compared to the levels of binder material detected by only utilizing a single fluid level float. In addition, the first fluid level float 274 may be configured to detect when a high level of binder material is present in the inlet reservoir 238 while the second fluid level float 276 may be configured to compare data to the first fluid level float 274.

As a non-limiting example, when the first fluid level float 274 within the inlet reservoir 238 determines that the level of fluid in the inlet reservoir 238 is above a predetermined threshold, the first fluid level float 274 sends a signal to the control system 10 to permit binder material to flow out of the inlet reservoir 238, either through the return port 254 or the bypass port 400 of the inlet manifold 210, if provided. As another non-limiting example, when the second fluid level float 276 provided within the inlet reservoir 238 determines that the level of binder material is below a predetermined threshold, the second fluid level float 276 sends a signal to the control system 10 to permit additional binder material to flow into the inlet reservoir 238 through the supply port 242 of the inlet manifold 210.

Figure 25:
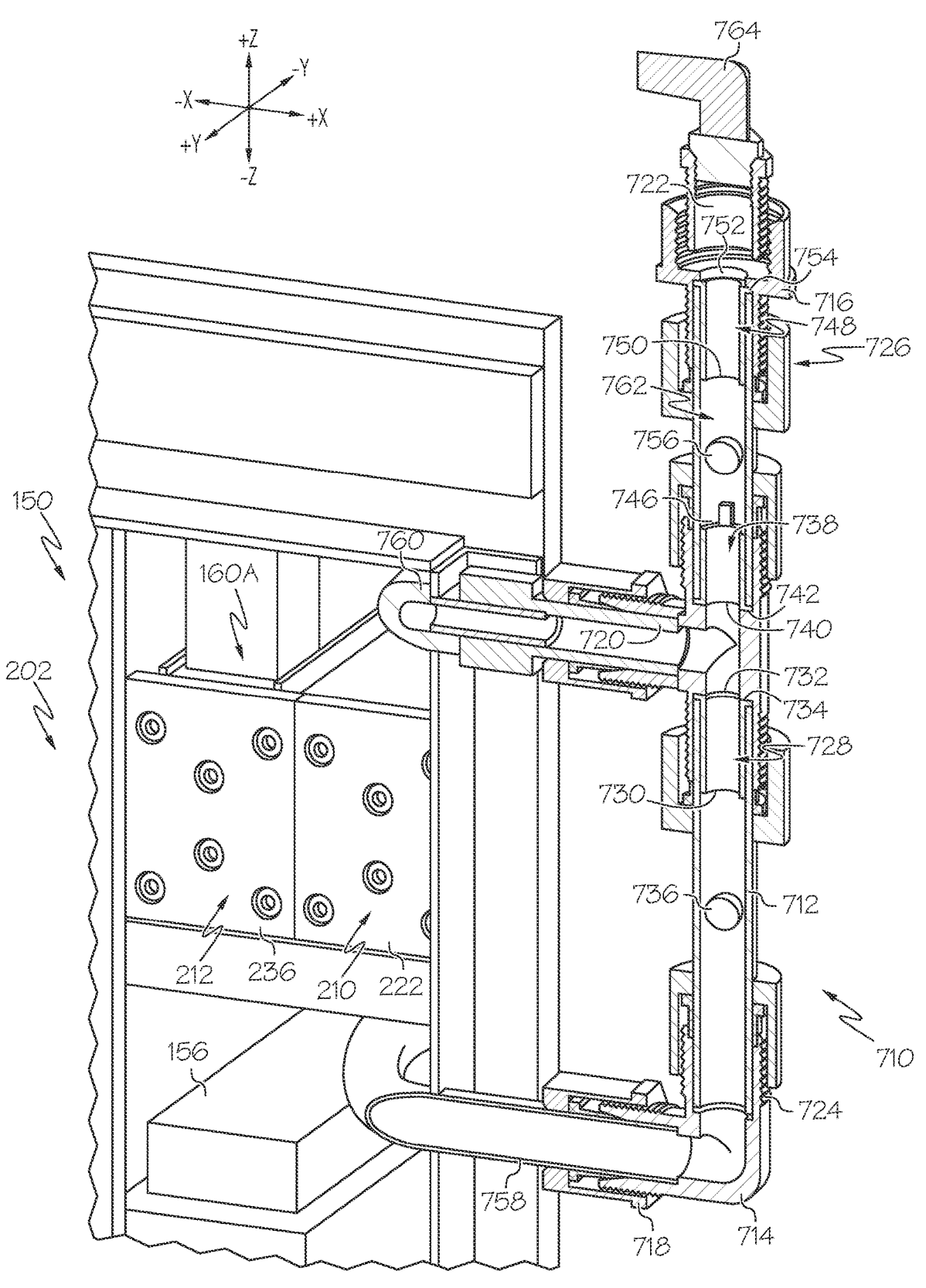
FIG. 25 schematically depicts a partial cross-sectional view of the printing assembly including an external level monitoring device according to one or more embodiments shown and described herein.

Referring now to FIG. 25, an external level monitoring device 710, which includes the first upper sight gauge connection 278 and the first lower sight gauge connection 280. Although the external level monitoring device 710 in FIG. 25 is shown in combination with the inlet manifold 210 of the manifold assembly 160A, it is contemplated that the external level monitoring device 710 may be used in combination with the inlet manifold 210 or the outlet manifold 212 of any manifold assembly discussed herein.

The external level monitoring device 710 includes an elongated channel 712 having a first end 714 and an opposite second end 716, a first connection 718 proximate a first end 714 of the elongated channel 712, a second connection 720, and a third connection 722 proximate the second end 716 of the elongated channel 712. A first conduit 758 is coupled to the first connection 718 of the external level monitoring device 710 and places the external level monitoring device 710 in fluid communication with the inlet reservoir 238 via the first lower sight gauge connection 280 of the inlet manifold 210. A second conduit 760 is coupled to the second connection 720 of the external level monitoring device 710 for providing a vacuum path 762 from the second connection 720 of the external level monitoring device 710 toward the third connection 722 thereof. The second conduit 760 may be in fluid communication with the inlet reservoir 238 via the first upper sight gauge connection 278 of the inlet manifold 210. A vacuum connection 764 is coupled to the third connection 722 of the external level monitoring device 710 at the second end 732 thereof.

Portions of the elongated channel 712, such as a first portion 724 between the first connection 718 and the second connection 720, and a second portion 726 between the second connection 720 and the third connection 722, may be at least partially transparent to enable visual monitoring of levels of binder material within the external level monitoring device 710, as discussed in more detail herein.

A first stop 728 is positioned within the elongated channel 712 between the first connection 718 and the second connection 720. The first stop 728 includes a first end 730 facing the first connection 718 and having a contoured surface. In embodiments, the contoured surface may be tapered or spherical. In embodiments, the first stop 728 includes a second end 732 having a flange 734 configured to engage the elongated channel 712 and fix the first stop 728 within the external level monitoring device 710. In other embodiments, the first stop 728 may be fixed within the elongated channel 712 using any other suitable fastening means. A first floating member 736, such as a ball, is positioned within the elongated channel 712 between the first connection 718 and the first stop 728.

A second stop 738 is positioned within the elongated channel 712 between the second connection 720 and the third connection 722 proximate the second connection 720. In embodiments, the second stop 738 has a first end 740 facing the second connection 720 including a flange 742 configured to engage the elongated channel 712 and fix the second stop 738 within the external level monitoring device 710. In other embodiments, the second stop 738 may be fixed within the elongated channel 712 using any other suitable fastening means. The second stop 738 has an opposite second end 744 facing the third connection 722 including a partially contoured surface. In embodiments, the contoured surface is tapered or spherical. The second stop 738 also includes at least one cutout portion 746 extending from the second end 744 toward the first end 740. In embodiments, the second stop 738 includes a pair of cutout portions 746 that are diametrically opposed from one another, each extending partially from the second end 744 of the second stop 738 toward the first end 740 of the second stop 738.

A third stop 748 is positioned within the elongated channel 712 between the second connection 720 and the third connection 722 proximate the third connection 722, and includes similar structure as the first stop 728. The third stop 748 is arranged within the elongated channel 712 such that a first end 750 of the third stop 748 having a contoured surface faces the second connection 720. In embodiments, the contoured surface of the first end 750 of the third stop 748 is tapered or spherical. In embodiments, the third stop 748 includes an opposite second end 752 facing the third connection 722 and having a flange 754 configured to engage the elongated channel 712 to fix the third stop 748 within the external level monitoring device 710. In other embodiments, the third stop 748 may be fixed within the elongated channel 712 using any other suitable fastening means. A second floating member 756, such as a ball, is positioned within the elongated channel 712 between the second stop 738 and the third stop 748.

As binder material flows into the external level monitoring device 710 from the inlet manifold 210 through the first conduit 758, the first floating member 736 is raised by binder material entering the external level monitoring device 710. The first floating member 736 is raised until the first floating member 736 contacts and engages the contoured first end 730 of the first stop 728 to create a seal. As air flows through the second connection 720 via the second conduit 760 and toward the third connection 722, the second floating member 756 is moved from the second stop 738 to the third stop 748. Initially, when there is no or limited air flowing through the second connection, the second floating member 756 is positioned against the second stop 738. Air is permitted to flow through the cutout portions 746 and around the second end 744 of the second stop 738 to allow for airflow to flow toward the third connection 722 of the external level monitoring device 710. As the second floating member 756 is pushed away from the second stop 738 and toward the third stop 748, the second floating member 756 engages the first end 750 of the third stop 748 to create a seal preventing air from flowing through the vacuum connection 764 at the third connection 722 of the external level monitoring device 710.

Figure 26:
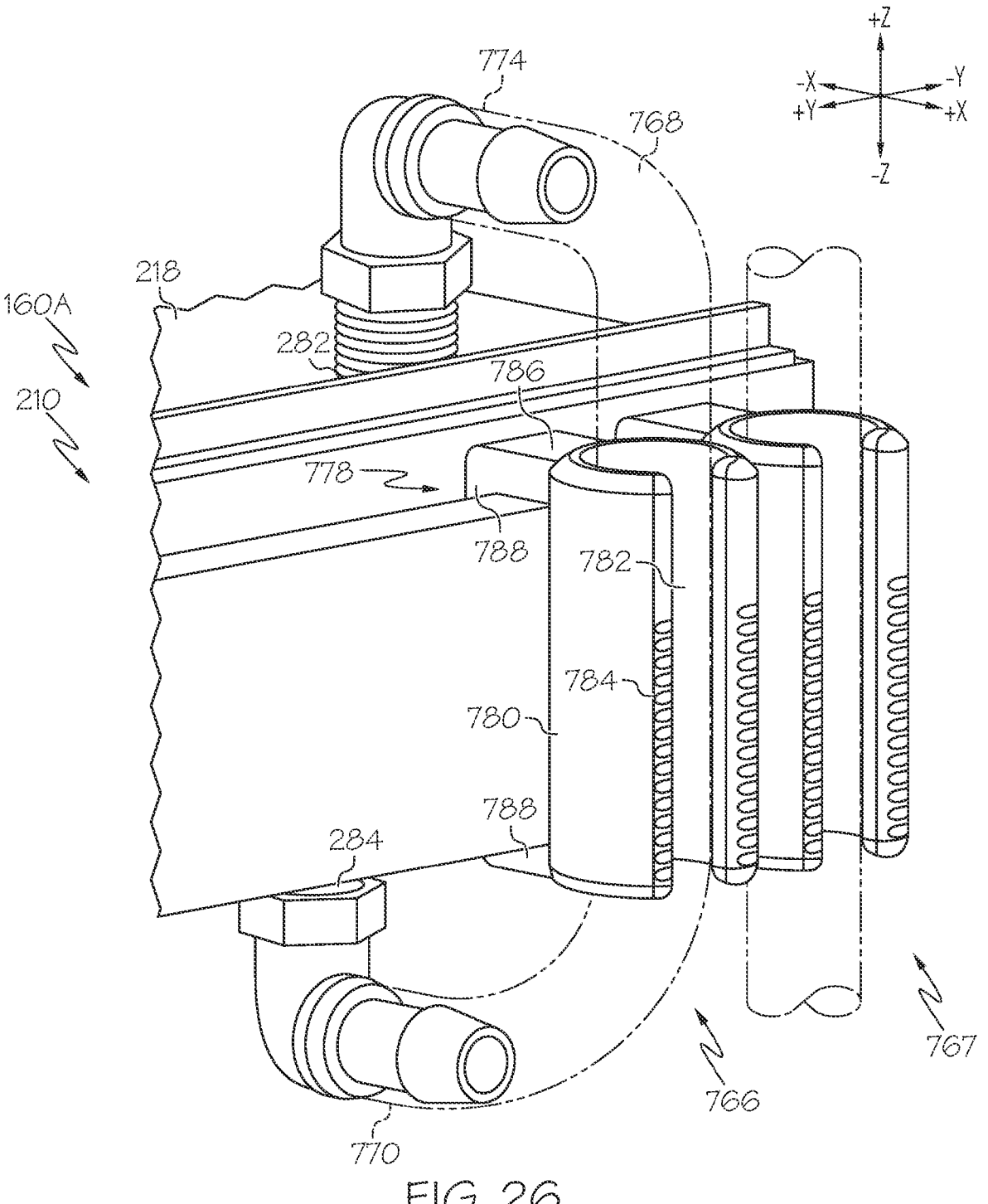
FIG. 26 schematically depicts a partial perspective view of a sight gauge device according to one or more embodiments shown and described herein.

Referring now to FIG. 26, at least one sight gauge device 766 is shown in combination with the manifold assembly 160A, which includes the second upper sight gauge connection 282 and the second lower sight gauge connection 284. As shown, a pair of sight gauges 766, 767 are provided wherein the sight gauges 766, 767 may be in fluid communication with the inlet manifold 210 and the outlet manifold 212, respectively, for monitoring a level of binder material within each. Each sight gauge 766, 767 includes like structure and, thus, only the sight gauge 766 in fluid communication with the inlet manifold 210 will be described in greater detail herein.

The sight gauge 766 includes a tube 768 formed of a transparent binder material having a first end 770 in fluid communication with the inlet reservoir 238 via the second lower sight gauge connection 284 of the inlet manifold 210. In embodiments, the tube 768 has a second end 774 in fluid communication with the inlet reservoir 238 via the second upper sight gauge connection 282 of the inlet manifold 210 to ensure that binder material within the tube 768 is returned to the inlet manifold 210. The sight gauge 766 includes a holder 778 securable to the tube 768 for securing the tube 768 in position relative to the manifold assembly 160. In embodiments, the holder 778 includes a receiving portion 780 having a see-through portion 782, such as an opening or otherwise transparent portion, extending longitudinally along the receiving portion 780 for observing a level of binder material within the tube 768. The receiving portion 780 is configured to receive the tube 768 and secure the holder 778 to the tube 768. As such, in embodiments in which the tube 768 is cylindrical, the receiving portion 780 of the holder 778 has a cylindrical cross-section for receiving the tube 768. The holder 778 also includes indicia 784, such as a series of notches, lines, numbers, or the like, provided along at least one side of the see-through portion, with each member of the series corresponding to a level of the binder material within the tube 768, and thus within the inlet manifold 210. For example, the indicia 784 can include lines with corresponding numbers indicating a level of the binder material as viewed through the see-through portion 782 of the holder 778 and within the tube 768. In embodiments, the holder 778 also includes a clamp 786 for coupling the holder 778 to a portion of the manifold assembly 160A itself. As shown, the clamp 786 includes opposing fingers 788 dimensioned to secure the holder 778 to the manifold assembly 160A. Thus, the clamp 786 of the holder 478 also secures the tube 768 in position relative to the manifold assembly 160A. However, other types of clamps may be employed, depending on the particular embodiment.

From the above, it is to be appreciated that defined herein is a printing assembly including a manifold assembly having an inlet manifold and an outlet manifold removable from the inlet manifold. The inlet manifold includes an inlet reservoir and an inlet port. The outlet manifold includes an outlet reservoir and an outlet port. The manifold assembly includes an inlet valve provided at the inlet port of the inlet reservoir, and an outlet valve provided at the outlet port of the outlet reservoir. The printing assembly includes a print head in fluid communication with both the inlet reservoir of the inlet manifold via the inlet port, and the outlet reservoir of the outlet manifold via the outlet port. The inlet valve and the outlet valve are independently operable to permit a flow of binder material from the inlet reservoir to the print head and from the print head to the outlet reservoir, respectively. By allowing for independent control of the inlet manifold and the outlet manifold, control of binder material to and from the print heads may be better managed during use, as well as during maintenance.

Further aspects of the invention are provided by the subject matter of the following clauses:

1. A printing assembly comprising: a manifold assembly comprising: an inlet manifold comprising an inlet reservoir and a plurality of inlet ports; an outlet manifold comprising an outlet reservoir and a plurality of outlet ports; a plurality of inlet valves within the inlet manifold; a plurality of outlet valves within the outlet manifold; and a printing head comprising: a housing; and a plurality of print heads provided within the housing, each of the plurality of print heads in fluid communication with the inlet reservoir via a corresponding one of the plurality of inlet ports and the outlet reservoir via a corresponding one of the plurality outlet ports, wherein each of the plurality of inlet valves and the plurality of outlet valves is independently operable to permit or prevent a flow of binder material from the inlet reservoir to a corresponding one of the plurality of print heads, and from a corresponding one of the plurality of print heads to the outlet reservoir, respectively.

2. The printing assembly of any preceding clause, wherein the manifold assembly is provided within the housing of the printing head.

3. The printing assembly of any preceding clause, further comprising: a plurality of inlet tubes, each of the plurality of inlet tubes coupling a corresponding one of the plurality of print heads to a corresponding one of the plurality of inlet ports; and a plurality of outlet tubes, each of the plurality of outlet tubes coupling a corresponding one of the plurality of print heads to a corresponding one of the plurality of outlet ports.

4. The printing assembly of any preceding clause, further comprising: a plurality of inlet fittings, each of the plurality of inlet fittings coupled to a corresponding one of the plurality of inlet ports, the plurality of inlet fittings being arranged in an alternating angular orientation; and a plurality of outlet fittings, each of the plurality of outlet fittings coupled to a corresponding one of the plurality of outlet ports, the plurality of outlet fittings being arranged in an alternating angular orientation.

5. The printing assembly of any preceding clause, wherein the inlet manifold is separable from the outlet manifold.

6. The printing assembly of any preceding clause, further comprising a plurality of actuators, each one of the plurality of actuators coupled directly to a corresponding one of the plurality of the inlet valves or a corresponding one of the plurality of outlet valves for moving the corresponding valve between an open position and a closed position.

7. The printing assembly of any preceding clause, further comprising: a first bypass port through the inlet manifold; a second bypass port through the outlet manifold; and a bypass line fluidly coupling the first bypass port to the second bypass port for allowing binder material to flow from the inlet reservoir to the outlet reservoir without passing through any one of the plurality of print heads.

8. The printing assembly of any preceding clause, wherein at least one of the first and second bypass ports is coupled to a corresponding bypass valve operable between an open position to permit binder material to flow into the outlet reservoir from the inlet reservoir and a closed position to prevent binder material from flowing into the outlet reservoir from the inlet reservoir.

9. The printing assembly of any preceding clause, wherein each of the plurality of inlet valves and the plurality of outlet valves comprises a receptacle and a plunger received within the receptacle, the plunger movable between a raised position when the corresponding valve is in the open position, and a lowered position when the corresponding valve is in the closed position.

10. The printing assembly of any preceding clause, wherein the plunger includes an seal provided at an end of the plunger opposite the receptacle for creating a seal between the plunger and an associated port when the plunger is in the lowered position.

11. The printing assembly of any preceding clause, wherein each of the plurality of inlet valves and the plurality of outlet valves comprises a proximity sensor within the receptacle for detecting whether the plunger is in the open position or the closed position.

12. The printing assembly of any preceding clause, wherein each of the plurality of inlet valves and the plurality of outlet valves comprises a pneumatic actuator for switching between the open position and the closed position.

13. The printing assembly of any preceding clause, wherein each of the valves comprises an electric actuator for switching between the open position and the closed position.

14. The printing assembly of any preceding clause, further comprising a fluid level float in at least one of the inlet manifold and the outlet manifold for sensing a level of material.

15. The printing assembly of any preceding clause, wherein the fluid level float is configured to detect a level of binder material within the manifold assembly, the fluid level float configured to transmit a signal to a control system for performing an alarm function if the level of binder material exceeds a predetermined threshold.

16. The printing assembly any preceding clause, wherein the fluid level float is an analog float configured to continuously monitor the level of binder material.

17. The printing assembly of any preceding clause, wherein the inlet manifold and the outlet manifold each comprises a first fluid level float and a second fluid level float, the first fluid level float configured to detect when the binder material exceeds a predetermined low threshold and the second fluid level float configured to detect when the binder material exceeds predetermined high threshold.

18. The printing assembly of any preceding clause, further comprising a fluid level monitoring device to enable visual monitoring of a level of binder material in at least one of the inlet manifold and the outlet manifold.

19. The printing assembly of any preceding clause, further comprising a holding bracket configured to secure the inlet manifold and the outlet manifold to one another relative to the printing head.

20. The printing assembly of any preceding clause, wherein at least one of the plurality of inlet valves and the plurality of outlet valves comprises a camshaft including at least one lobe, wherein the rotation of the camshaft moves the lobe to open or close a corresponding one of the plurality of inlet ports or the plurality of outlet ports.

21. The printing assembly of any preceding clause, wherein the camshaft is coupled to a rotary actuator.

22. The printing assembly of any preceding clause, wherein the camshaft has a plurality of lobes associated with at least one of a corresponding one of the plurality of inlet ports or the plurality of outlet ports such that the corresponding one of the plurality of inlet ports or the plurality of outlet ports may be opened or closed a plurality of times during a single complete rotation of the camshaft.

23. The printing assembly of any preceding clause, further comprising a vacuum provided within at least one of the inlet manifold and the outlet manifold, wherein the at least one vacuum establishes a pressure differential between the inlet manifold and the outlet manifold.

24. The printing assembly of any preceding clause, wherein: the pressure differential during a normal operation ranges from –1.0 psi to 0.0 psi; and the pressure differential during a purging operation ranges from 0.7 psi to 2 psi.

25. The printing assembly of any preceding clause, wherein the printing assembly is mounted on a traversing stage for indexing the printing assembly.

26. A manufacturing apparatus comprising: the printing assembly of any preceding clause; and at least one binder reservoir for providing binder material directly to at least one of the inlet manifold and the outlet manifold and receiving binder material from at least one of the inlet manifold and the outlet manifold.

27. A method for de-clogging a print head of a printing head assembly, the method comprising: providing a manifold assembly comprising: an inlet manifold for delivering binder material to a plurality of print heads, each of the plurality of print heads coupled to the inlet manifold via a corresponding one of a plurality of inlet ports, one of a plurality of inlet valves provided at each of the plurality of inlet ports; and an outlet manifold for receiving unused binder material from the plurality of print heads, each of the plurality of print heads coupled to the outlet manifold via a corresponding one of a plurality of outlet ports, one of a plurality of outlet valves provided at each of the plurality of outlet ports, wherein the inlet manifold has a first pressure and the outlet manifold has a second pressure, and a pressure differential is present between the inlet manifold and the outlet manifold; closing at least one of the plurality of inlet valves, by a control unit, to prevent binder material from flowing from the inlet manifold to the corresponding print head while at least another one of the plurality of inlet valves is in an open position; and applying a positive pressure effective to adjust the pressure differential between the inlet manifold and the outlet manifold, thereby causing the binder material to flow through only the inlet ports with an associated inlet valve in the open position to de-clog an associated print head.

28. The method of any preceding clause, further comprising: opening the at least one closed inlet valves; closing at least one of the open inlet valves; and applying a positive pressure effective to de-clog a different one of the plurality of print heads.

29. The method of any preceding clause, wherein: the positive pressure ranges from psi to 2 psi; a normal operating pressure ranges from –1.0 psi to 0.0 psi; and the positive pressure is based on the number of inlet valves that are opened.

30. The method of any preceding clause, further comprising closing all but one of the plurality of inlet valves such that only one of the plurality of inlet valves is open.

31. The method of any preceding clause, further comprising activating a pump at a binder reservoir to direct binder material to the inlet manifold and through the corresponding one of the plurality of inlet ports with the inlet valve in the open position to de-clog an associated print head.

32. The method of any preceding clause, wherein: the inlet manifold comprises a first bypass port; the outlet manifold comprises a second bypass port; a bypass valve is associated with one of the first bypass port and the second bypass port; the method further comprising: closing each of the plurality of inlet valves and the plurality of outlet valves; opening the bypass valve; and applying a vacuum to remove air from the manifold assembly.

33. A method for circulating binder material through a printing assembly, the method comprising: providing a manifold assembly comprising: an inlet manifold comprising an inlet reservoir and a plurality of inlet ports; an outlet manifold comprising an outlet reservoir and a plurality of outlet ports; a plurality of inlet valves within the inlet manifold; and a plurality of outlet valves within the outlet manifold, each of the plurality of inlet valves and the plurality of outlet valves is independently operable; delivering binder material to the inlet manifold or the outlet manifold from at least one binder reservoir; receiving binder material from the inlet manifold or the outlet manifold at the at least one binder reservoir; and applying a pressure differential across the inlet manifold and the outlet manifold, the pressure differential controllable based on operation of each of the plurality of inlet valves and the plurality of outlet valves.

34. The method of any preceding clause, further comprising: determining whether a level of binder material in at least one of the inlet manifold and the outlet manifold is above or below a predetermined threshold.

35. The method of any preceding clause, further comprising: determining that a level of binder material within the inlet manifold is above a predetermined threshold; and responsive to the determining, decreasing a rate of binder material being provided into the inlet manifold from the at least one reservoir, increasing a rate of binder material being drawn out of the inlet manifold toward the at least one reservoir, or both.

36. The method of any preceding clause, further comprising: determining that a level of binder material within the inlet manifold is below a predetermined threshold; and responsive to the determining, increasing a rate of binder material being provided into the inlet manifold from the at least one reservoir, decreasing a rate of binder material being drawn out of the inlet manifold toward a return reservoir, or both.

37. The method of any preceding clause, further comprising: providing a fluid level float in the inlet manifold; determining that a level of binder material within the inlet manifold is above a predetermined threshold; and increasing an output rate of binder material from the outlet manifold to the at least one binder reservoir.

38. The method of any preceding clause, further comprising: providing a fluid level float in the inlet manifold determining that a level of binder material within the inlet manifold is below a predetermined threshold; and decreasing an output rate of binder material from the outlet manifold to the at least one binder reservoir.

39. A method of priming a printing head assembly comprising a plurality of print heads, the method comprising: providing a manifold assembly comprising: an inlet manifold for delivering binder material to the plurality of print heads, each of the plurality of print heads coupled to the inlet manifold via a corresponding one of a plurality of inlet ports, one of a plurality of inlet valves provided at each of the plurality of inlet ports; and an outlet manifold for receiving unused binder material from the plurality of print heads, each of the plurality of print heads coupled to the outlet manifold via a corresponding one of a plurality of outlet ports, one of a plurality of outlet valves provided at each of the plurality of outlet ports, wherein the inlet manifold has a first pressure and the outlet manifold has a second pressure; closing all of the plurality of inlet valves and the plurality of outlet valves, by a control unit, to prevent binder material from flowing from the inlet manifold to the corresponding print head and from the corresponding print head to the outlet manifold; opening a bypass valve to allow for binder material to flow from the inlet manifold to the outlet manifold; and changing at least one of the first pressure and the second pressure to establish a pressure differential between the inlet manifold and the outlet manifold.

40. The method of any preceding clause, wherein: the pressure differential during a normal operation ranges from −1.0 psi to 0.0 psi; and the pressure differential during a purging operation ranges from 0.7 psi to 2 psi.

41. The method of any preceding clause, wherein changing at least one of the first pressure and the second pressure comprises providing binder material to the outlet manifold from the inlet manifold through the bypass valve.

42. The method of any preceding clause, wherein changing at least one of the first pressure and the second pressure comprises applying a vacuum to at least one of the inlet manifold and the outlet manifold.

43. The method of any preceding clause, wherein changing at least one of the first pressure and the second pressure comprises supplying binder material from a supply reservoir to at least one of the inlet manifold and the outlet manifold.

While particular embodiments have been illustrated and described herein, it should be understood that various other changes and modifications may be made without departing from the scope of the claimed subject matter. Specifically, features of each printing assembly or manifold assembly may be interchangeable between embodiments without departing from the scope of the claimed subject matter. Moreover, although various aspects of the claimed subject matter have been described herein, such aspects need not be utilized in combination. Further, it should be appreciated that, although not shown herein, it is contemplated that a printing assembly may include more than one manifold assembly such that each manifold assembly may be in fluid communication with all or a subset of the print heads. It is therefore intended that the appended claims cover all such changes and modifications that are within the scope of the claimed subject matter.

What is claimed is:

1. A printing assembly comprising:
a manifold assembly comprising:
an inlet manifold comprising an inlet reservoir and a plurality of inlet ports;
an outlet manifold comprising an outlet reservoir and a plurality of outlet ports;
a plurality of inlet valves within the inlet manifold; and
a plurality of outlet valves within the outlet manifold;
a printing head comprising:
a housing; and a plurality of print heads provided within the housing, each of the plurality of print heads in fluid communication with the inlet reservoir via a corresponding one of the plurality of inlet ports and the outlet reservoir via a corresponding one of the plurality of outlet ports;
a supply reservoir in fluid communication with the inlet reservoir;
a first bypass port through the inlet manifold;
a second bypass port through the outlet manifold; and
a bypass line fluidly coupling the first bypass port to the second bypass port for allowing binder material to flow from the inlet reservoir to the outlet reservoir without passing through any one of the plurality of print heads,
wherein each of the plurality of inlet valves and the plurality of outlet valves is independently operable to permit or prevent a flow of binder material from the inlet reservoir to a corresponding one of the plurality of print heads, and from a corresponding one of the plurality of print heads to the outlet reservoir, respectively.

2. The printing assembly of claim 1, wherein the manifold assembly is provided within the housing of the printing head.

3. The printing assembly of claim 1, further comprising:
a plurality of inlet tubes, each of the plurality of inlet tubes coupling a corresponding one of the plurality of print heads to a corresponding one of the plurality of inlet ports; and
a plurality of outlet tubes, each of the plurality of outlet tubes coupling a corresponding one of the plurality of print heads to a corresponding one of the plurality of outlet ports.

4. The printing assembly of claim 1, further comprising:
a plurality of inlet fittings, each of the plurality of inlet fittings coupled to a corresponding one of the plurality of inlet ports, the plurality of inlet fittings being arranged in an alternating angular orientation; and
a plurality of outlet fittings, each of the plurality of outlet fittings coupled to a corresponding one of the plurality of outlet ports, the plurality of outlet fittings being arranged in an alternating angular orientation.

5. The printing assembly of claim 1, wherein the inlet manifold is separable from the outlet manifold.

6. The printing assembly of claim 1, further comprising a plurality of actuators, each one of the plurality of actuators coupled directly to a corresponding one of the plurality of the inlet valves or a corresponding one of the plurality of outlet valves for moving the corresponding valve between an open position and a closed position.

7. The printing assembly of claim 1, wherein at least one of the first and second bypass ports is coupled to a corresponding bypass valve operable between an open position to permit binder material to flow into the outlet reservoir from the inlet reservoir and a closed position to prevent binder material from flowing into the outlet reservoir from the inlet reservoir.

8. The printing assembly of claim 7, wherein each of the plurality of inlet valves and the plurality of outlet valves comprises a receptacle and a plunger received within the receptacle, the plunger movable between a raised position when the corresponding valve is in the open position, and a lowered position when the corresponding valve is in the closed position, wherein the plunger includes an seal provided at an end of the plunger opposite the receptacle for creating a seal between the plunger and an associated port when the plunger is in the lowered position.

9. The printing assembly of claim 8, wherein each of the plurality of inlet valves and the plurality of outlet valves comprises an actuator for switching between the open position and the closed position.

10. The printing assembly of claim 1, further comprising a fluid level float in at least one of the inlet manifold and the outlet manifold for sensing a level of material, wherein the fluid level float is configured to detect a level of binder material within the manifold assembly, the fluid level float configured to transmit a signal to a control system for performing an alarm function if the level of binder material exceeds a predetermined threshold.

11. The printing assembly of claim 10, wherein the inlet manifold and the outlet manifold each comprises a first fluid level float and a second fluid level float, the first fluid level float configured to detect when the binder material exceeds a predetermined low threshold and the second fluid level float configured to detect when the binder material exceeds predetermined high threshold.

12. The printing assembly of claim 1, further comprising a vacuum provided within at least one of the inlet manifold and the outlet manifold, wherein the at least one vacuum establishes a pressure differential between the inlet manifold and the outlet manifold.

13. The printing assembly of claim 12, wherein:

the pressure differential during a normal operation ranges from −1.0 psi to 0.0 psi; and the pressure differential during a purging operation ranges from 0.7 psi to 2 psi.

14. A method for circulating binder material through a printing assembly, the method comprising:

providing a manifold assembly comprising:

an inlet manifold comprising an inlet reservoir and a plurality of inlet ports, the inlet reservoir in fluid communication with a supply reservoir;

an outlet manifold comprising an outlet reservoir and a plurality of outlet ports;

a plurality of inlet valves within the inlet manifold; and a plurality of outlet valves within the outlet manifold, each of the plurality of inlet valves and the plurality of outlet valves is independently operable;

providing a manifold assembly comprising:

a housing; and a plurality of print heads provided within the housing, each of the plurality of print heads in fluid communication with the inlet reservoir via a corresponding one of the plurality of inlet ports and the outlet reservoir via a corresponding one of the plurality outlet ports;

delivering binder material to the inlet manifold or the outlet manifold from at least one binder reservoir;

receiving binder material from the inlet manifold or the outlet manifold at the at least one binder reservoir;

applying a pressure differential across the inlet manifold and the outlet manifold, the pressure differential controllable based on operation of each of the plurality of inlet valves and the plurality of outlet valves; and allowing binder material to flow through a bypass line from the inlet reservoir to the outlet reservoir without passing through any one of the plurality of print heads, the bypass line fluidly coupling a first bypass port at the inlet manifold and a second bypass port at the outlet manifold.

15. The method of claim 14, further comprising:

determining whether a level of binder material in at least one of the inlet manifold and the outlet manifold is above or below a predetermined threshold.

16. The method of claim 14, further comprising:

determining that a level of binder material within the inlet manifold is above a predetermined threshold; and responsive to the determining, decreasing a rate of binder material being provided into the inlet manifold from the at least one reservoir, increasing a rate of binder material being drawn out of the inlet manifold toward the at least one reservoir, or both.

17. The method of claim 14, further comprising:

determining that a level of binder material within the inlet manifold is below a predetermined threshold; and responsive to the determining, increasing a rate of binder material being provided into the inlet manifold from the at least one reservoir, decreasing a rate of binder material being drawn out of the inlet manifold toward a return reservoir, or both.

18. The method of claim 14, further comprising:

providing a fluid level float in the inlet manifold;

determining that a level of binder material within the inlet manifold is above a predetermined threshold; and increasing an output rate of binder material from the outlet manifold to the at least one binder reservoir.

19. The method of claim 14, further comprising:

providing a fluid level float in the inlet manifold determining that a level of binder material within the inlet manifold is below a predetermined threshold; and decreasing an output rate of binder material from the outlet manifold to the at least one binder reservoir.

* * * * *